US008507824B2

(12) United States Patent
Martin

(10) Patent No.: US 8,507,824 B2
(45) Date of Patent: Aug. 13, 2013

(54) SYSTEM FOR PROCESSING FLOOR DECKING OF STRUCTURES

(75) Inventor: Gerald Martin, St. Charles, MO (US)

(73) Assignee: New Rule Products, Inc., St. Charles, MO (US)

( * ) Notice: Subject to any disclaimer, the term of this patent is extended or adjusted under 35 U.S.C. 154(b) by 1136 days.

(21) Appl. No.: 11/668,326

(22) Filed: Jan. 29, 2007

(65) Prior Publication Data
US 2007/0199277 A1 Aug. 30, 2007

Related U.S. Application Data

(60) Provisional application No. 60/763,184, filed on Jan. 27, 2006.

(51) Int. Cl.
B23K 11/04 (2006.01)
B23K 9/20 (2006.01)

(52) U.S. Cl.
CPC .............. B23K 9/202 (2013.01); B23K 9/206 (2013.01); B23K 9/201 (2013.01)
USPC ................................ 219/98; 219/99; 118/305

(58) Field of Classification Search
USPC .............. 219/98, 99; 280/47.34, 79.11, 79.2, 280/47.17, 47.131; 81/57.4, 57.24
See application file for complete search history.

(56) References Cited

U.S. PATENT DOCUMENTS

| 3,448,238 | A | * | 6/1969 | Savitz | 219/107 |
| 3,562,484 | A | * | 2/1971 | Murdock | 219/98 |
| 3,917,200 | A | * | 11/1975 | Johnson | 248/647 |
| 4,220,423 | A | * | 9/1980 | Sivachenko | 405/284 |
| 4,969,789 | A | * | 11/1990 | Searle | 414/10 |
| 5,130,510 | A | * | 7/1992 | Zeigler et al. | 219/99 |
| 5,201,953 | A | * | 4/1993 | Lowry | 118/305 |
| 5,406,044 | A | * | 4/1995 | Killian et al. | 219/99 |
| 5,977,506 | A | * | 11/1999 | von Daniken | 219/99 |
| 6,237,960 | B1 | * | 5/2001 | Dornhofer | 280/842 |
| 7,140,622 | B1 | * | 11/2006 | Cantu | 280/79.11 |
| 2001/0006596 | A1 | * | 7/2001 | Vickary | 414/543 |
| 2002/0117822 | A1 | * | 8/2002 | Holt et al. | 280/79.11 |
| 2003/0118435 | A1 | * | 6/2003 | Gessler | 414/797 |
| 2006/0099064 | A1 | * | 5/2006 | Anaki et al. | 414/797 |
| 2006/0279054 | A1 | * | 12/2006 | Chung et al. | 280/79.11 |

* cited by examiner

Primary Examiner — Henry Yuen
Assistant Examiner — Thien S Tran
(74) Attorney, Agent, or Firm — Armstrong Teasdale LLP

(57) ABSTRACT

A cart that uniformly transverses floor decking that has sequential peaks and valleys. The cart comprises a wheel assembly having an array of wheels forming rows and columns of wheels positioned under the cart wherein at any given instant of time a number of the wheels of the rows and columns contact peaks of the floor decking and while other wheels extend over and free from contacting the valleys such that the cart uniformly traverses the floor decking.

19 Claims, 47 Drawing Sheets

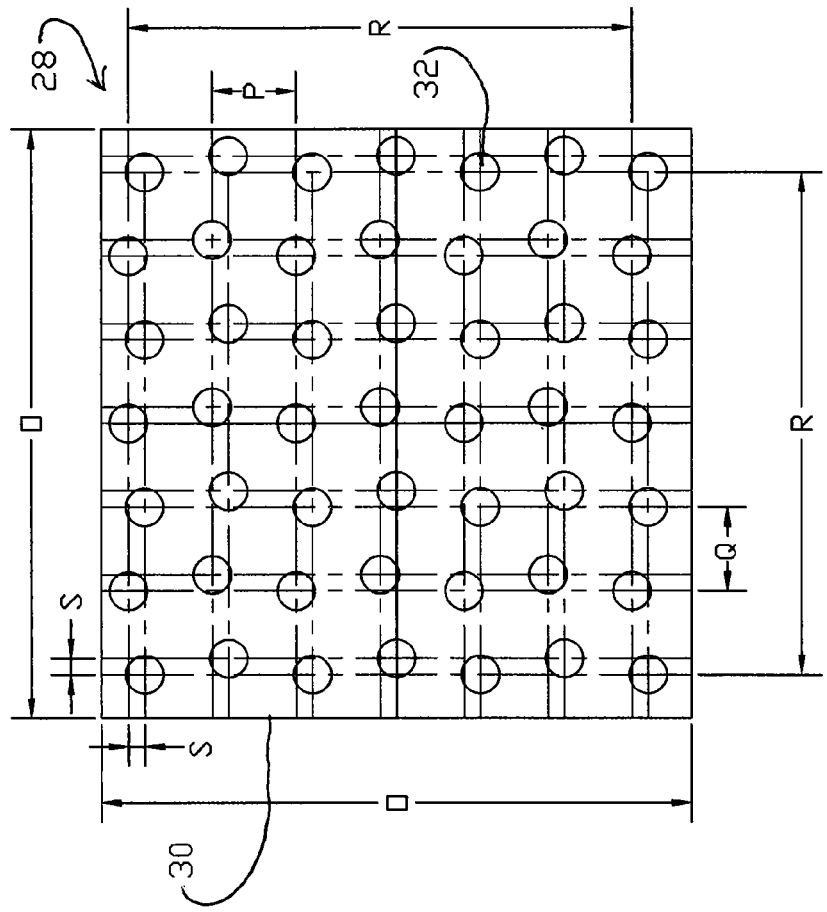
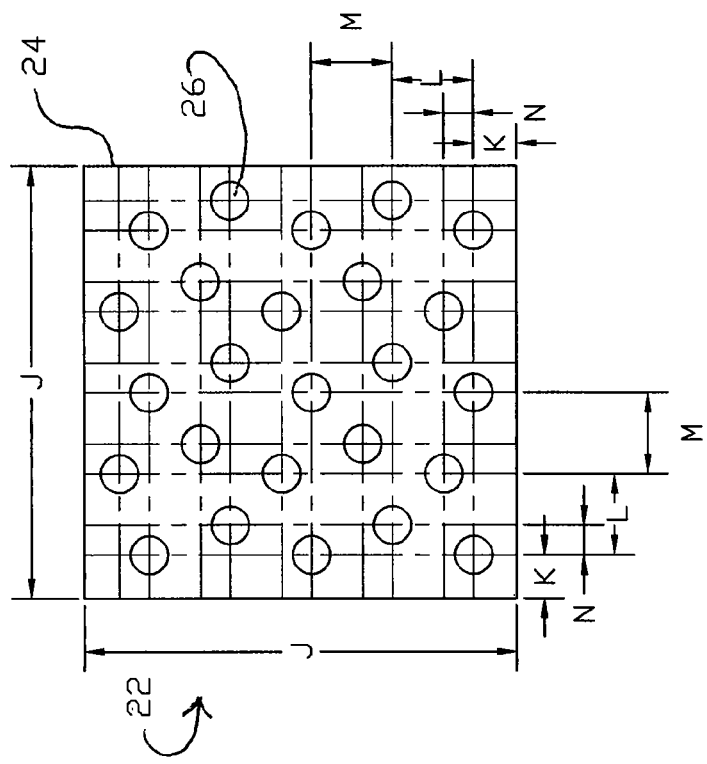

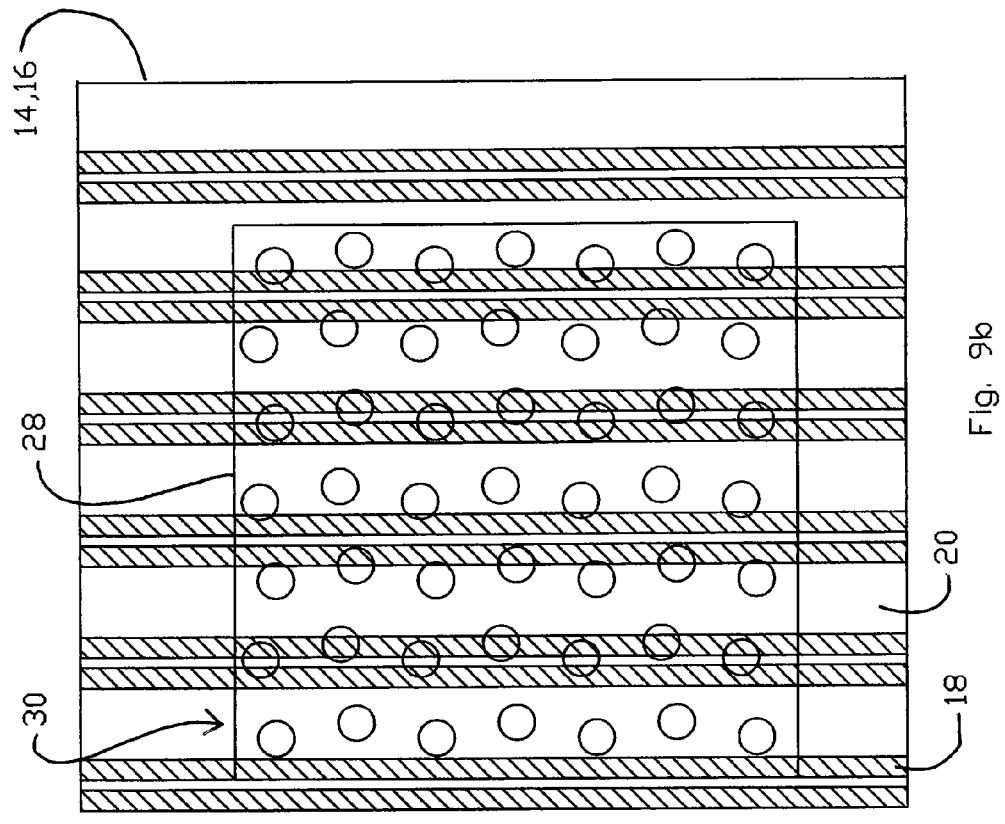
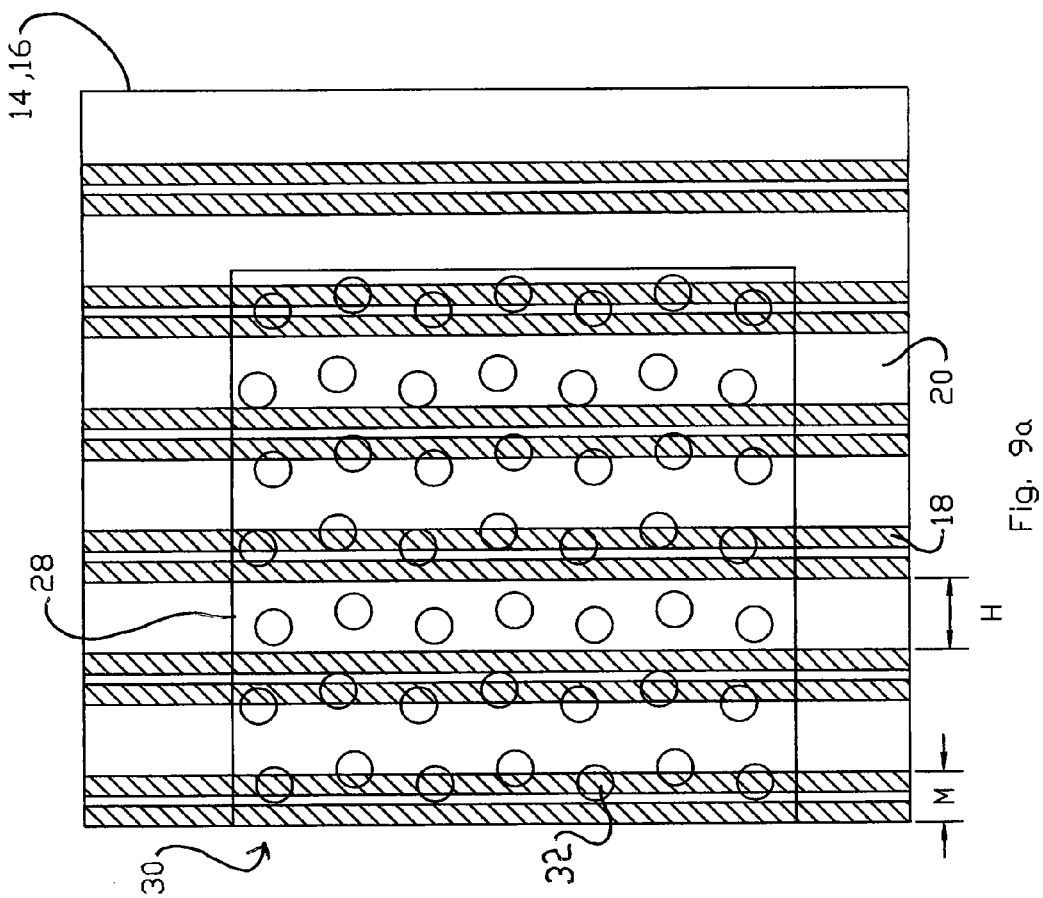
Fig. 9a
Fig. 9b

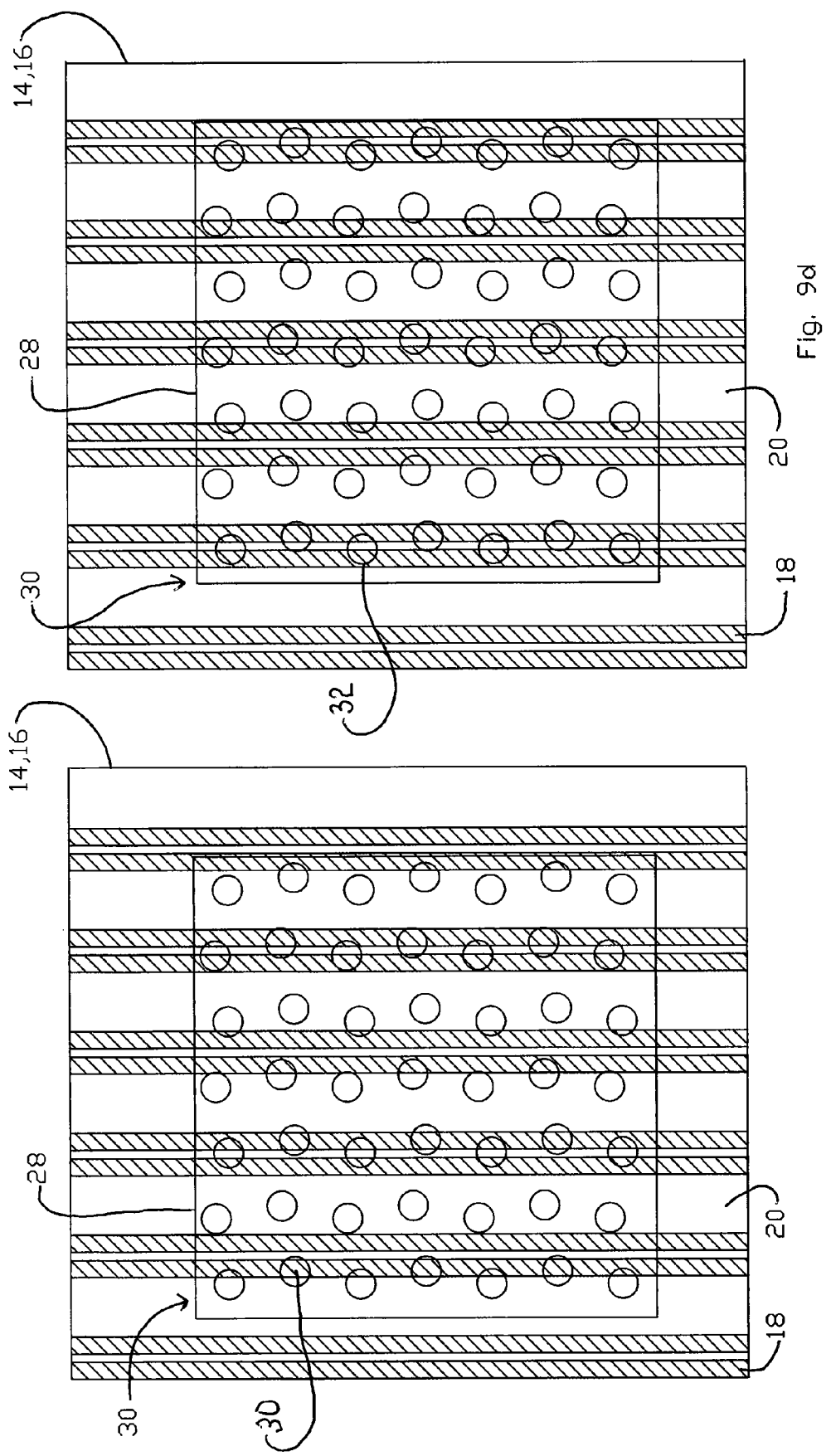

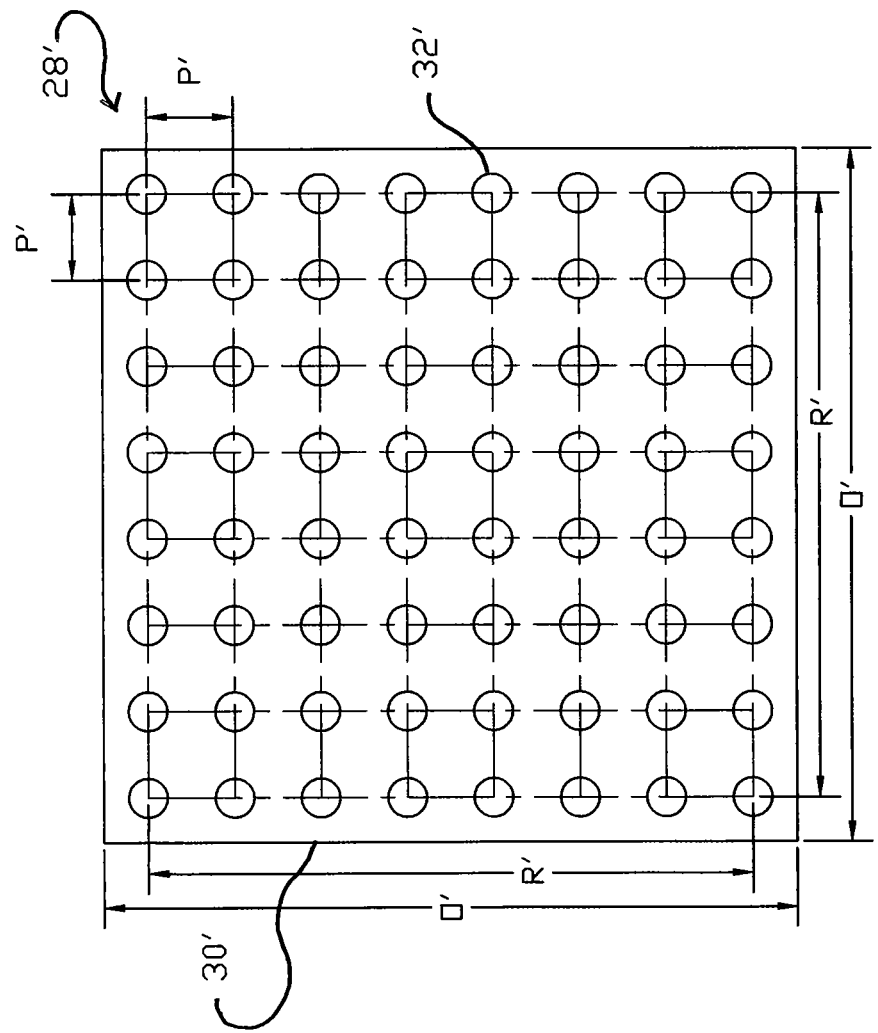

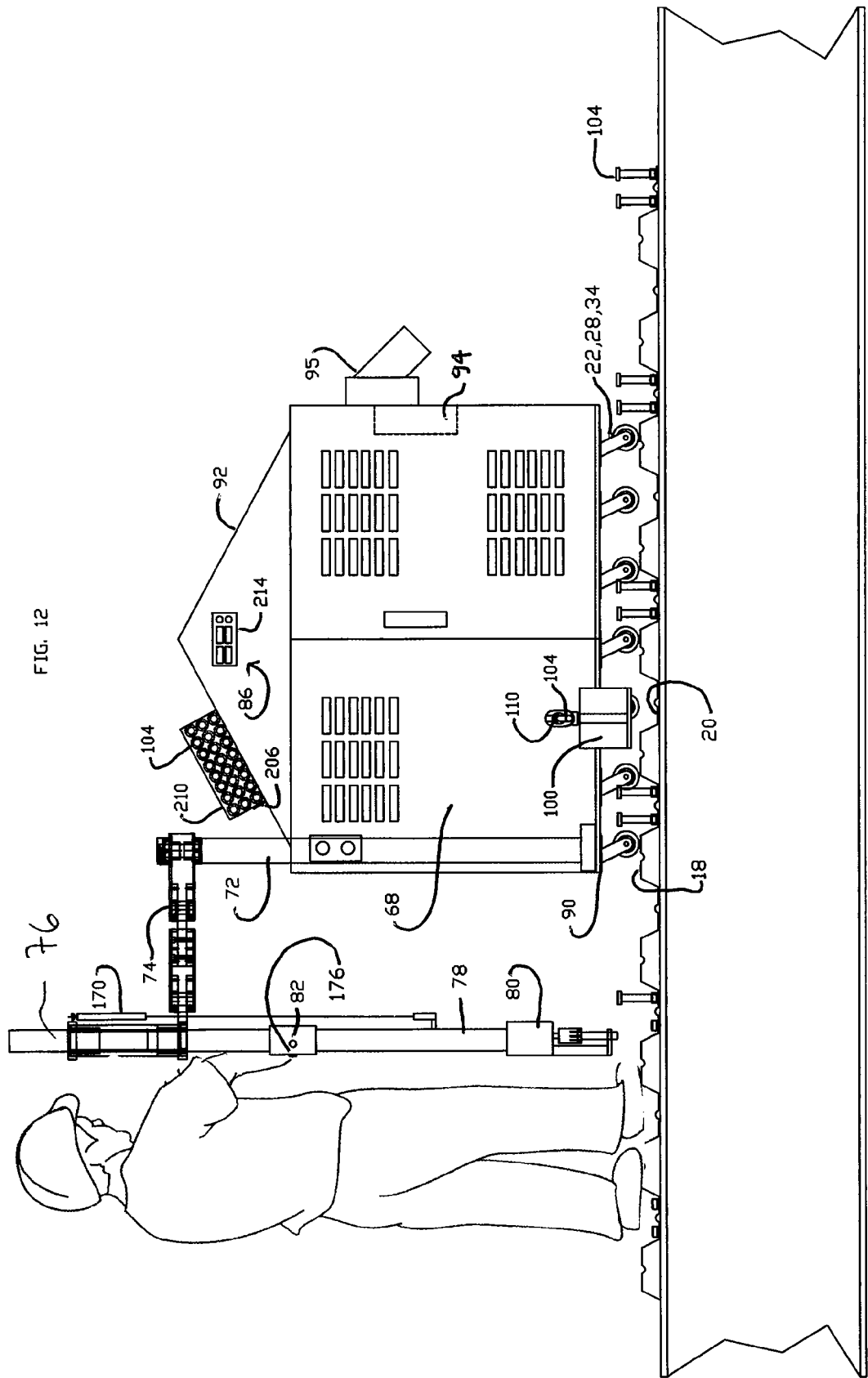

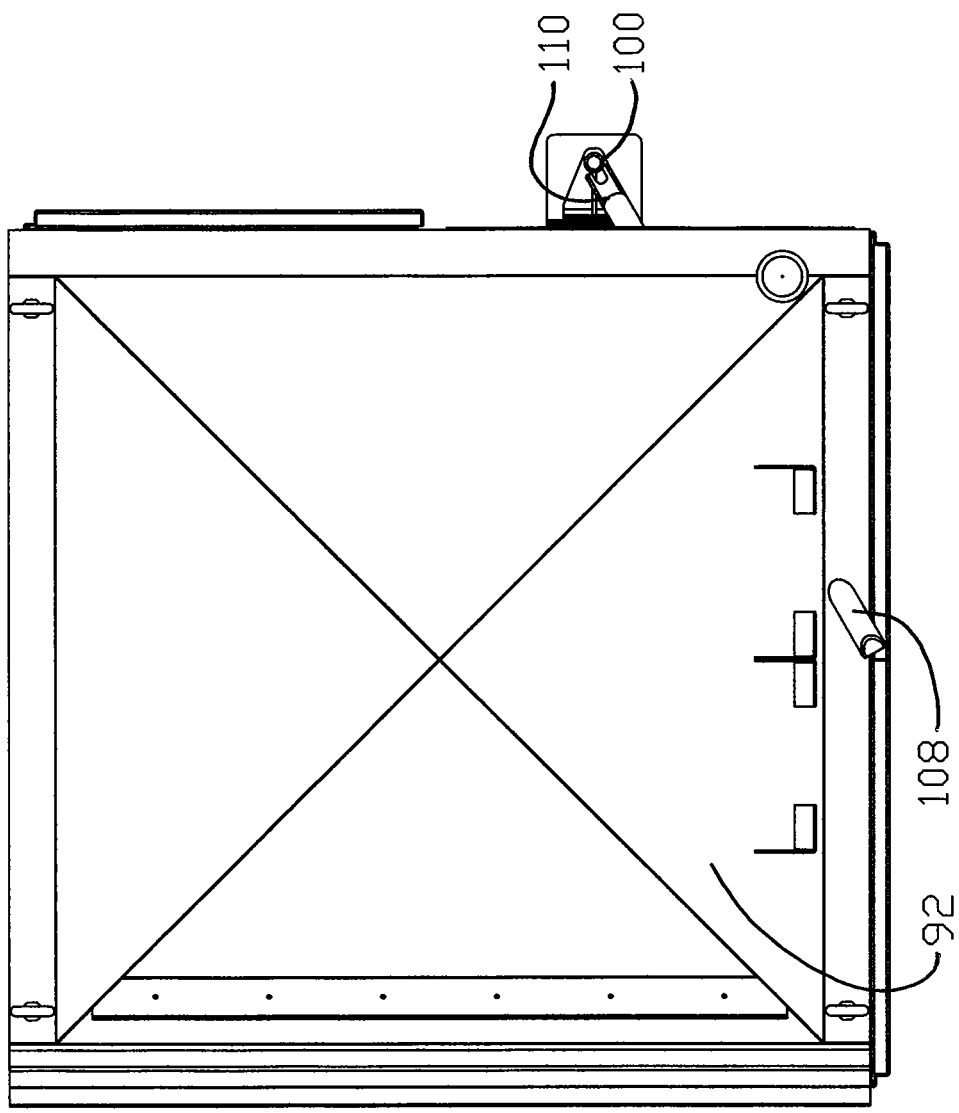

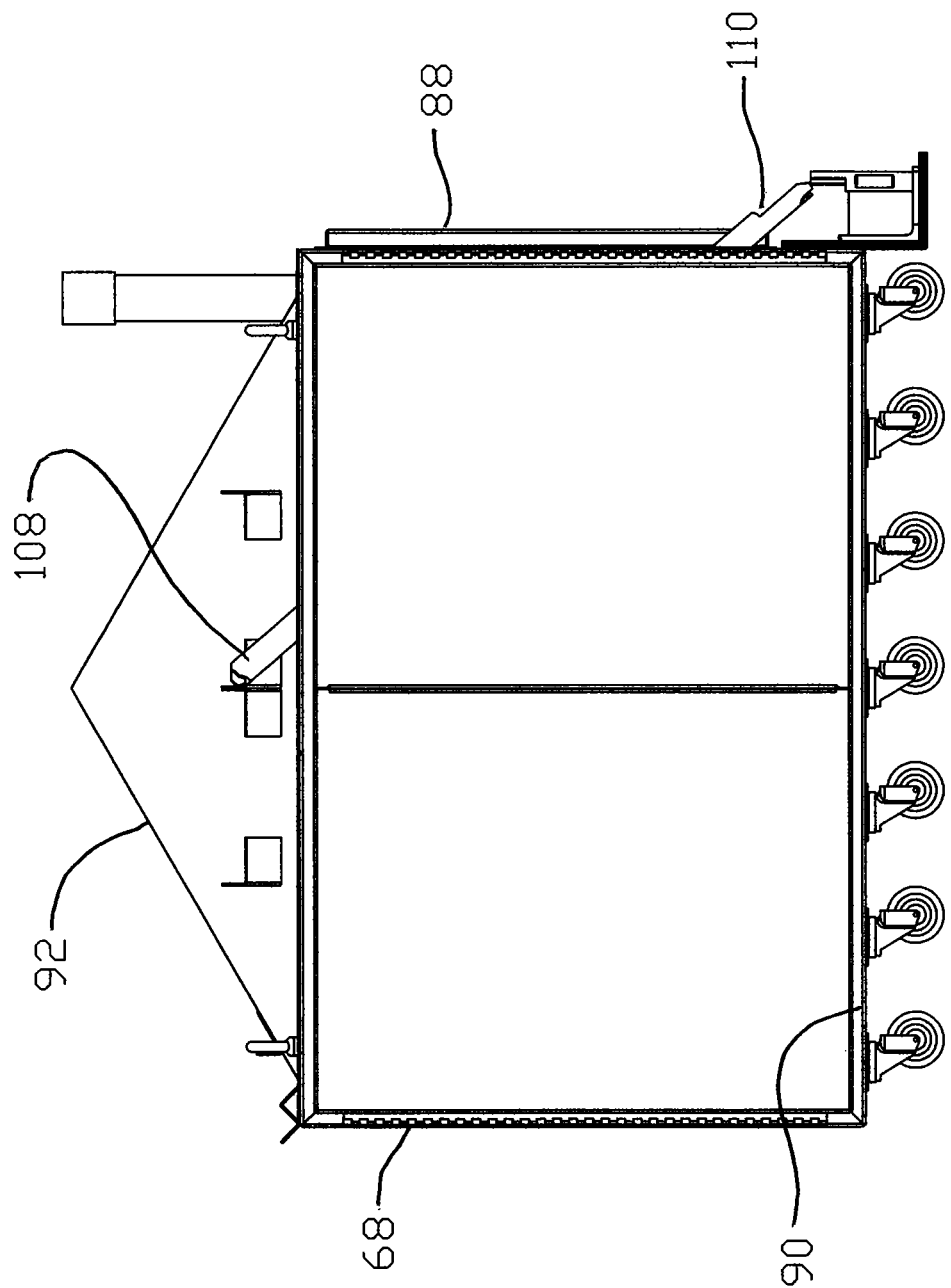

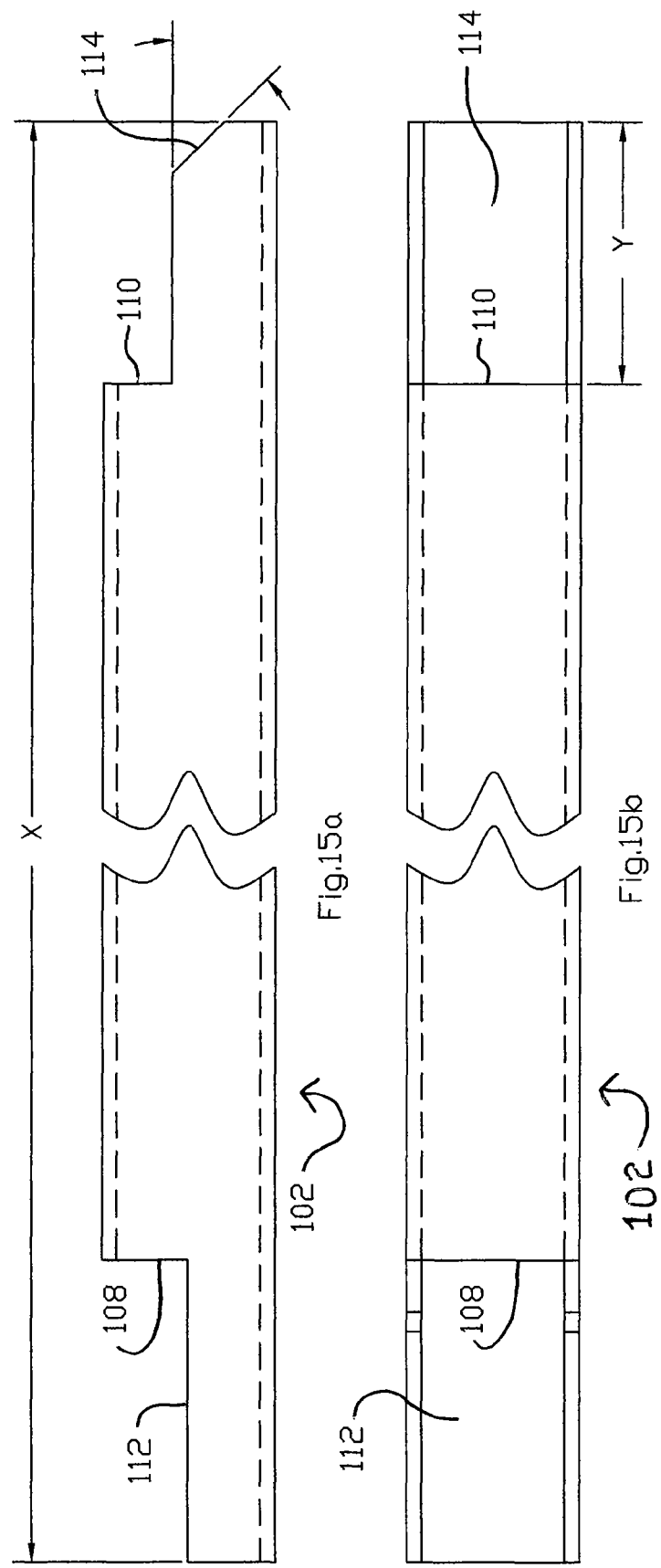

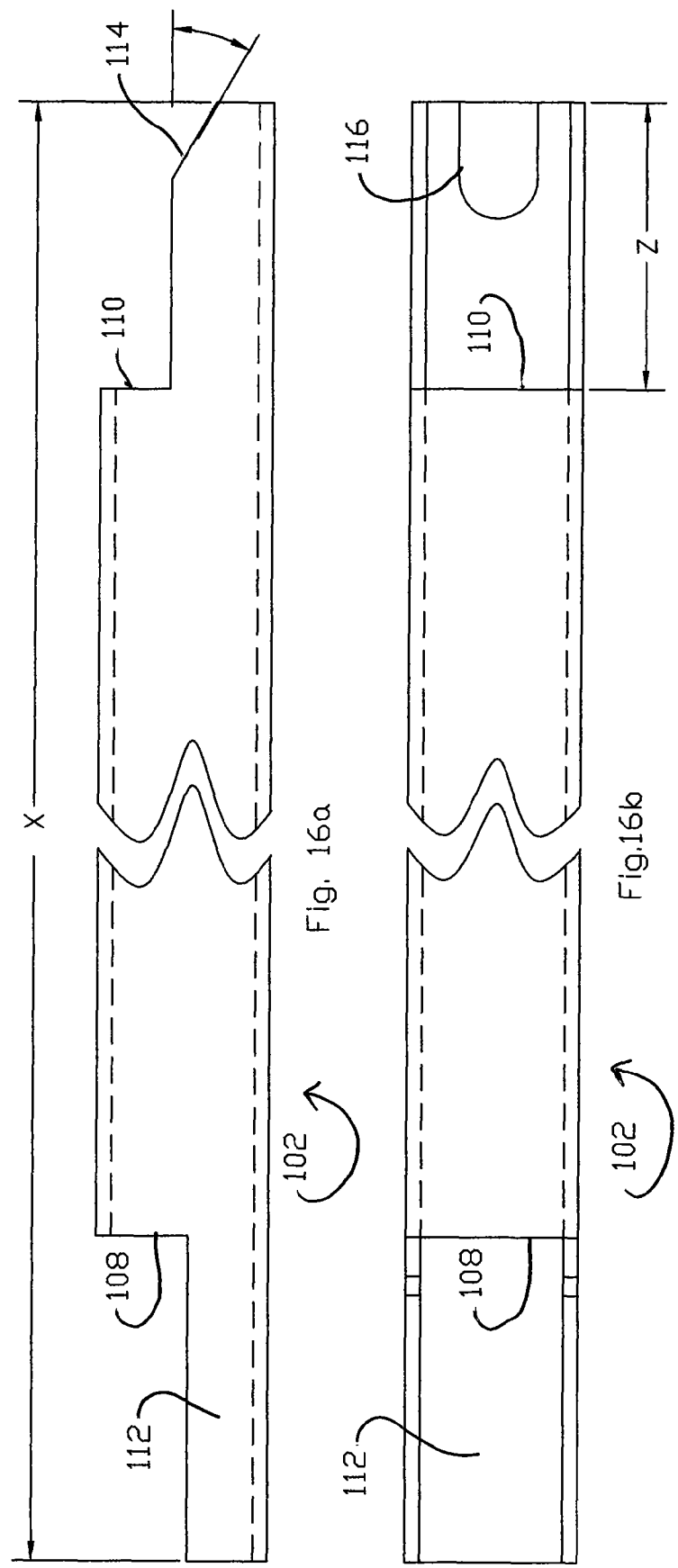

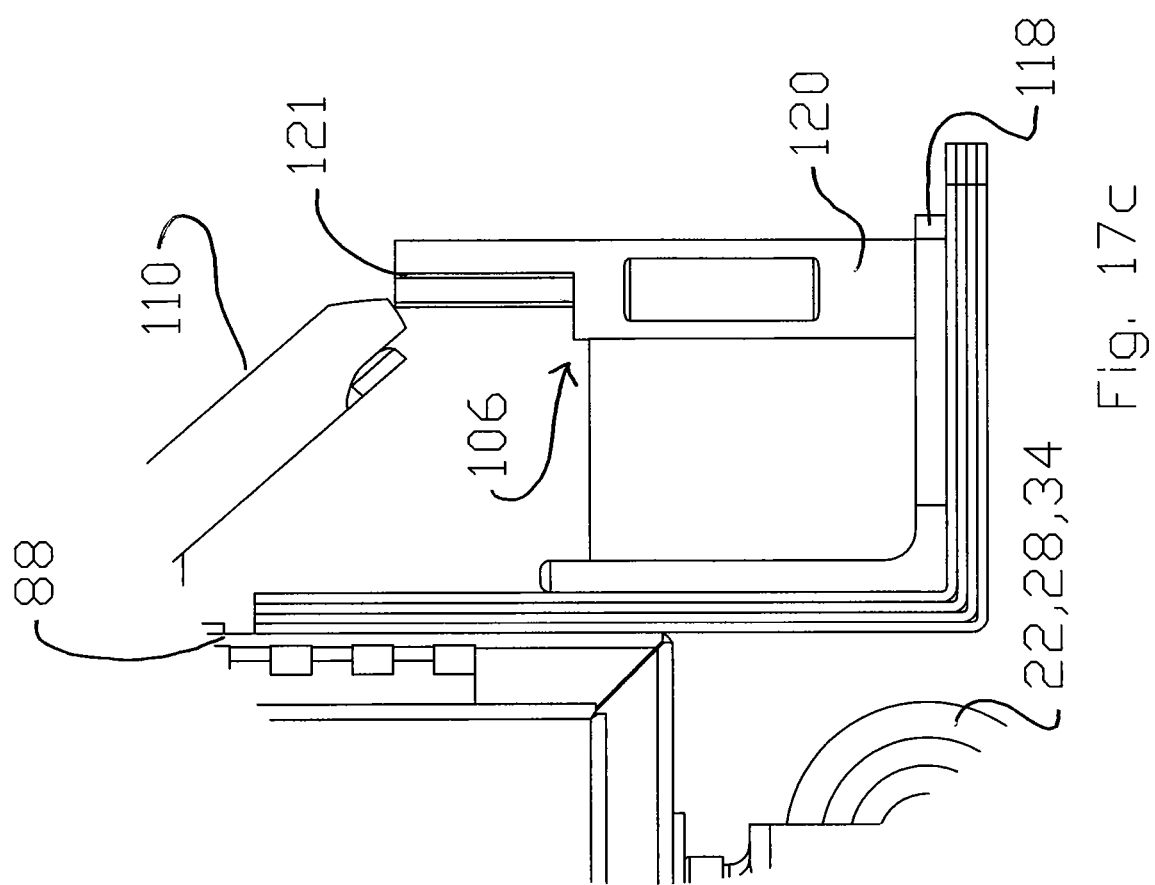

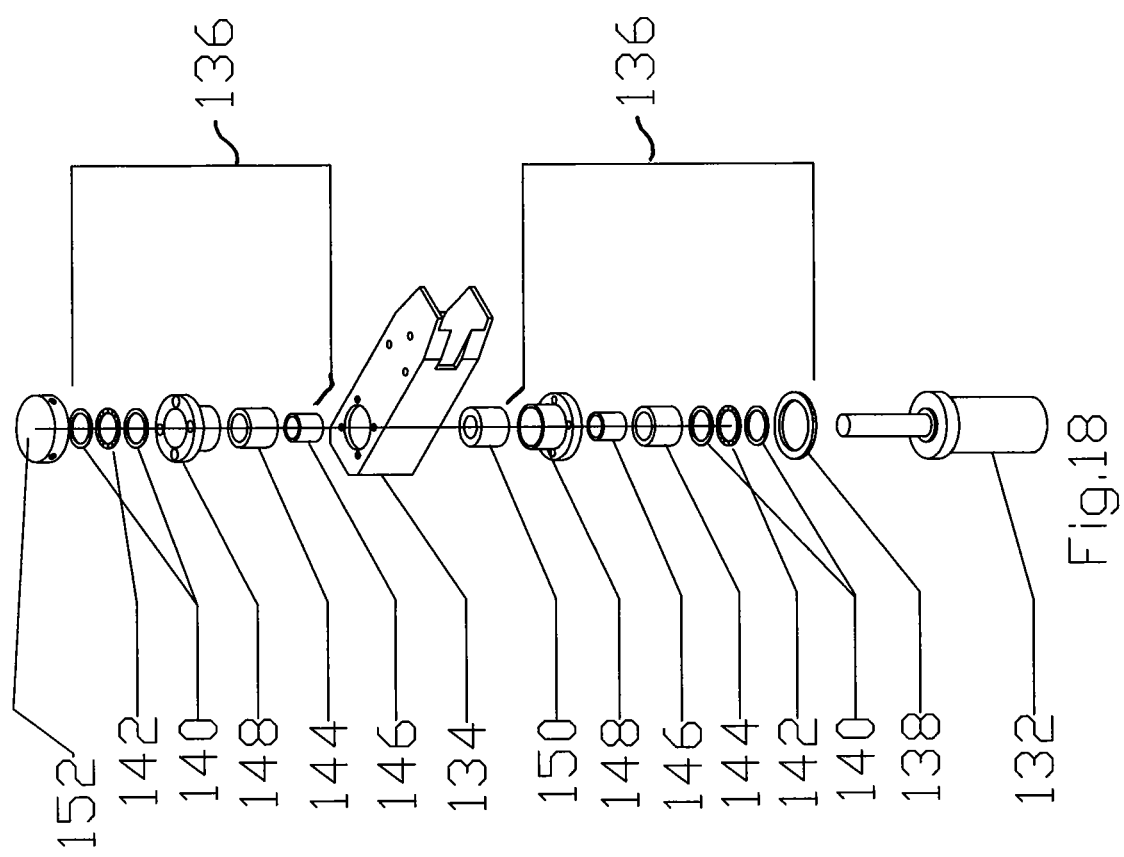

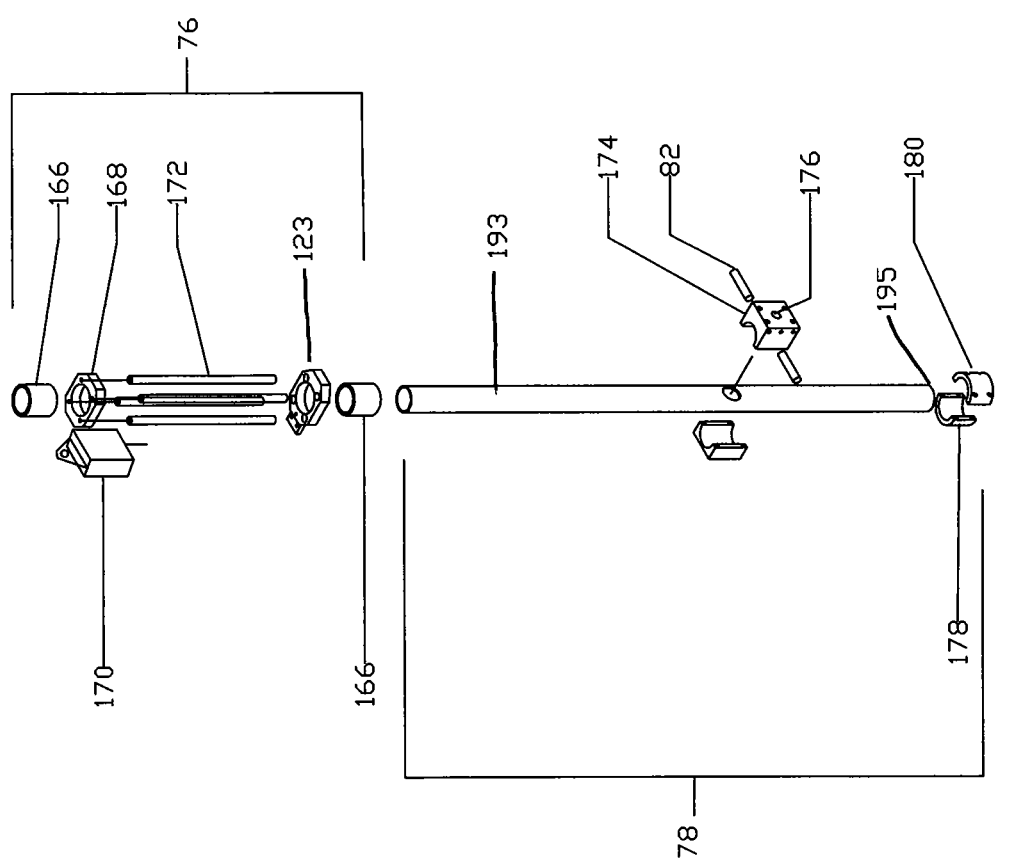

SYSTEM FOR PROCESSING FLOOR DECKING OF STRUCTURES

CROSS-REFERENCE TO RELATED APPLICATIONS

This application claims priority under 35 U.S.C. §119(e) of U.S. Provisional Patent Application No. 60/763,184 filed Jan. 27, 2006, in the name of the present inventor and entitled "A STUD WELDING SYSTEM FOR STRUCTURES INCLUDING A DECK PROCESSING SYSTEM AND METHOD OF PROCESSING STRUCTURAL DECK".

STATEMENT REGARDING FEDERALLY SPONSORED RESEARCH

Not Applicable.

BACKGROUND OF THE DISCLOSURE

This disclosure relates to a system and method which deposits deck material on a beam structure, processes the deck material and stud welds shear connectors (known as "studs") onto bare beams or through the deck material to the beam and scientifically analyzes weld parameters, such as time, current, lift and plunge, used during the stud weld process. In particular, the present disclosure relates to a plurality of carts which efficiently deposits the deck material to the beam structure, and welds the studs onto bare beams or through the deck material while analyzing the stud weld at the weld site and while allowing the tradecraft worker to remain standing in an unbent position while working during these processes. The carts of the present disclosure either independently or in combination provide a new way to process deck material, to weld stud shear connectors and to scientifically analyze and report on each welded stud.

The beam structure (FIG. 1) includes beams for construction including but not limited to buildings and bridges. The beam structure may also include girders. The deck material relates to floor decking that is connected to the appropriate beam structure wherein the floor decking is configured to hold poured concrete that eventually forms a floor for the beam structure and eventually for the beam structure's intended use such as a building floor. Typically, the floor decking comprises a metal deck having sequential peaks and valleys.

During construction of a building, structural steel beams are first set into place and bolted together to create a framework, or skeleton, for the desired structure. In laying the floor decking, an operator lifts bundles of metal deck sheets to the workers and places the bundles on top of the bare beams or girders, wherein each bundle is approximately two to three feet wide and ten to thirty feet long. Multiple workers then break the bundle of metal deck sheets, pick up one sheet of metal deck and start walking across the open areas of the framework to lay the sheet of metal deck onto the beam. Workers then lay additional metal sheets across the beams and manually "puddle" weld the metal decks to the beams to create the form for the later poured concrete floor. The "puddle" weld comprises a temporary weld to attach the metal deck to the beams. Typically, the workers laying out the metal deck outpace the workers that are puddle welding the metal deck resulting in workers walking across loose metal deck sheets.

The workers may need to cut the metal deck to fit around certain openings or weld the metal deck to the steel beam. The workers require a tank cart to assist in cutting the metal deck. These tank carts secure and transport the necessary cylinder tanks such as acetylene and oxygen tanks. Due to the peaks and valleys of the metal deck and the configuration of the wheels of the tank cart, the wheels are not uniformly positioned across any one set of peaks and valleys. As such, the worker has to tilt the tank cart (typically 150-300 lbs.) toward him/her and move the unbalanced weight caused by the wheels being on different planes of the metal deck floor. As the worker pulls the weld cart perpendicular to the peaks and valleys of the metal deck, a constant up and down jarring force applies to the weld cart and/or the worker. This force can lead to unsafe working conditions such as injured backs or toppled cylinders. To compensate for the awkward moving of the cart, the worker may choose to add costly extension hose to the cart in order to limit movement of the cylinders. The additional hose is expensive, costly to repair and may provide a trip hazard. Damaged hoses may also warrant expensive fines from safety organizations.

Once the worker welds the metal deck to the beam or girder, the metal deck hides the location of the center of the actual underlying beam or girder. The welded deck also hides the condition of the top flange, or weld base of the steel, which may be covered with rust, mill scale, over spray and even paint, which are weld contaminates and are not allowed under standards of the American Welding Society. The applied deck also provides an area for moisture, water, snow and possibly ice to collect, these environmental effects also being contaminates not allowed by the American Welding Society. The workers laying the deck and the workers cutting the deck to fit and the workers puddle welding the deck typically complete a large area of hundreds if not thousands of square feet of deck before the workers begin stud welding the deck. In order to find the optimum stud weld area, which is the center of the beam or girder, the worker may then have to deform the deck in two directions to profile the location of the underlying and invisible beam. As shown in FIG. 2, the worker bends over and applies a hammer to deform the metal floor deck. Although the metal floor deck has been specifically designed to safely support a load, the worker physically deforms this designed metal deck to locate the beam.

Based on the deformation of the deck, the worker then lays a chalk line that represents the center of the underlying beam and the optimum location on the beam to weld the desired number of stud shear connectors. After the worker marks the underlying beam, the worker dispenses ferrules in the valley of the deck, along the chalk line on top of the deck by bending over to individually deposit each ferrule. At the same time while bent over the work surface, the worker properly orientates the ferrule in the valley of the floor deck. This process is repeated to place each stud, while bent over, and then to move the stud welding equipment in-place and to weld each stud. All of this is performed from the bent over position while attempting to walk safely across the corrugated floor deck which may typically have a mere five inches wide high and a seven inches wide valley. The valley is two inches to three inches below the high or peak of the deck.

During construction, the shear connector studs are commonly used to improve shear strength in concrete slabs of the structural framework. The studs transfer horizontal shear from steel beam to concrete slab, causing them to act as one. Greater strength and stiffness increase live load capacity so that as much as thirty-five percent less steel may be used to build the structural framework.

The studs can be welded directly to the beam of the structure or can be welded through the metal deck that is connected to the underlying beam or girder of the structure. An arc welding process, such as drawn arc welding, is often used to make these weld connections. Stud welding is an accepted form of electric arc welding in which a stud welding system welds the studs to the base structural components (i.e., through the metal deck and in contact with the beam). During this stud welding process, the stud gun generates an electric arc between the stud and the base metal component and that arc is automatically timed and the current is controlled at the welding power source in order to melt the end of the stud and a portion of the base metal component, i.e., metal deck or beam/girders. The amount of lift (the optimum distance the gun draws the stud back during the weld process to receive the perfect arc), the proper weld current, the length of time the current is being drawn and the plunge (how much stud is melted and how far the stud travels into the weld zone) are all critical measurements in order to receive a 100% cross sectional and a AWS approved weld.

During the welding process, the ferrule shields the arc as the arc combines the molten components of the stud and base metal component. The ferrules concentrate weld heat between the stud and the work surface and contain the molten pool of melted metal around the base of the stud. As such, the ceramic ferrules play a critical role in weld quality by shielding the arc, confining molten metal and minimizing oxidation of the weld. As the arc shuts off, the stud is plunged into the molten components by springs of the stud gun, and the weld is formed as it cools.

After positioning the ferrules, the worker must bend over at each ferrule to place and orientate a stud shear connector to be picked up by the worker doing the welding at a later time. The same stud shear connector will again be picked up by the same worker or another worker during the stud welding process and loaded into the stud gun. But first, the worker must place the welding gun and cables near each ferrule and stud and pick up the stud lying on the floor and load it into the gun. The worker will then place the loaded stud into the ferrule. The worker then welds each stud to the top flange of the underlying bare beam or through the deck material while remaining in the bent position. This process results in repeated bending over to dispense ferrules and studs, move the equipment, load the stud into the weld gun and to stud weld the stud to the bare beam or through the floor deck. As such, this process is extremely time-consuming and physically demanding. While bent over and welding, the worker's face is in a close proximity to weld gases caused by welding galvanized material and hot weld splatter that may easily extend twenty-four inches from the weld zone.

Although ferrule applicators may reduce the physical stress of placing the ferrules, the worker's back is still subjected to repeated physical stress of placing each stud at the weld site, moving the equipment and cables to each weld site and welding each stud to the bare beam or through the floor deck. As the process is physically demanding, the weld may not be a quality weld due to operator movement during the weld, resulting in error at the weld zone. Additionally, as shown in FIG. 2a, workers weld ¾" diameter studs next to ⅝" diameter puddle welds, in many if not all instances, leading to duplication in labor, time and equipment to puddle weld and then subsequently stud weld the floor decking.

As shown in FIG. 3, the worker bends outside of the safety fence in order to access the ferrule and to stud weld the stud through the floor deck. The National Safety Counsel reports that back injuries are the number one occupational safety hazard in the United States. Back injuries are also the number one reason for worker compensation claims and usually the most costly per incident. Furthermore, as shown, tools, cables, hoses and wires are positioned on the floor deck in an unsafe manner. The unsuspecting worker, who is already hanging outside of the safety cable, is unaware of the recently created trip hazard at the perimeter of the building.

Presently, a method of testing the studs is to destructively bend test a sample stud and ring test the other studs. Both methods are non-scientific and subject to an individual's interpretation. Additionally, there is no present method in practice or of scientific value to check "puddle welds" or "deck welds" for securing the metal deck to the top flange of the beam or girder. These stud tests (or in the case of no tests for deck welds) do not scientifically check each weld at the weld site in real time. The "bend" and "ring" tests comprise the worker hitting the welded stud with a hammer to look for damage to the weld zone and to listen for a particular tone. Although there are presently time/current analyzers built into transformers of some high-end welders, these welder are typically 50' to 300' from the weld site. These welders provide the worker the results of time and current for each weld at the transformer on the ground floor, but because the results are not displayed at the weld site, which is possibly hundreds of feet away from the transformer, they are of no "real time" or value added benefit.

At the end of the day a report may be generated regarding time and current for each stud, but since the studs are not numbered, the report will merely tell you of the time and current of each weld and the number of suspect welds "somewhere" on the deck. Since the worker and his equipment have moved on, there is no real value added by present time/current analyzers. Additionally, there is no current method for scientifically reading the four critical parameters of time, current, lift and plunge of the weld, during the weld and immediately reporting the results to the worker, in real time, at the weld zone so the worker may verify the quality of the weld and test the stud if the weld is reported outside of desired weld parameters.

Engineers, however, design the beam structure and deck material for proper loading and design configurations. The use of stud shear connectors eliminates 20%-35% of the normally required steel. Once the designed beam structure and metal deck are set/positioned/supported, workers, however, physically deform these designed beam structures and metal decks in order to find the center of the hidden beam in order to obtain the optimum welding location. The physical determinations, however, for locating the underlying beam and for testing the welded stud damage the properly designed beam structures and metal deck.

Accordingly, current deck processing procedures are in need of a safe and ergonomic procedure to: transport and position floor decking; transport and position oxygen and acetylene tanks; weld the deck to the beam so that it may be scientifically tested; transport equipment such as stud welders and battery charging equipment for hand tools; eliminate unorganized equipment hoses, wires and cables; weld studs onto bare beams or through the deck material and conduct quality control tests for the welded studs in real time and at the weld site.

BRIEF SUMMARY OF THE DISCLOSURE

The present disclosure relates to a plurality of carts which efficiently deposits the deck material to the beam structure, processes the deck material, eliminates the need for puddle welding 50% to 100% of the time, provides a battery charging station for hand tools and welds the studs onto bare beams or through the deck material while analyzing the stud weld at the weld site and while allowing the tradecraft worker to remain standing in an unbent position while working during these processes. The deck, utility and weld carts comprise a housing having at least one arm member extending beyond the housing. The deck cart further comprises a picking assembly operatively connected to the arm assembly, wherein the picking assembly has a picking means configured to removably pick a piece of the floor decking and place the deck in its desired location. The deck, utility and weld carts further connect with a wheel assembly. The wheel assembly has an array of wheels forming a predetermined pattern of wheels positioned under the cart wherein at any given instant of time a number of the wheels contact peaks of the floor decking and while other wheels extend over and free from contacting the valleys such that the cart uniformly traverses the floor decking.

The present disclosure relates to a method of stud welding. During operation, workers uniformly traverse the weld cart across the floor decking by contacting a plurality of wheels of the cart with a plurality of peaks of the floor decking. The workers then load a plurality of studs into a chute of the cart. The loaded chute, by using the force of gravity, discharges the lead stud of the plurality of studs into a stud catcher that is connected to an external side of the cart. Another worker moves an arm assembly having a stud gun to a position over the discharged stud and grabs the discharged lead stud with the stud gun. Once the lead stud is removed, gravity forces the next stud into the catcher, taking the first stud or removed stud's place and enabling the newly discharged stud ready to be removed from the stud catcher at the workers choosing.

Moving the stud gun and respective stud via the arm assembly to a welding location, the worker while remaining in a standing position activates the stud gun by pressing a trigger switch to weld the stud at the welding location. Upon activation of the stud gun's trigger switch, an analyzer measures the time, current, lift and plunge of each weld during the weld and immediately reports the welds results at the end of the weld in the form of a display. This information may also be downloaded to a lap top computer for further and varied reporting at any time.

Real time, scientific testing, via the analyzer, allows for each weld to be scientifically sampled, reported, verified and tested if the weld is outside of desired parameters while the worker and equipment are present. This testing improves the quality control reporting for the engineer since the engineer has removed up to 35% of the steel and must make rely on the stud weld quality to make up for this lack of steel mass. Additionally, the uniform mobility of the carts via the wheel assemblies, allows the worker to efficiently stud weld recently deposited deck sheets, this stud welding eliminating the need for extra steps of providing the puddle welds.

DETAILED DESCRIPTION OF DRAWINGS

In the accompanying drawings which form part of the specification:

FIG. 8 is a plan view of a wheel assembly constructed in accordance with and embodying the present disclosure and further illustrating an array of wheels;

FIG. 9 is a plan view of another wheel assembly constructed in accordance with and embodying the present disclosure and further illustrating another array of wheels;

FIGS. 9a-9e are plan views of the wheel assembly of FIG. 9 uniformly traversing floor decking;

FIG. 11b is an overhead plan view of the deck cart of FIG. 11a;

Figure 7:
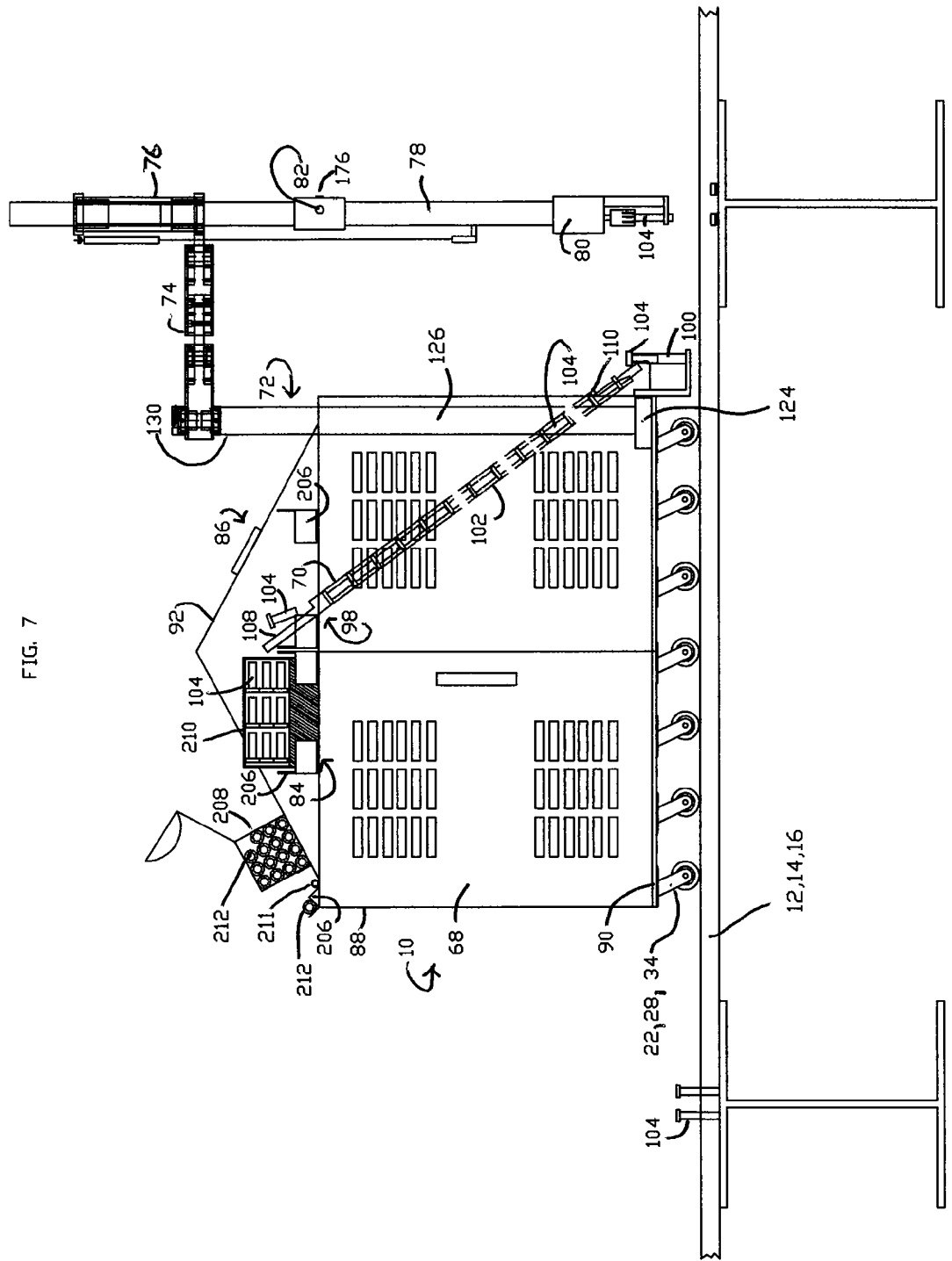
FIG. 7 is front elevational view of a weld cart and wheel assembly constructed in accordance with and embodying the present disclosure, the cart and wheel assembly shown positioned on floor decking in which the floor decking is shown from the side view and the beam or girder is shown from the end view.
Figure 13:
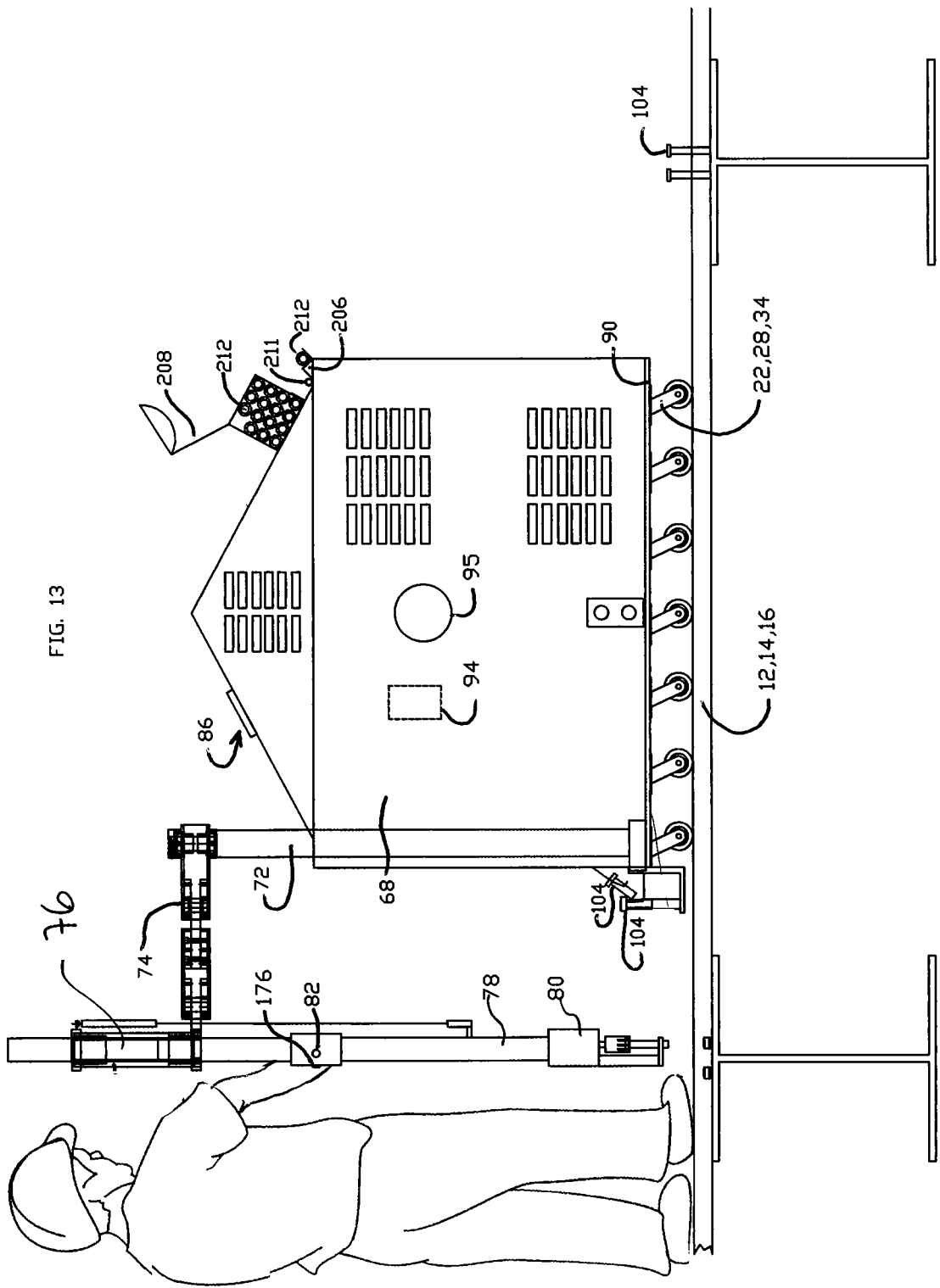
Figure 17B:
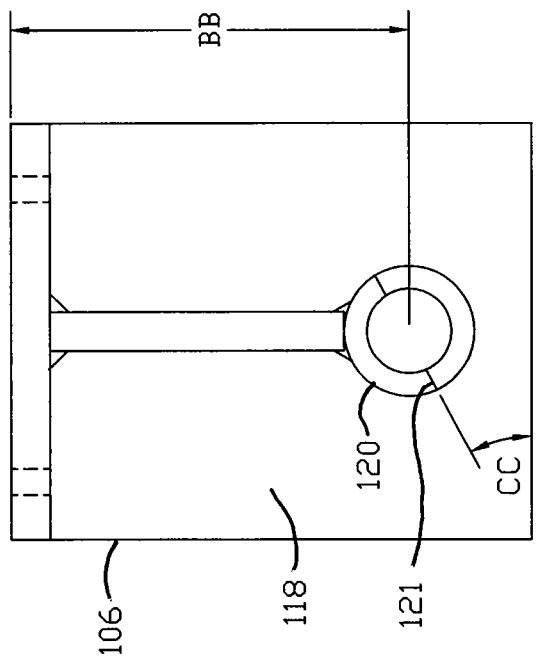
Figure 17A:
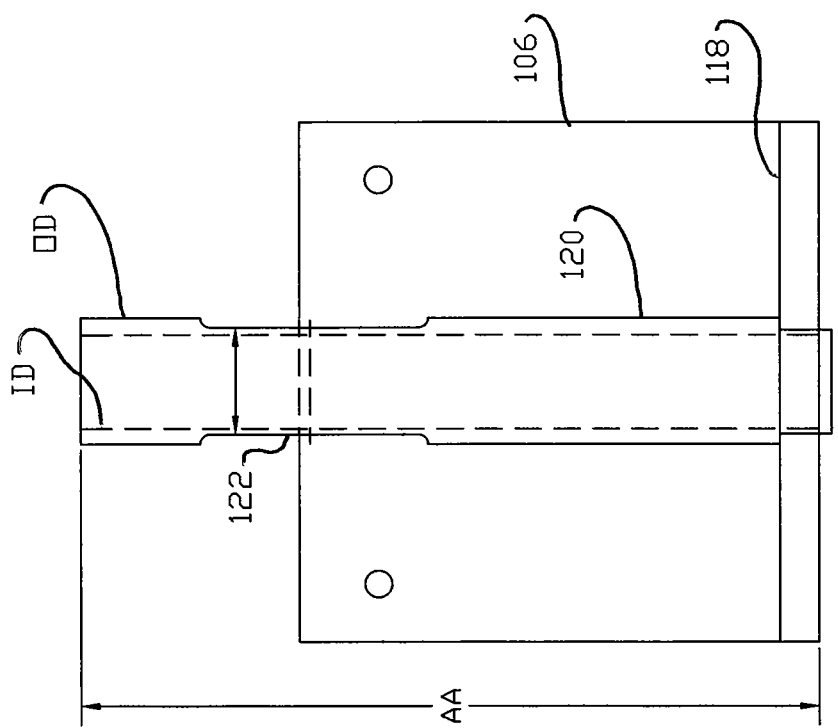
Figure 19:
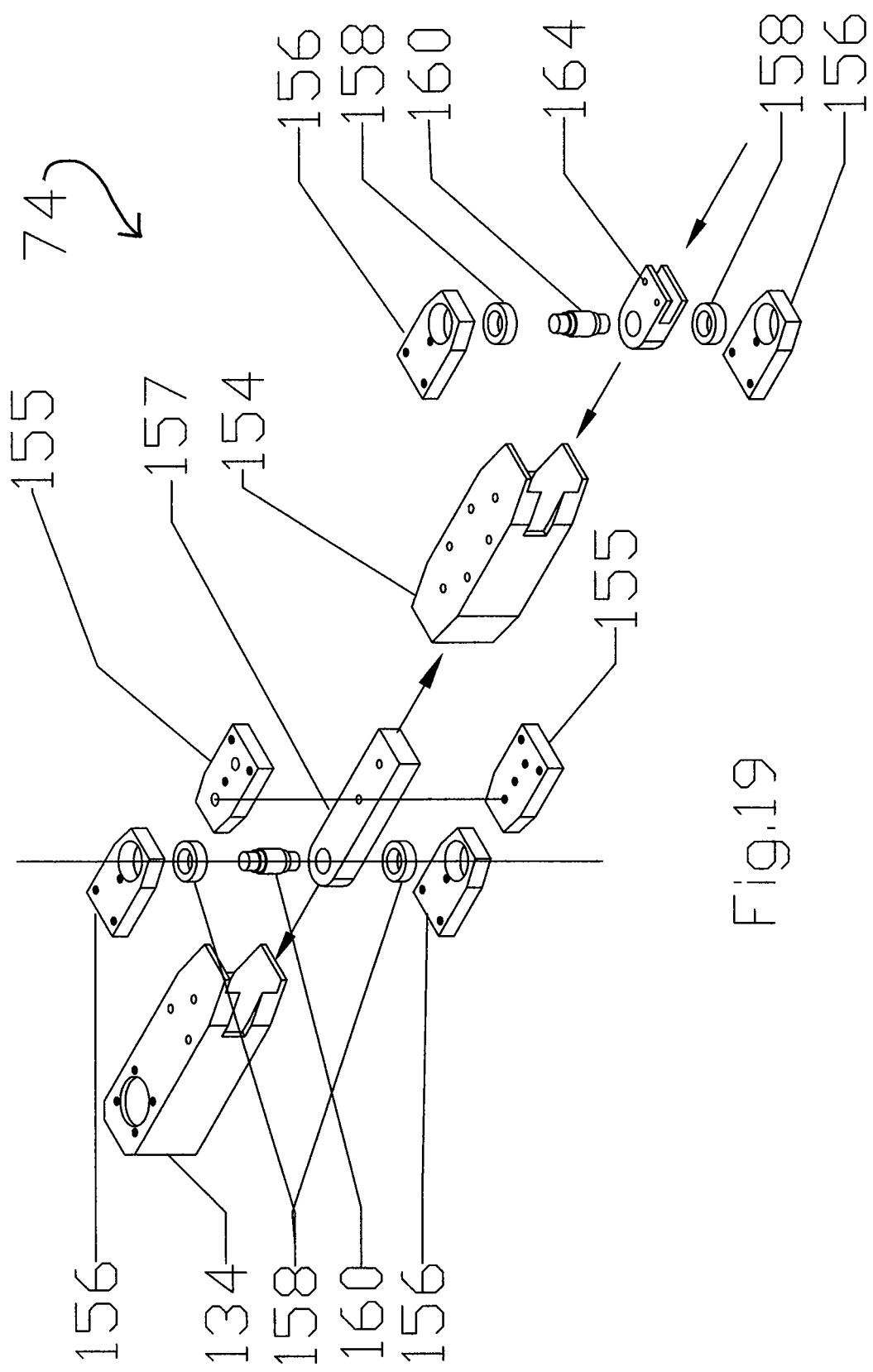
Figure 21A:
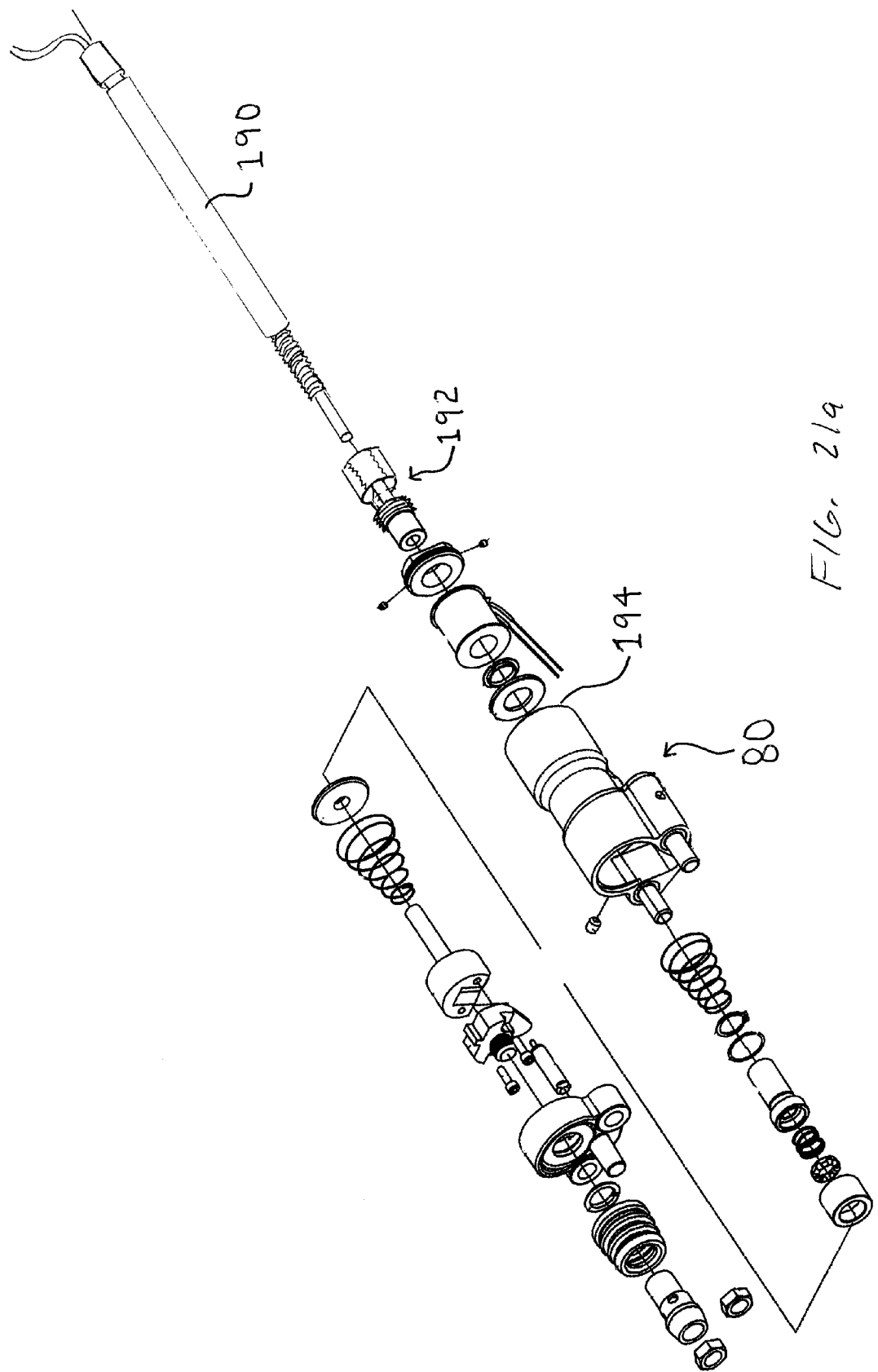
Figure 21B:
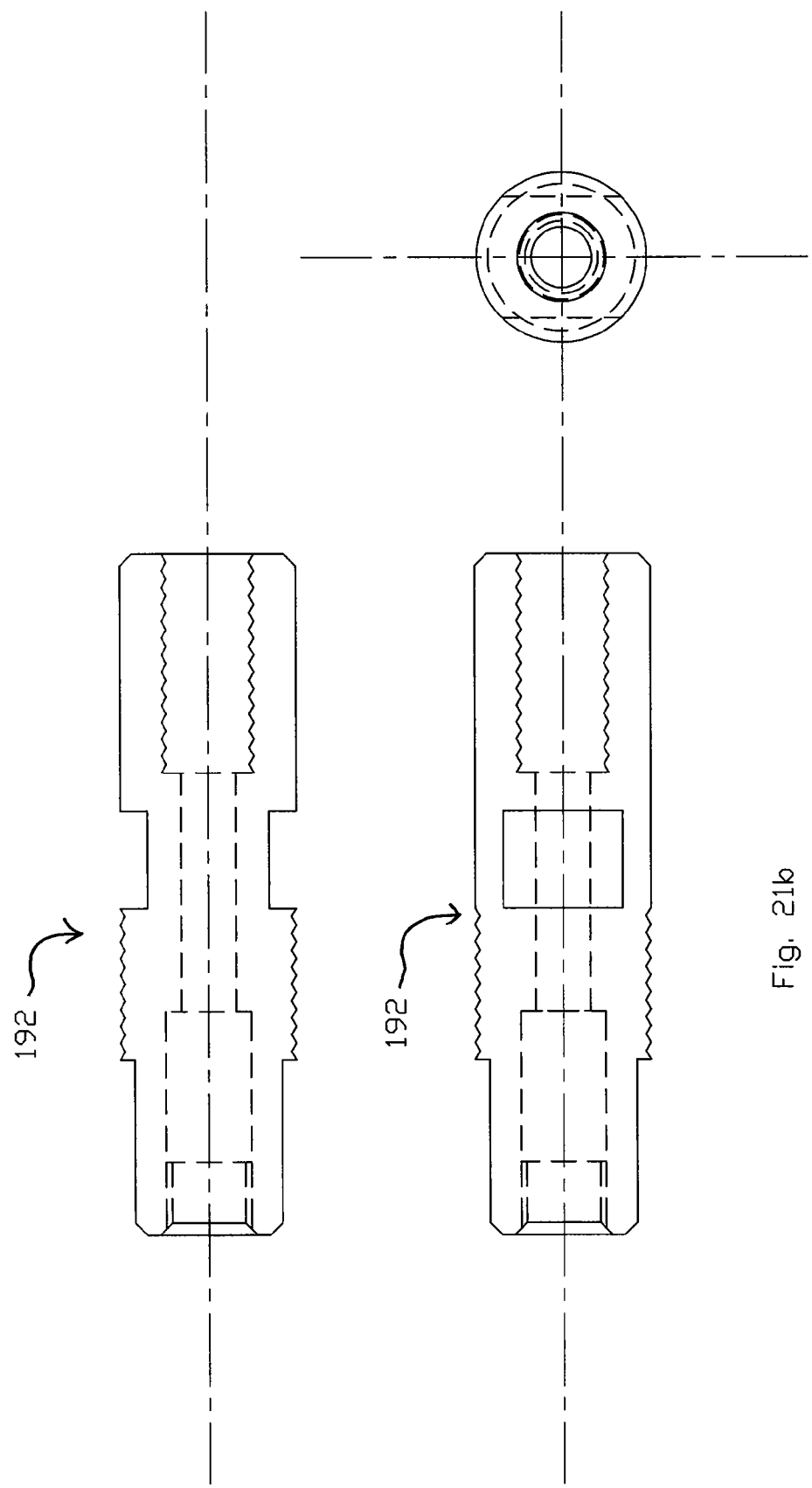
Figure 22:
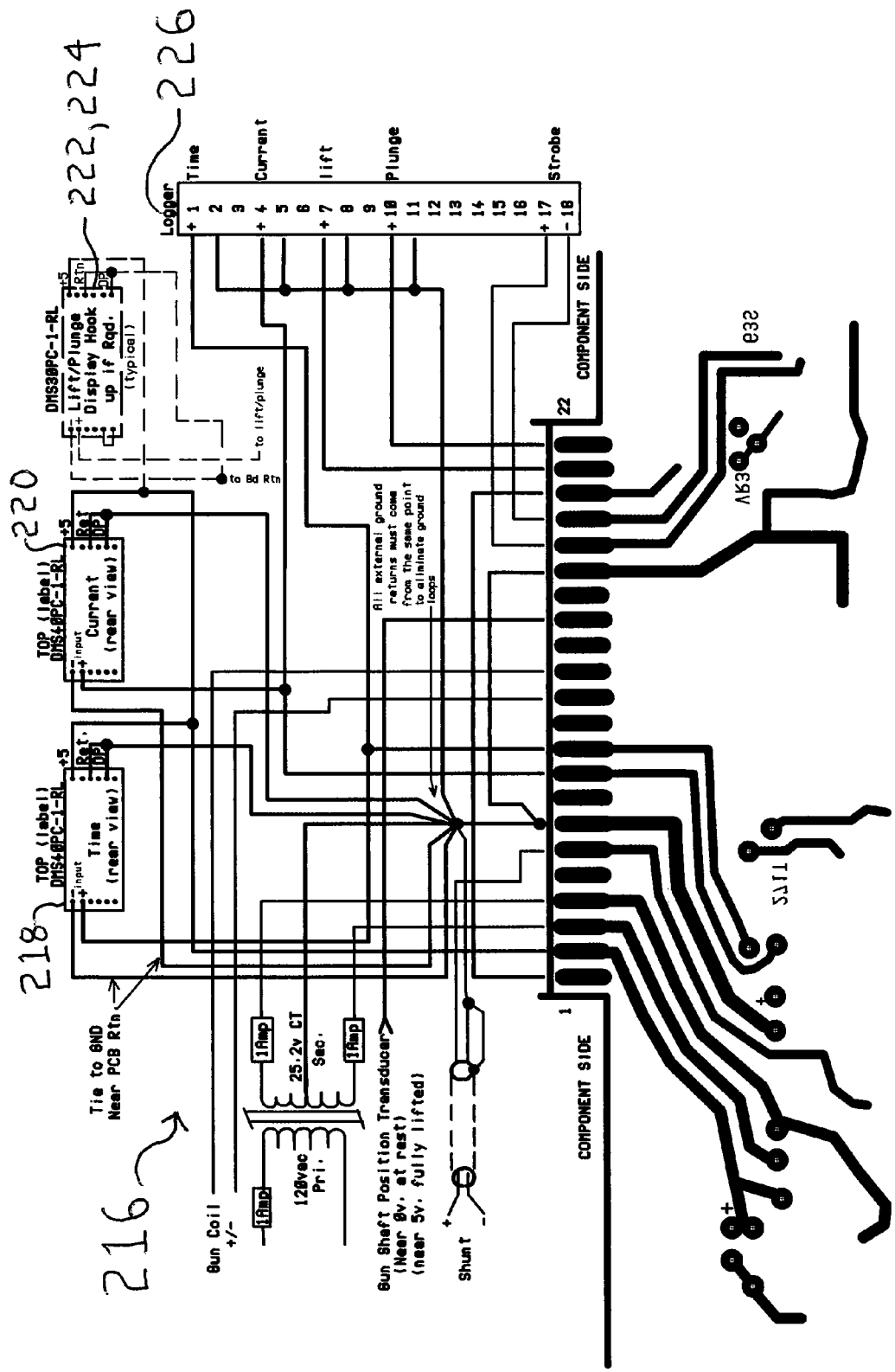
Figure 23:
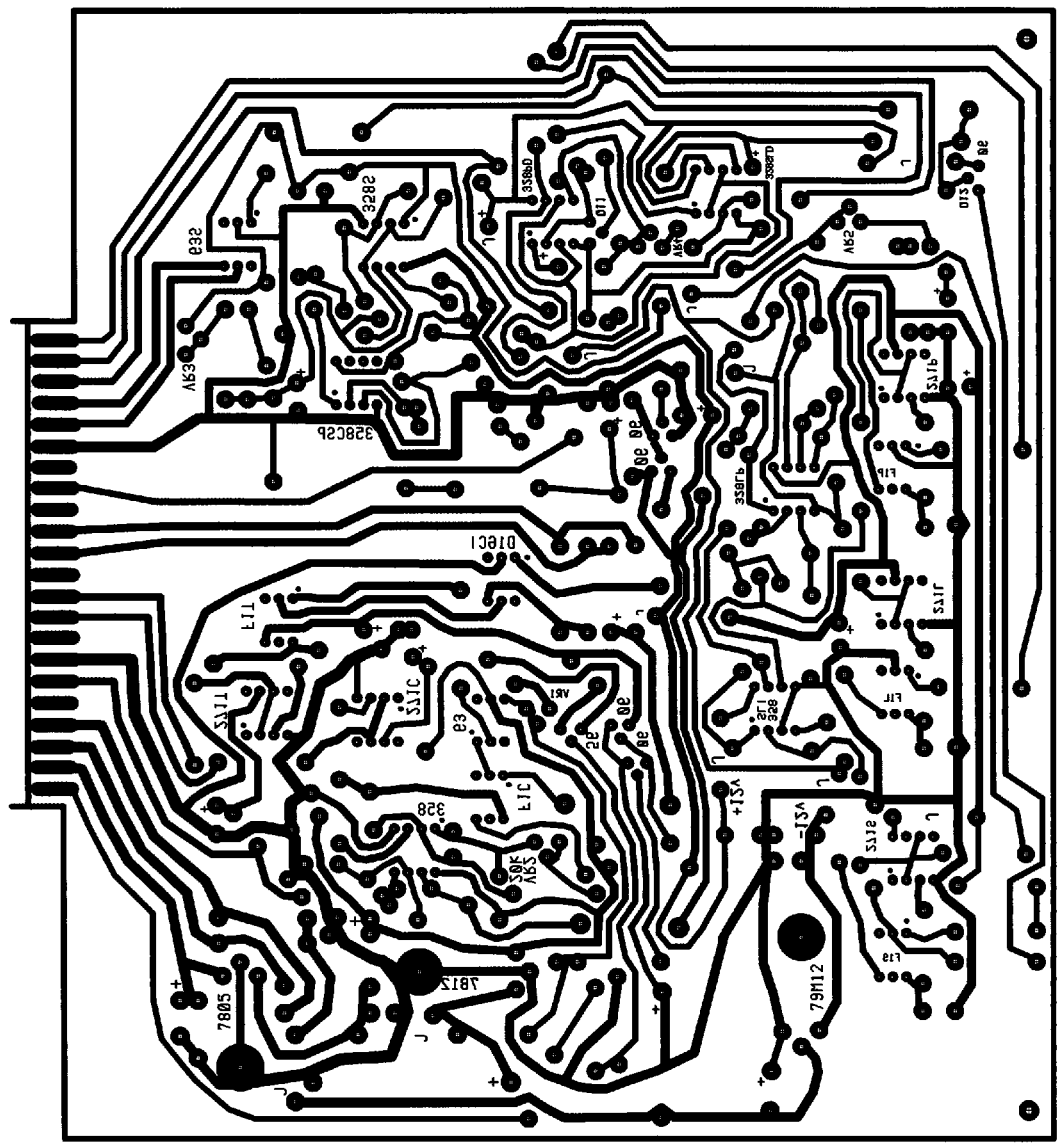
Figure 24:
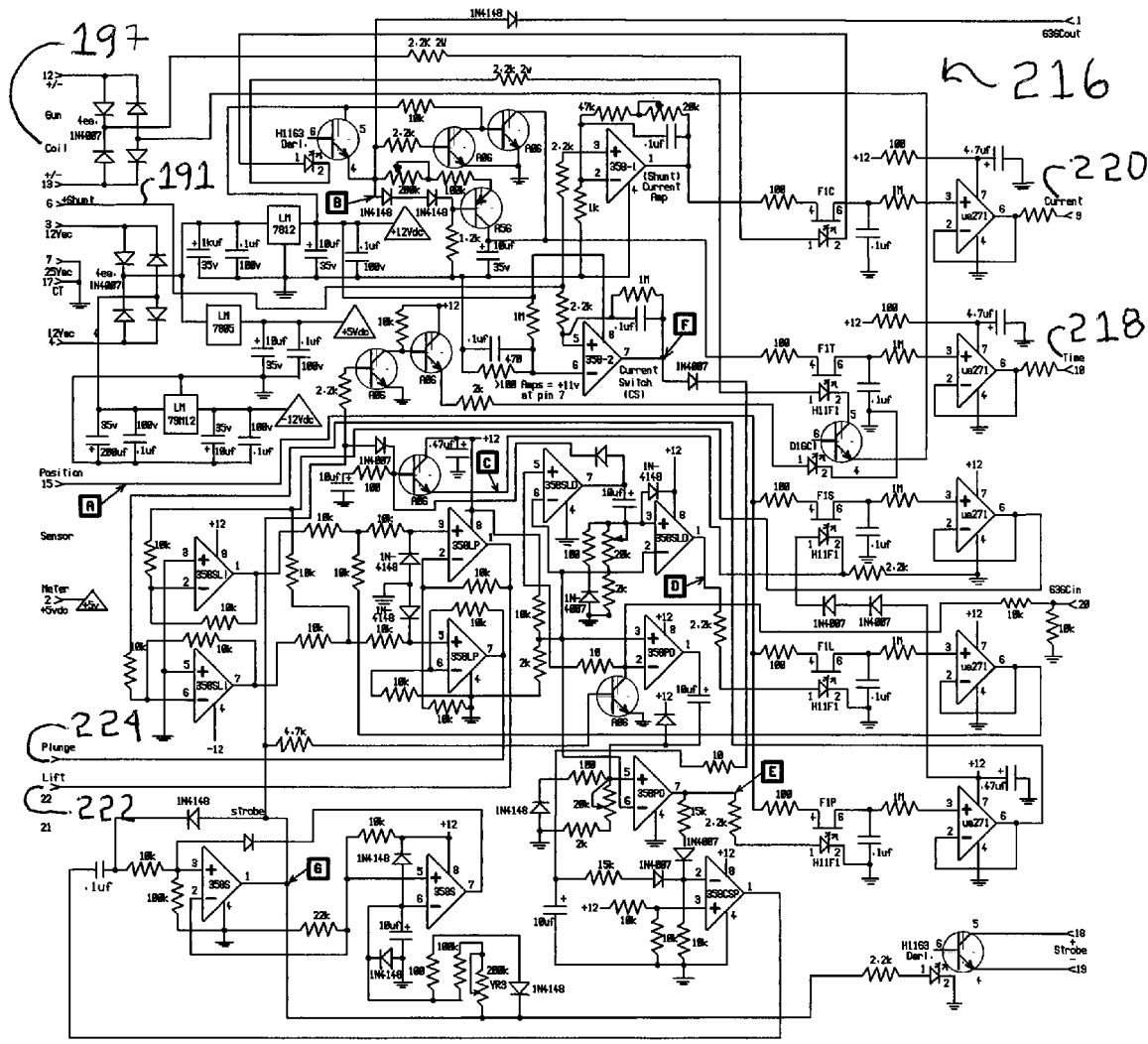

FIG. 12 is a side elevational view of the weld cart and wheel assembly of FIG. 7 positioned on top of an end view of the floor decking with a side view of an underlying beam or girder and further illustrating a worker in a standing position moving the weld cart with an extended stud gun in the direction of desired travel from welded studs to previously placed ferrules which are ready for stud placement and welding;

FIG. 13 is a rear elevational view of FIG. 12 showing the standing worker preparing to stud weld the stud through the floor decking in the direction of travel on the present beam line and also shows a previous beam line with welded studs;

FIGS. 14a through 14e illustrate views of the weld cart of FIG. 7;

FIG. 15a illustrates a side elevational view of a chute of the weld cart of FIG. 7;

FIG. 15b is a plan view of the chute of 15a;

FIG. 16a illustrates a side elevational view of another chute of the weld cart of FIG. 7;

FIG. 16b is a plan view of the chute of 16a;

FIG. 17a is a side elevational view of a stud catcher of the weld cart of FIG. 7;

FIG. 17b is a plan view of the stud catcher of FIG. 17a;

FIG. 17c is a partial side view of the stud catcher of FIG. 17a;

FIG. 18 is an exploded view of a tower assembly of the weld cart of FIG. 7;

FIG. 19 illustrates an exploded view of a moveable arm assembly of the weld cart of FIG. 7;

FIG. 20 illustrates an exploded view of an extension assembly of the weld cart of FIG. 7;

FIG. 21a is an exploded view of a stud gun of the weld cart of FIG. 7;

FIG. 21b are side and plan views of an adjustable rear core and transducer connector of the stud gun of FIG. 21a;

FIG. 22 illustrates a wiring diagram of the electrical components of an analyzer having a time circuit, a current circuit, a lift circuit and a plunge circuit of the weld cart of FIG. 7;

FIG. 23 illustrates a printed circuit view of the time circuit, the current circuit, the lift circuit and the plunge circuit; and FIG. 24 illustrates an electrical schematic of the time/current and lift/plunge analyzer.

Corresponding reference characters indicate corresponding parts throughout the several views of the drawings.

DESCRIPTION OF THE DISCLOSURE

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

Figure 1:
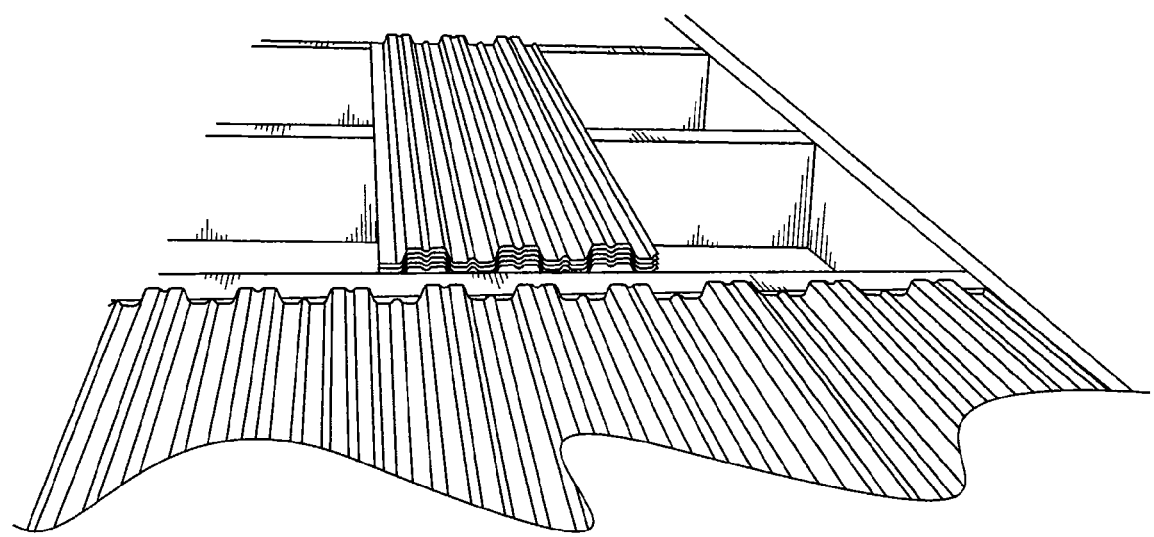
FIG. 1 is a partial perspective view of a structure illustrating exposed beams and floor decking positioned on top of some of the beams.
Figure 2:
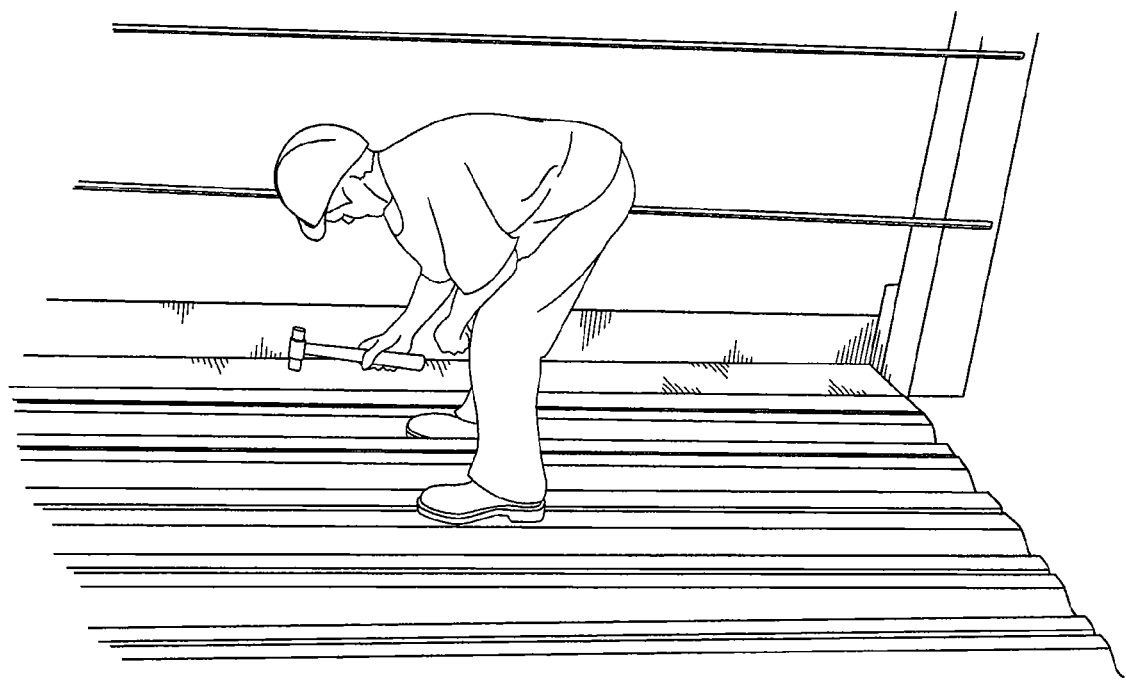
FIG. 2 is a perspective view of a worker bending over to deform the floor decking in order to locate the underlying beam.
Figure 2A:
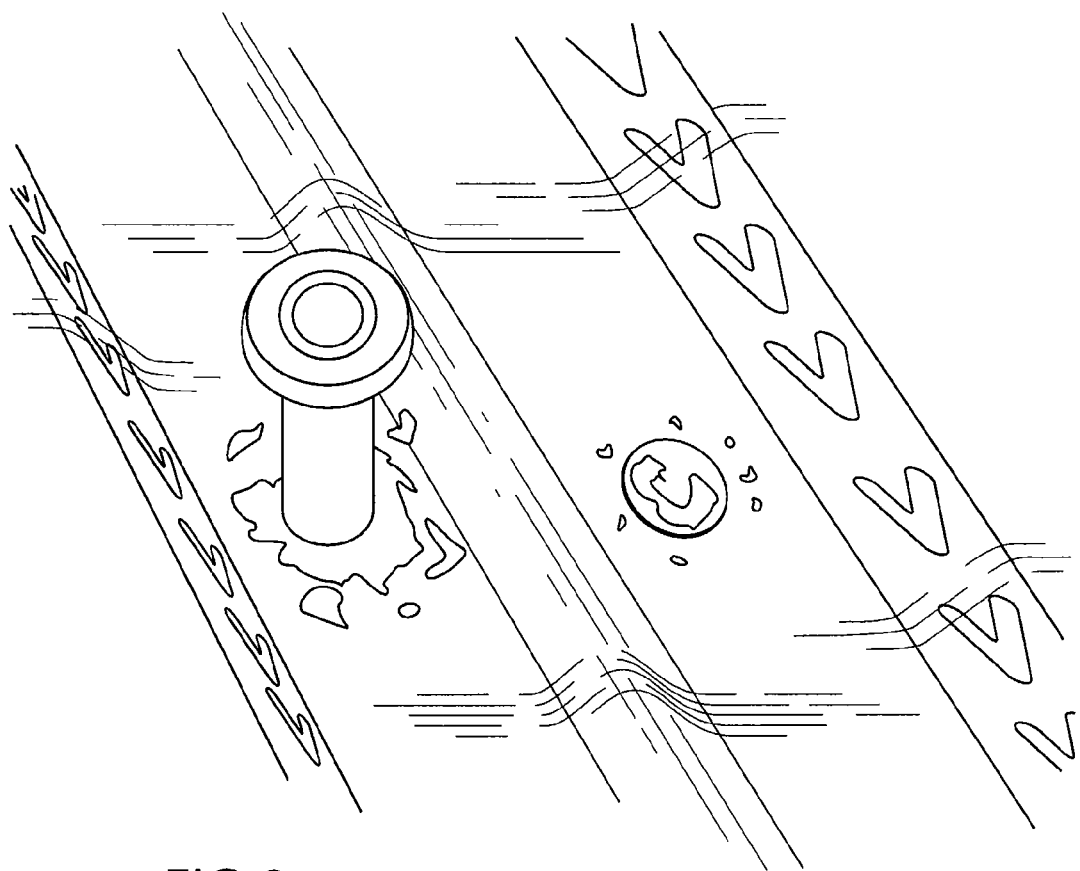
FIG. 2a is a perspective view of a stud weld positioned next to a puddle weld.
Figure 3:
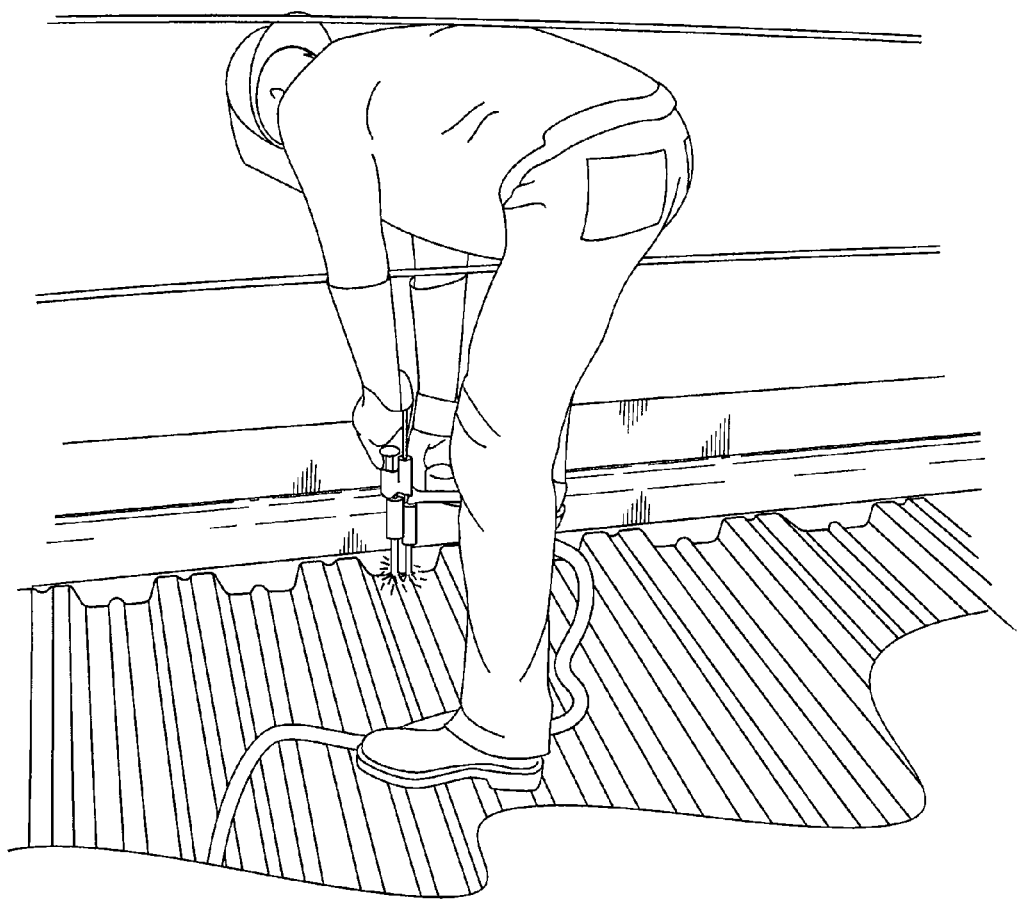
FIG. 3 is a perspective view of a bent over worker stud welding a stud through the floor decking while dangerously extending their body beyond the safety cable.
Figure 4:
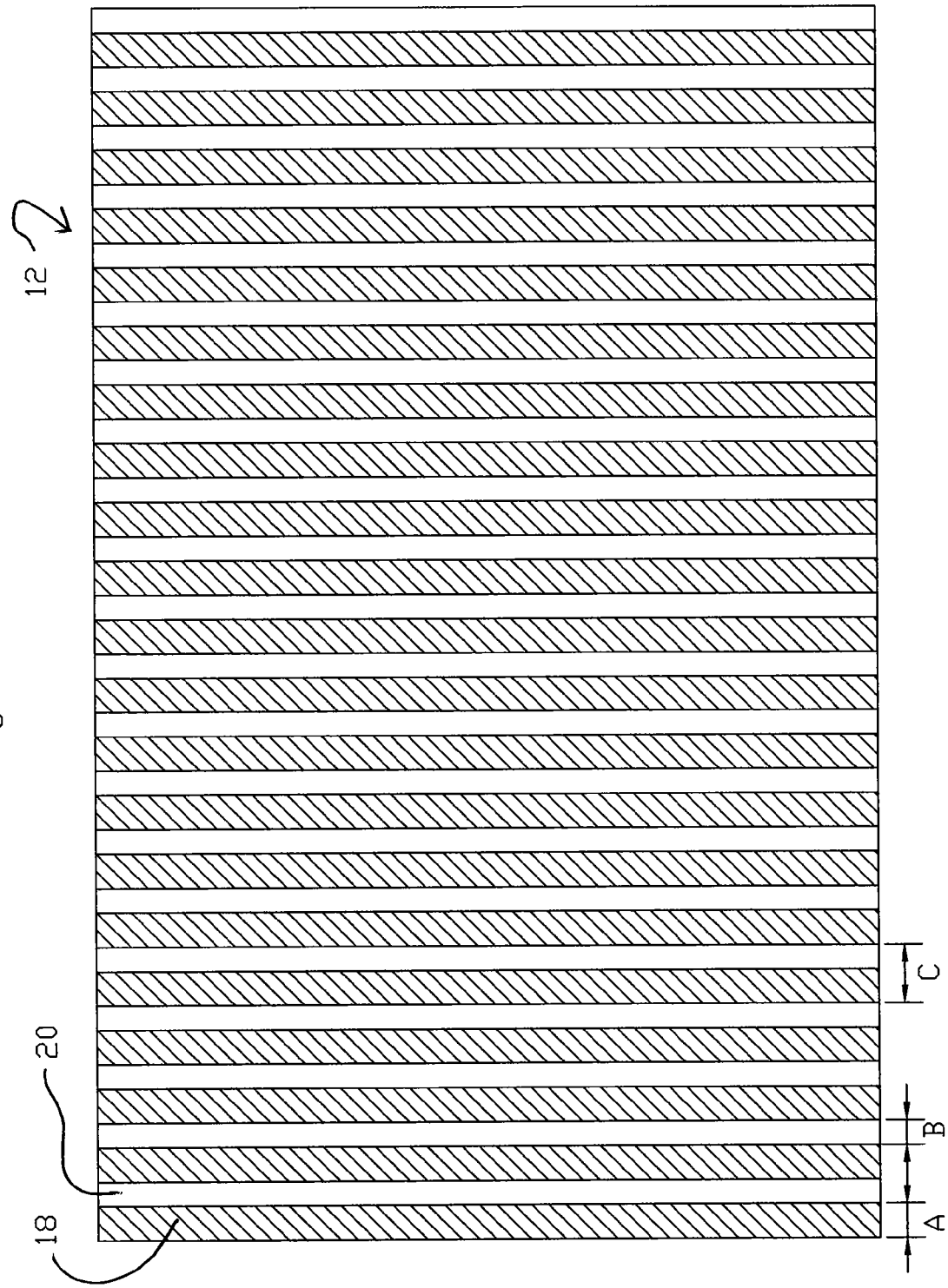
FIG. 4 is a plan view of a portion of a floor decking illustrating sequential peaks and valleys.
Figure 5:
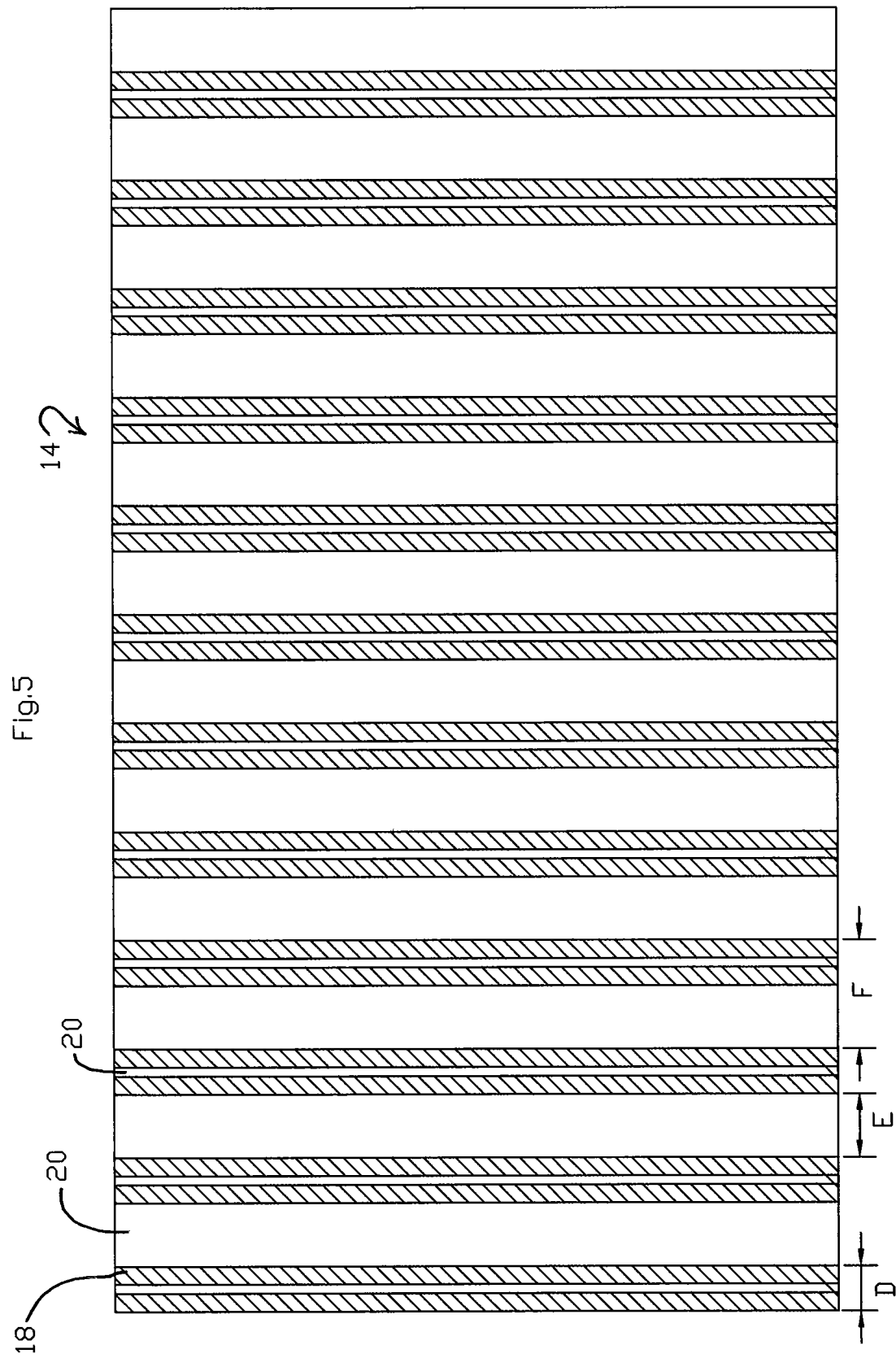
FIG. 5 is a plan view of another floor decking showing sequential peaks and valleys.
Figure 6:
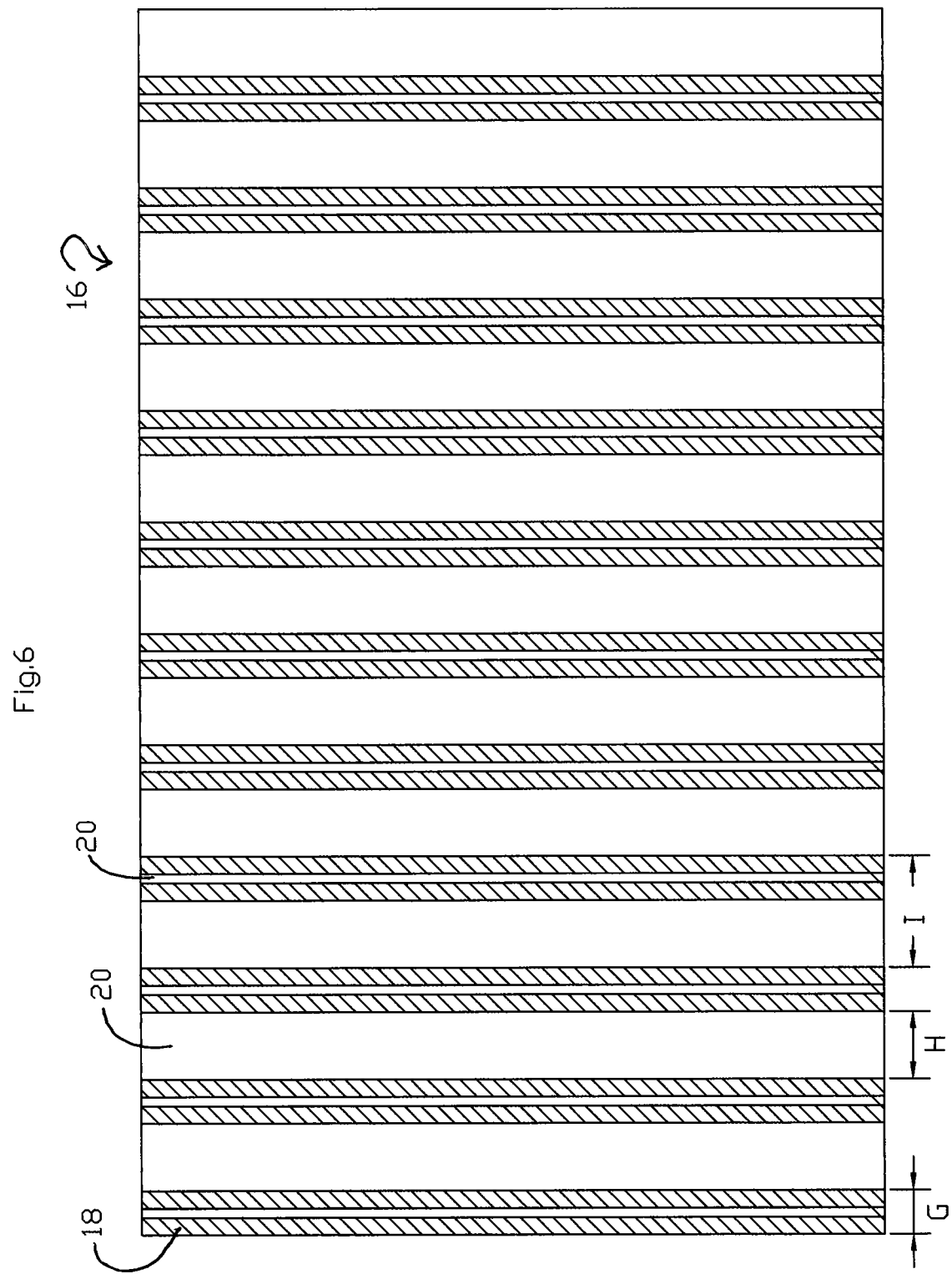
FIG. 6 is a plan view of another floor decking illustrating sequential peaks and valleys.

Referring to the drawings, the present disclosure relates to a cart 10 (FIG. 7) that uniformly traverses a floor decking used in construction of a structure such as a building or a bridge. The floor decking may comprise a variety of configurations 12, 14, 16 (FIGS. 4-6). Each configuration of the floor decking, however, has sequential peaks and valleys. Each configuration of the floor decking may comprise standard gauge metal decking such 16 gauge, 18 gauge and 20 gauge steel as rated by the American Institute of Steel Construction. In one embodiment, the floor decking comprises a metal deck used as a form for concrete pouring.

Turning to FIG. 4, floor decking 12 includes a plurality of sequential peaks 18 and valleys 20. As shown, each peak 18 has a width denoted as "A" while each valley 20 has a width denoted as "B". Accordingly, each pair of peaks 18 and valleys 20 has a combined width denoted as "C". In one embodiment, width "A" has a measurement range of about three to four inches. Additionally, in an embodiment, width "B" has a measurement range of about two to three inches. In an embodiment, width "C" has a measurement range of about five to seven inches. In another embodiment, width "A" has a measurement of about three and a half inches and width "B" has a measurement of about two and a half inches.

Turning to FIG. 5, floor decking 14 also includes a plurality of sequential peaks 18 and valleys 20. As shown, each peak 18 has a width denoted as "D" while each valley 20 has a width denoted as "E". Accordingly, each pair of peaks 8 and valleys 20 has a combined width denoted as "F". In an embodiment, width "D" has a measurement range of about four to six inches. Additionally, in an embodiment, width "E" has a measurement range of six to eight inches. In an embodiment, width "F" has a measurement range from about ten to fourteen inches. In another embodiment, width "D" has a measurement of about five inches and width "E" has a measurement range of about seven to seven and a half inches. As shown, each peak 18 has a small valley 20 known as a dimple positioned about half way within the peak 18.

Turning to FIG. 6, floor decking 16 includes another plurality of sequential peaks 18 and valleys 20. As shown, each peak 18 has a width denoted as "G" while each valley 20 has a width denoted as "H". Accordingly, each pair of peaks 18 and valleys 20 has a combined width denoted as "I". In an embodiment, width "G" has a measurement range of about four to six inches. Additionally, in an embodiment, width "H" has a measurement range of about six to eight inches. In an embodiment, width "Z" has a measurement range of about ten to fourteen inches. In another embodiment, width "G" has a measurement of about four and three quarter inches and width "H" has a measurement of about seven and a quarter inches. As shown, each peak 18 includes the dimple valley positioned about half way within the peak.

As shown in FIG. 7, a wheel assembly generally shown as 22 connects to the cart 10. The wheel assembly 22 is sized and shaped to uniformly traverse at least floor deckings 12, 14, 16 (FIGS. 4-6). Turning to FIG. 8, the wheel assembly 22 comprises a base 24 connected to a bottom of the cart 10 (FIG. 7). The base 24 has a length and width denoted as "J". In an embodiment, the length and width denoted as "J" has a measurement of about forty inches. The wheel assembly 22 has an array of wheels 26 that a predetermined pattern of wheels 26 positioned under the cart 10. In an embodiment, the predetermined pattern comprises rows and columns of wheels 26. As shown in FIG. 8, the wheel assembly 22 may comprise five rows and five columns of wheels 26 wherein centerlines of outer rows and columns are distanced from the edge of the base as denoted by distance "K". In an embodiment, distance "K" has a measurement of about three to about five inches.

Centerlines of rows are positioned at distance denoted as "L". In an embodiment, distance "L" has a measurement of about seven and a half inches. Centerlines of columns are positioned at a distance denoted as "M". In an embodiment, distance "M" has a measurement of about seven and a half inches. Further, as shown in FIG. 8, wheels 26 of adjacent rows are laterally offset from each other and wheels 26 of adjacent columns are longitudinally offset from each other. The offset distances as measured from the centerlines of the respective rows and columns are denoted as "N". In an embodiment, distance N has a measurement of about two to three inches.

The spatial relationship of the array of wheels 26 allows wheel assembly 22 to uniformly traverse the floor decking 12 of FIG. 4, i.e., the floor decking 12 with peaks 18 having widths of about three and a half inches with the corresponding valleys 20 having widths of about two and a half inches. In particular, at any instant of time, a number of the wheels 26 of the predetermined pattern contact a plurality of the peaks 18 while other wheels 26 extend over a plurality of valleys 20 of the floor decking 12. The spatial relationship of the array of wheels 26 positions non-contacting wheels 26 over to valleys 20 such that the cart 10 uniformly traverses the floor decking 12. In other words, the wheels 26 contacting the peaks 18 prevent the non-contacting wheels 26 from entering any valley 20.

Figure 9E:
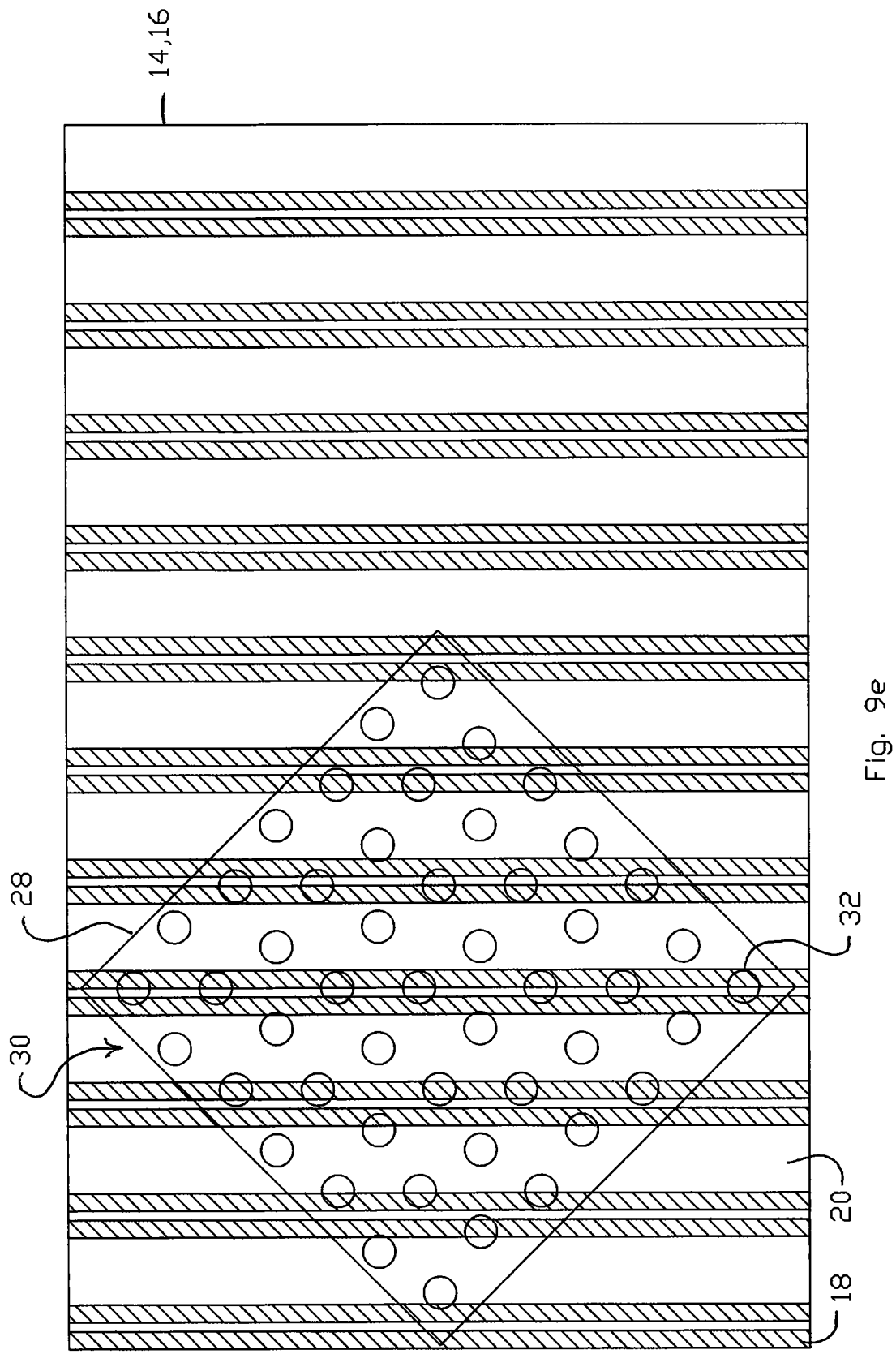

Turning to FIG. 9, another wheel assembly generally shown as 28 comprises a base 30 connected to a bottom of the cart 10 (FIG. 7). Base 30 has a length and width denoted as "O". In an embodiment, the length and width denoted as "O" has a measurement of about fifty-five inches. The wheel assembly 28 has an array of wheels 32 that form a predetermined pattern of wheels 32 positioned under the cart 10. In an embodiment, the predetermined pattern comprises rows and columns of wheels 32. As shown in FIG. 9, the wheel assembly 28 may comprise seven rows and seven columns of wheels 32.

Centerlines of rows are positioned at distance denoted as "P". In an embodiment, distance "P" has a measurement of about seven and three-quarter inches. Centerlines of the columns are also positioned at a distance denoted as "Q". In an embodiment, distance "Q" has a measurement of about seven and three-quarter inches. The distances for the centerlines of the first row and the last row and for the centerlines of the first column and the last column are denoted as "R". In an embodiment, distance "R" has a measurement of about forty-six inches.

Further as shown in FIG. 9, adjacent rows of wheels 32 are laterally offset from each other and adjacent columns of wheels 32 are longitudinally offset from each other. The offset distances as measured from the centerlines of the respective rows and columns are denoted as "S". In an embodiment, distance "S" has a measurement of about one to two inches.

The spatial relationship of the array of wheels 32 allows wheel assembly 28 to uniformly traverse floor decking 12 of: FIG. 4, i.e., the floor decking 12 with peaks 18 having widths of about three and a half inches while the corresponding valleys 20 have widths of about two and a half inches; FIG. 5, i.e., floor decking 14 with peaks 18 having widths of about five inches with the corresponding valleys 20 having widths of about seven and one half inches and FIG. 6, i.e., floor decking 16 with peaks 18 having widths of about four and three quarter inches with valleys 20 having widths of about seven and a quarter inches.

In particular, at any instant of time for the wheel assembly 34, a number of the wheels 32 of the predetermined pattern contact a plurality of the peaks 18 while other wheels extend over a plurality of valleys 20 of at least floor decking 12, 14, and 16. The spatial relationship of the array of wheels 32 positions non-contacting wheels 32 over the valleys 20 such that the cart 10 uniformly traverses at least floor decking 12, 14, and 16. In other words, wheels 32 contacting peaks 18 prevent non-contacting wheels 32 from entering any valley 20. FIGS. 9a-9e illustrates wheel assembly 28 incrementally and uniformly traversing floor deckings 14,16. As shown, a number of wheels 32 extend and suspend over the valleys 20.

Figure 10:
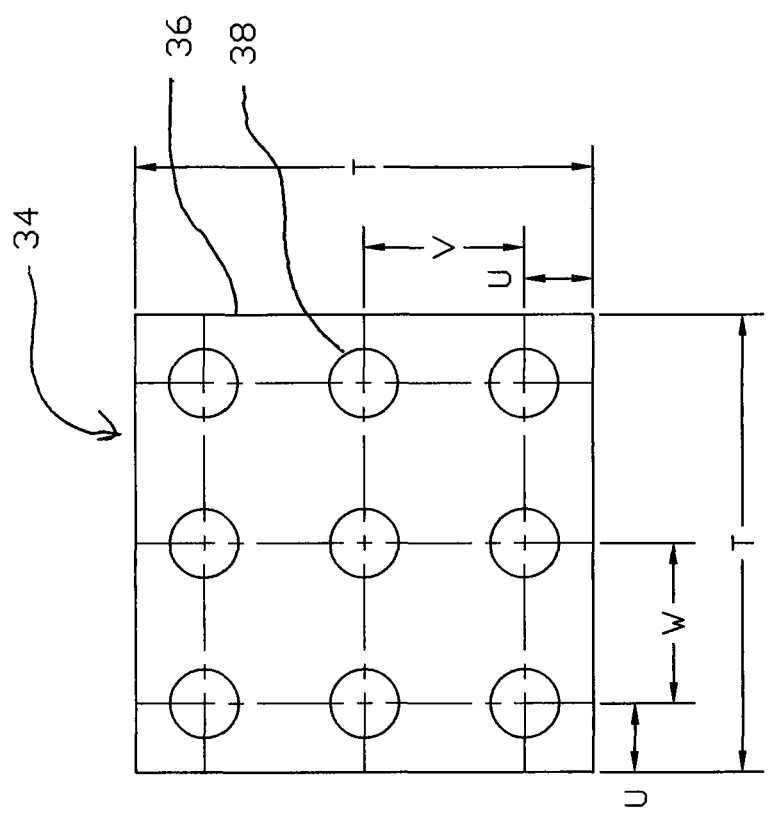
FIG. 10 is a plan view of another wheel assembly constructed in accordance with and embodying the present disclosure and further illustrating another array of wheels.

Turning to FIG. 10, another wheel assembly generally shown as 34 comprises a base 36 connected to a bottom of the cart 10 (FIG. 7). Base 36 has a length and width denoted as "T". In an embodiment, the length and width denoted as "T" has a measurement of about forty inches. The wheel assembly 34 has an array of wheels 38 that form a predetermined pattern of wheels positioned under the cart 10. In an embodiment, the predetermined pattern comprises rows and columns of wheels 38. As shown in FIG. 10, the wheel assembly 34 may comprise three rows and three columns of wheels 38 wherein centerlines of outer rows and columns are distanced from the edge of the base as denoted by distance "U". In an embodiment, distance "U" has a measurement of about six inches.

Centerlines of rows with respect to each other are positioned at distance denoted as "V". In an embodiment, distance "V" has a measurement of about fourteen inches. Centerlines of columns with respect to each other are positioned at a distance denoted as "W". In an embodiment, this distance "W" has a measurement of about fourteen inches.

The spatial relationship of the array of wheels 38 allows wheel assembly 34 to uniformly traverse floor decking (not shown) used in bridge construction. The bridge decking typically comprises plywood (a peak) positioned adjacent and between girders (valleys). The girders have a variety of depths and widths depending on the location and the use of the girder. Depending on the width of the adjacent girders, the plywood (peak) has a variety of widths. At any instant of time, a number of the wheels 38 of the rows and columns contact the plywood (peak) of the bridge floor such that the cart 10 uniformly traverses the bridge floor. As the wheel assembly 34 traverses along the plywood (peak), some wheels 38 may extend over the valleys of the girders. The special relationship of the array of wheels 38 position non-contacting wheels 38 over the girder such that the cart 10 uniformly traverses the bridge floor decking. The wheel assembly 34 of FIG. 10 can be used for transporting a welder such as welder known as an "inverter stud" welder.

The wheel assemblies 22, 28, 34 of FIGS. 8-10 may comprise a plurality of wheel sizes. Additionally, the wheel assemblies 22, 28, 34 may comprise a plurality of rows and columns of wheels beyond those illustrations of FIGS. 8-10. For example, as shown in FIG. 10a, an array for wheel assembly generally shown as 28' may comprise straight columns and rows. Wheel assembly 28' comprises a base 30' connected to a bottom of the cart 10 (FIG. 7). Base 30' has a length and width denoted as "O'". In an embodiment, the length and width denoted as "O'" has a measurement of about sixty to about sixty-five inches. The wheel assembly 28' has an array of wheels 32' that form a predetermined pattern of wheels 32' positioned under the cart 10. In an embodiment, the predetermined pattern of wheels 32' comprises rows and columns of wheels 32'. As shown in FIG. 10a, the wheel assembly 28' may comprise eight rows and eight columns.

Centerline of rows and columns are positioned at distance denoted as "P'". In an embodiment, distance "P'" has a measurement of about seven and three-quarter inches. The distances for the centerlines of the first row and the last row and for the centerlines of the first column and the last column are denoted as "R'". In an embodiment, distance "R'". In an embodiment, distance "R'" has a measurement of about fifty-four inches.

Figure 10B:
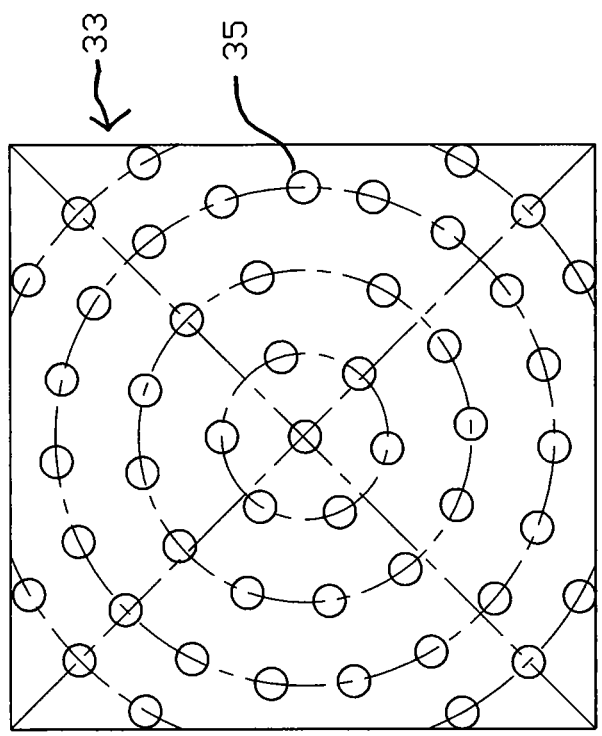
FIG. 10b is a plan view of another wheel assembly constructed in accordance with and embodying the present disclosure.
Figure 10C:
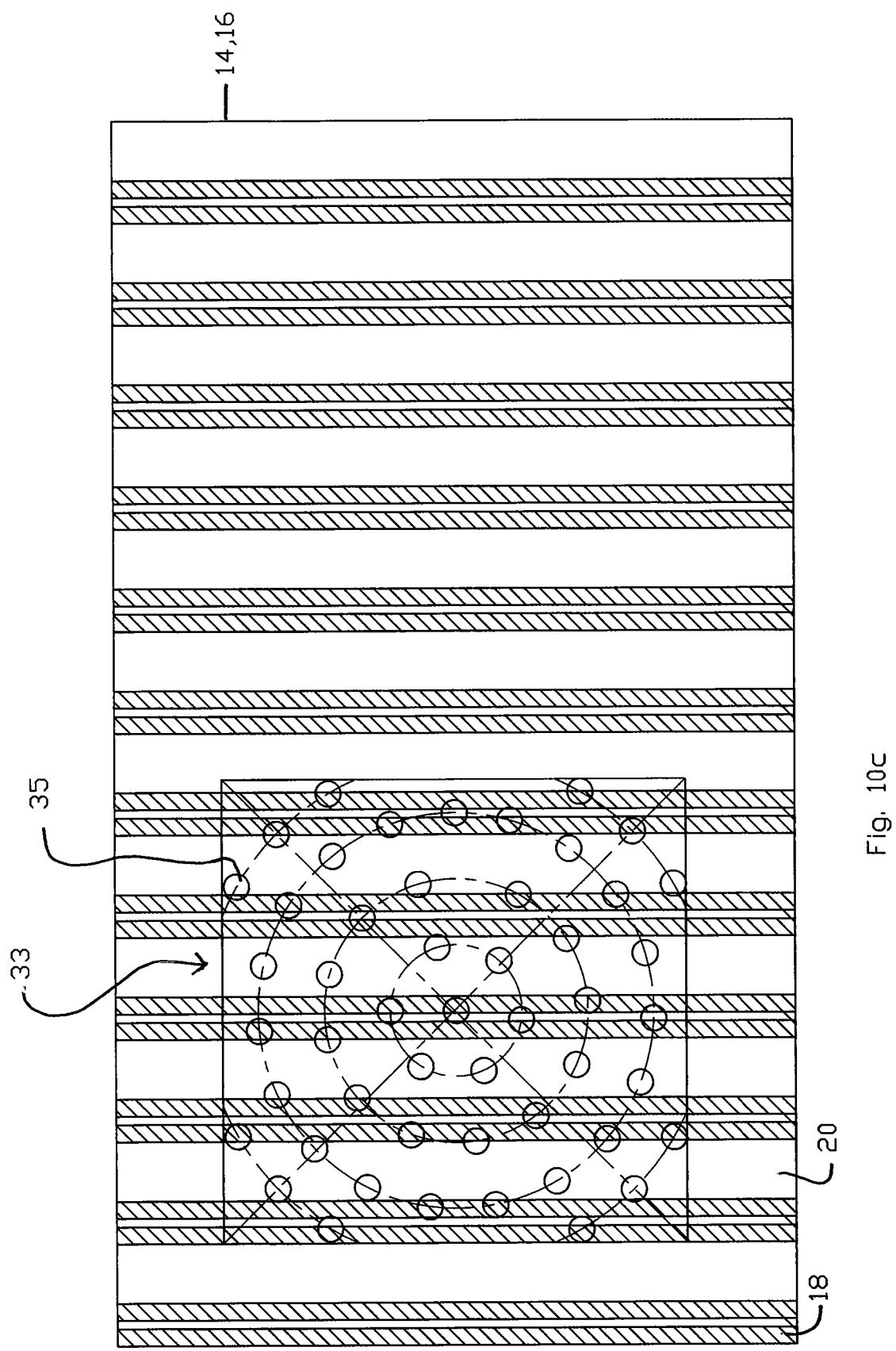
FIGS. 10c-10g are plan views of the wheel assembly of FIG. 10b uniformly traversing floor decking.
Figure 10D:
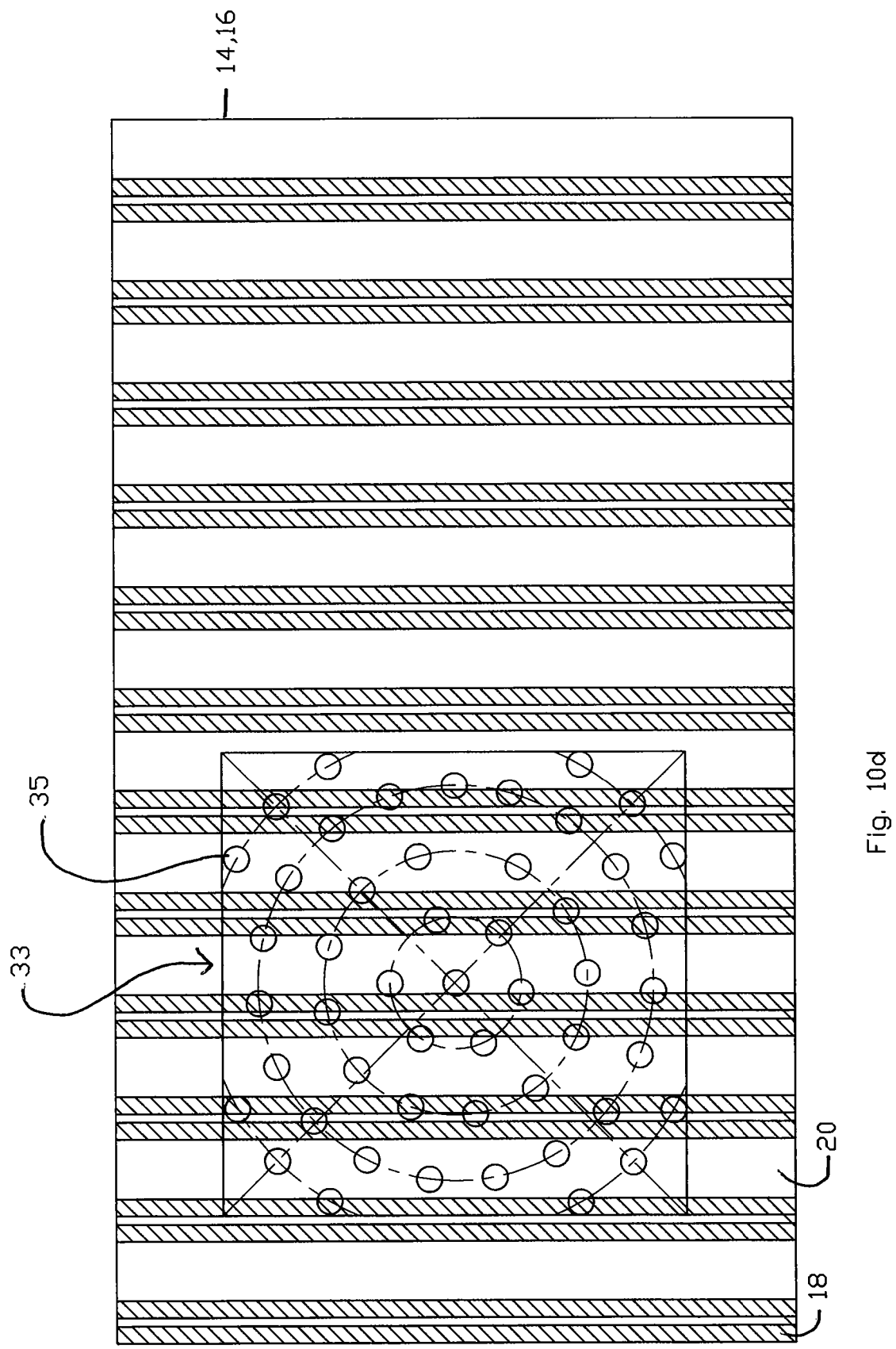
Figure 10E:
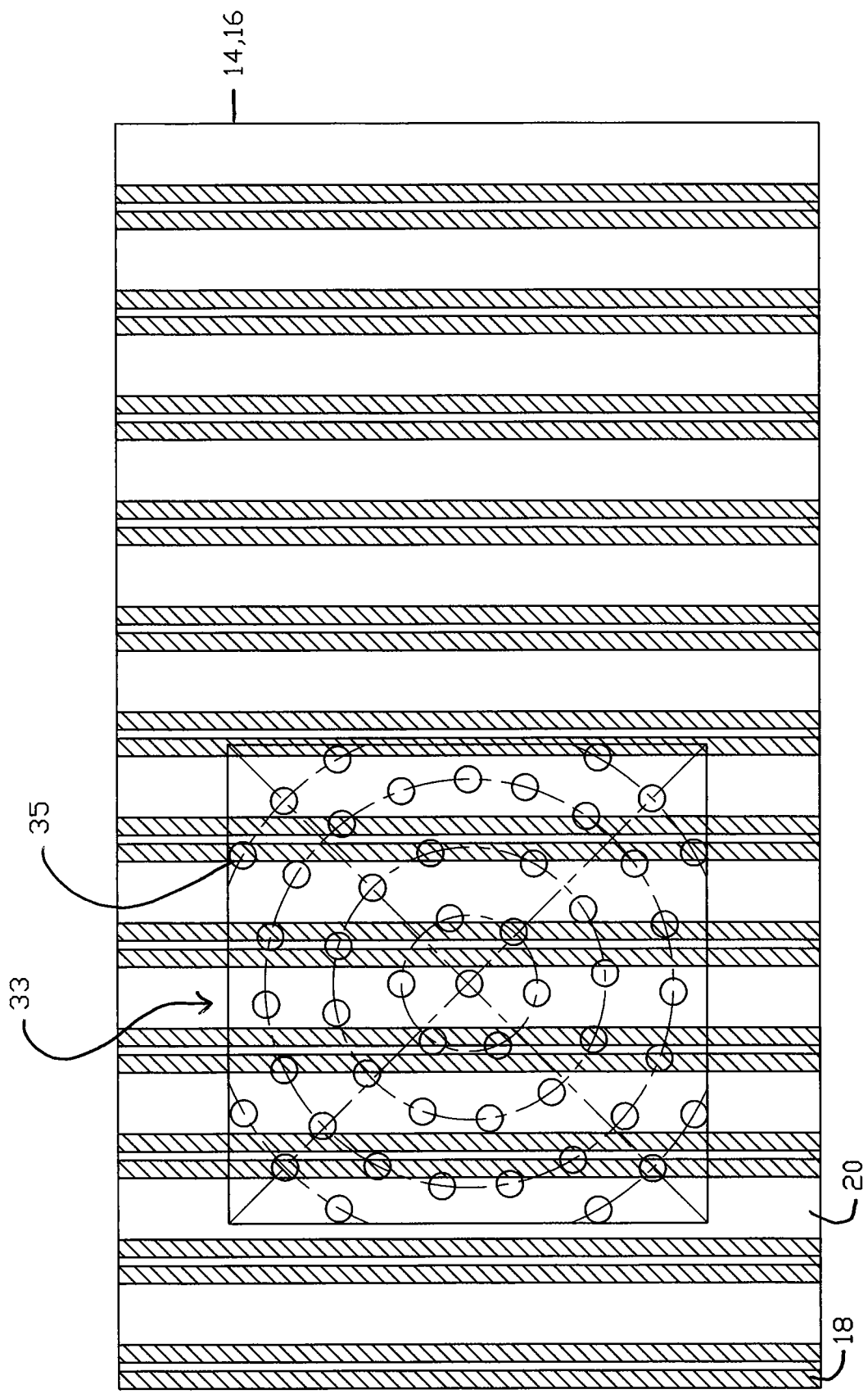
Figure 10F:
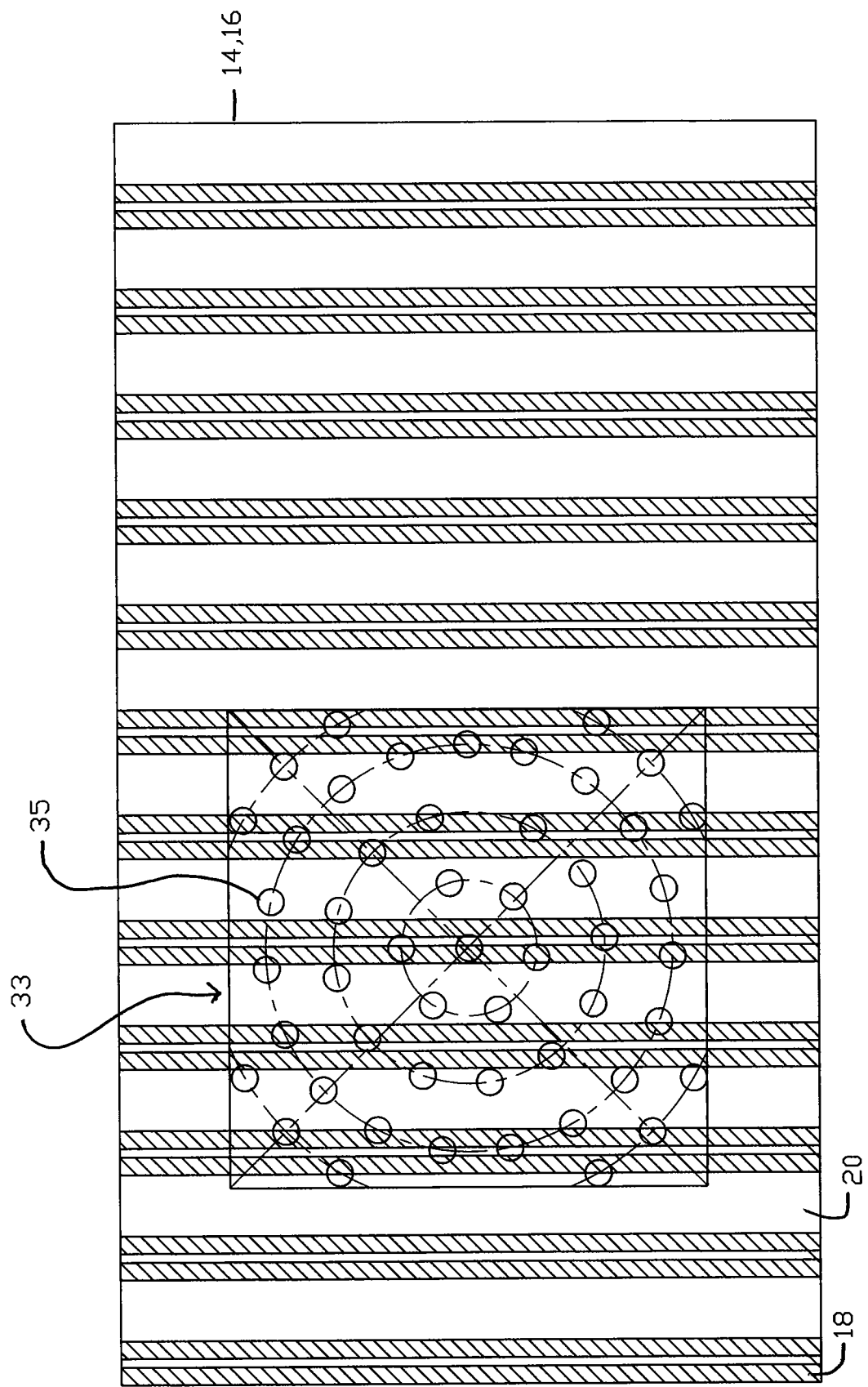
Figure 10G:
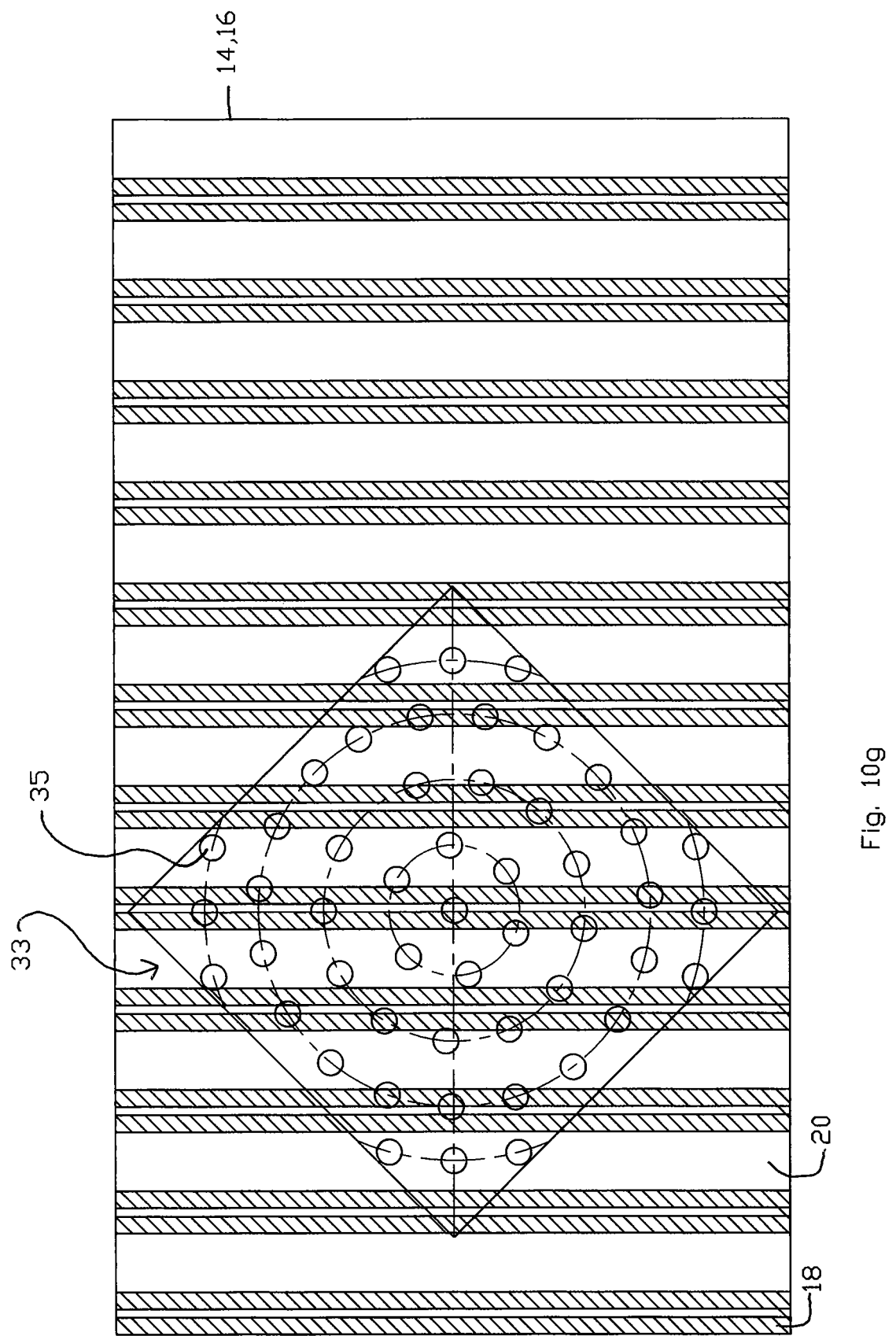

Turning to FIG. 10b, another wheel assembly generally shown as 33 comprises a base connected to a bottom of cart 10 (FIG. 7). The wheel assembly 33 has an array of wheels 35 that a predetermined pattern. As shown, in an embodiment, the predetermined pattern comprises a circular pattern of wheels 35. The predetermined pattern may also comprise other patterns such as but not limited to a spiral pattern, an oval pattern and an elliptical pattern. At any instant of time for the wheel assembly 33, a number of the wheels 35 of the predetermined pattern contact a plurality of the peaks 18 while other wheels extend over a plurality of valleys 20 of at least floor decking 12, 14, and 16. The spatial relationship of the array of wheels 35 positions non-contacting wheels 35 over the valleys 20 such that the cart 10 uniformly traverses at least floor decking 12, 14, and 16. In other words, wheels 35 contacting peaks 18 prevent non-contacting wheels 35 from entering any valley 20. FIGS. 10c-10g illustrates wheel assembly 33 incrementally and uniformly traversing floor deckings 14, 16. As shown, a number of wheels 35 extend and suspend over the valleys 20.

Figure 10H:
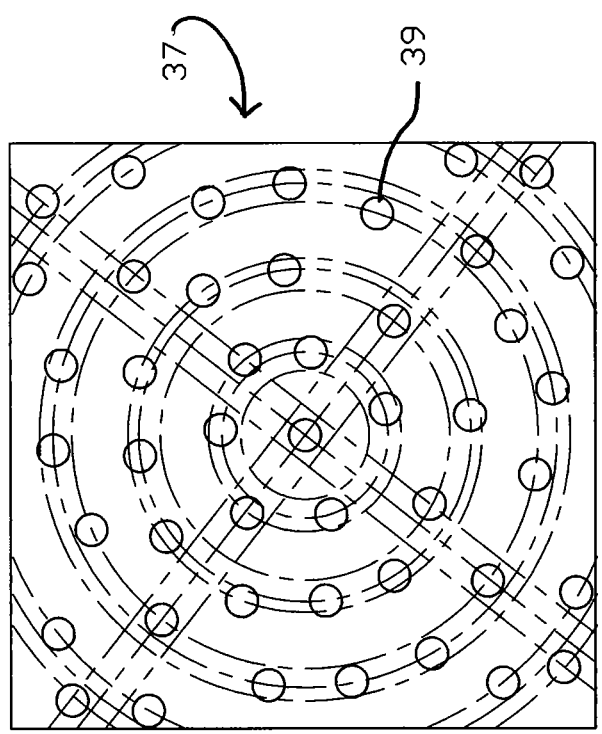
FIG. 10h is a plan view of another wheel assembly constructed in accordance with and embodying the present disclosure.
Figure 10I:
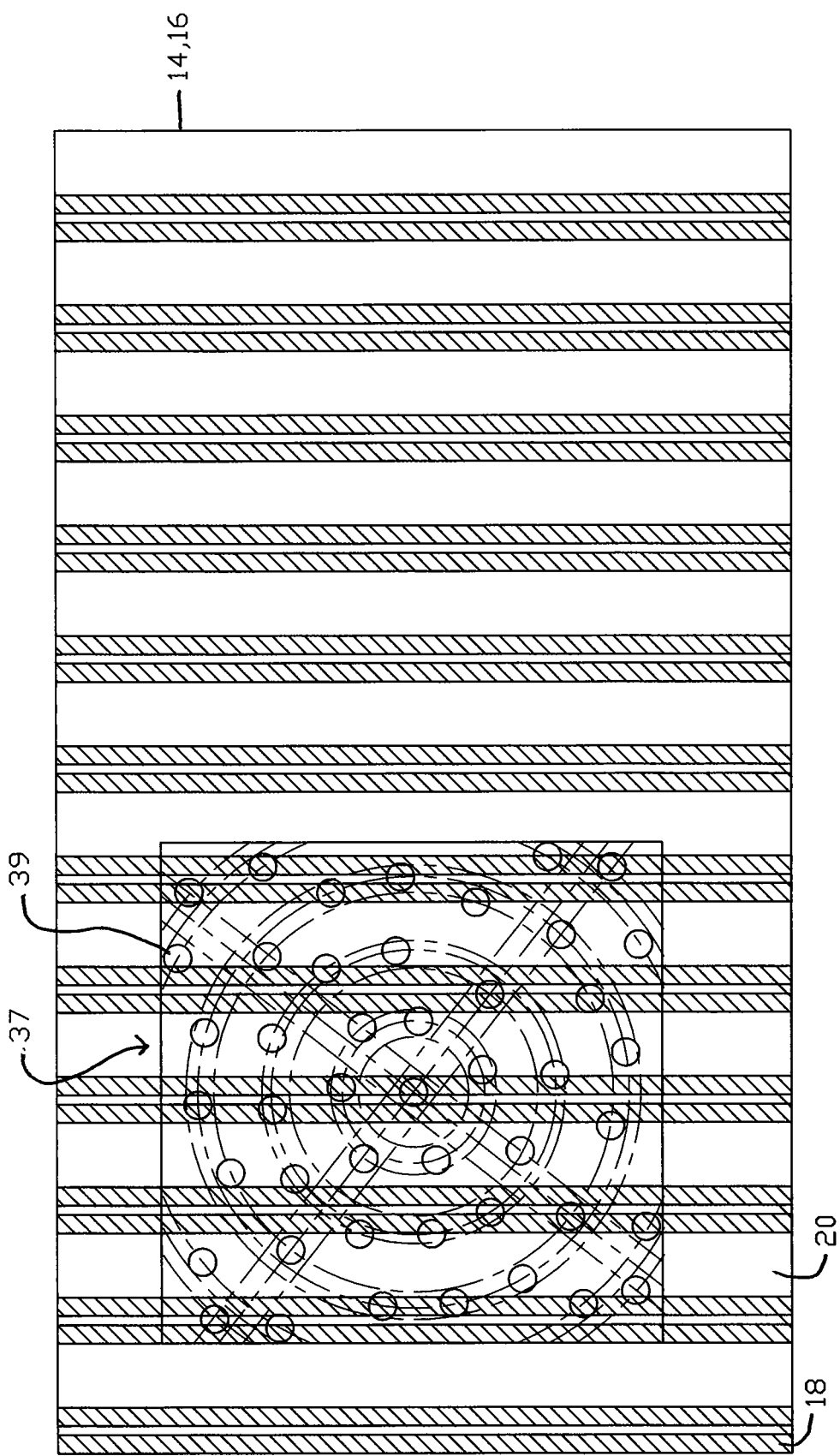
FIGS. 10i-10m are plan views of the wheel assembly of FIG. 10h uniformly traversing floor decking
Figure 10J:
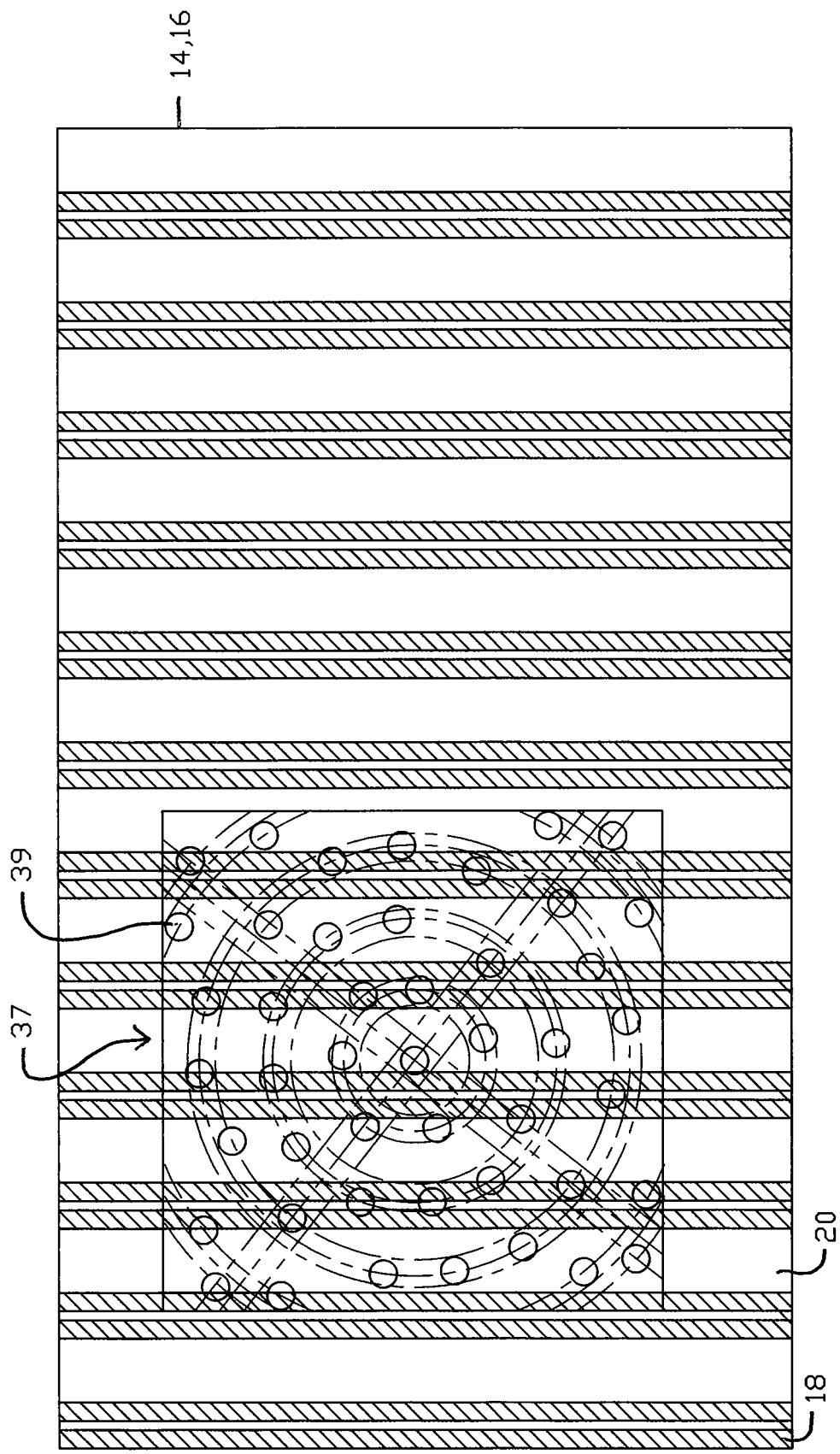
Figure 10K:
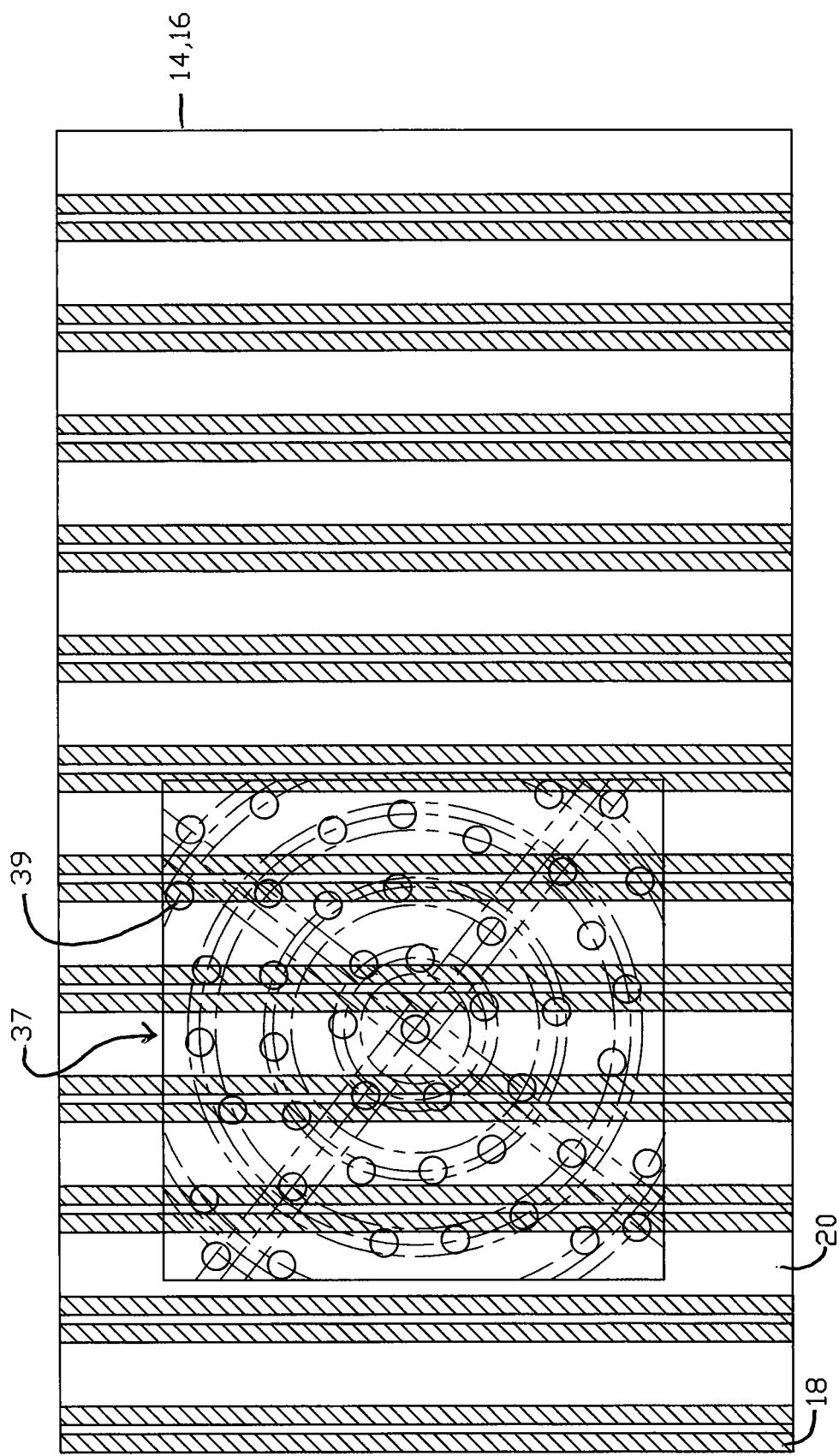
Figure 10T:
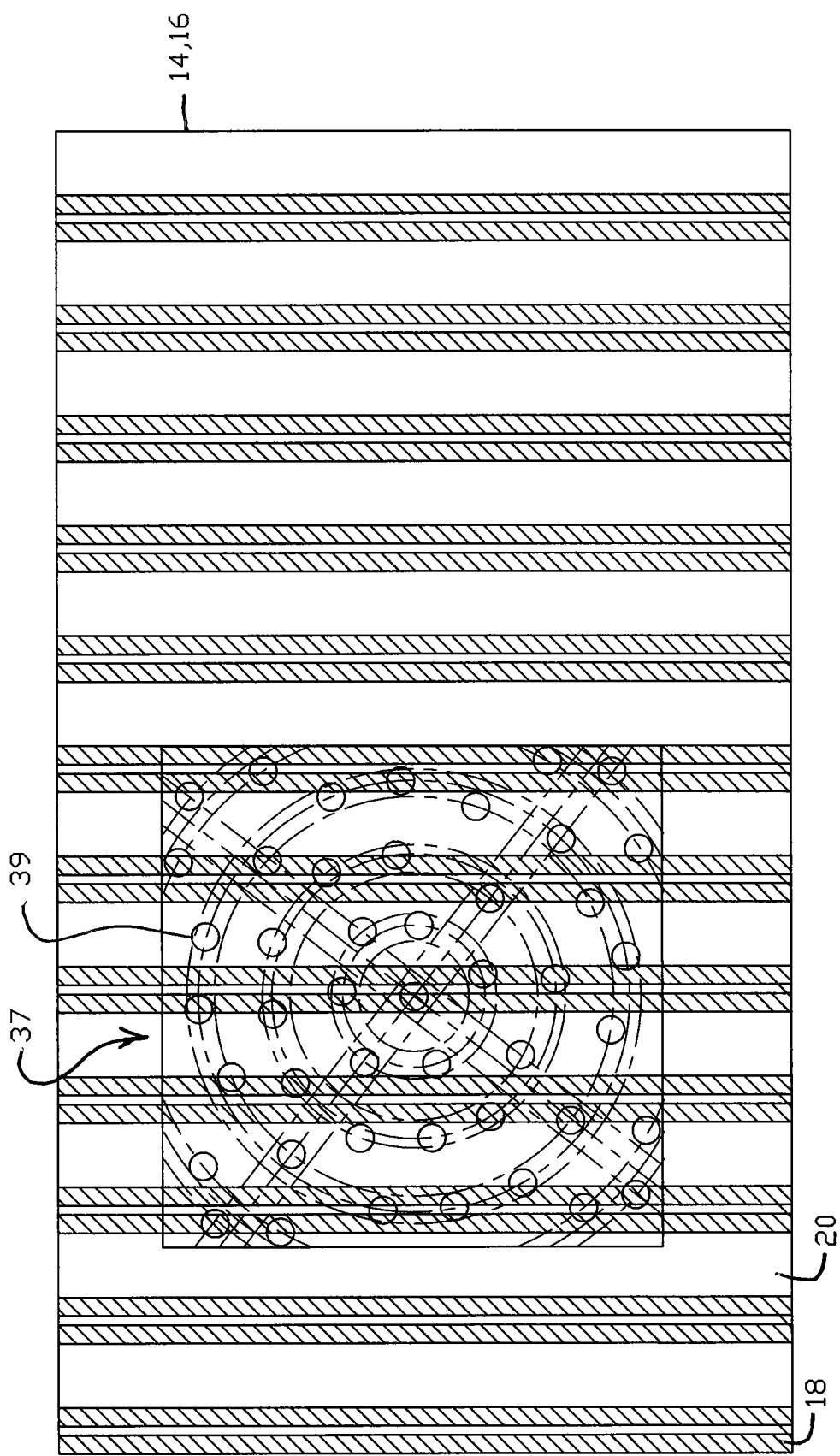
FIG. 10a is a plan view of another wheel assembly constructed in accordance with and embodying the present disclosure.
Figure 10M:
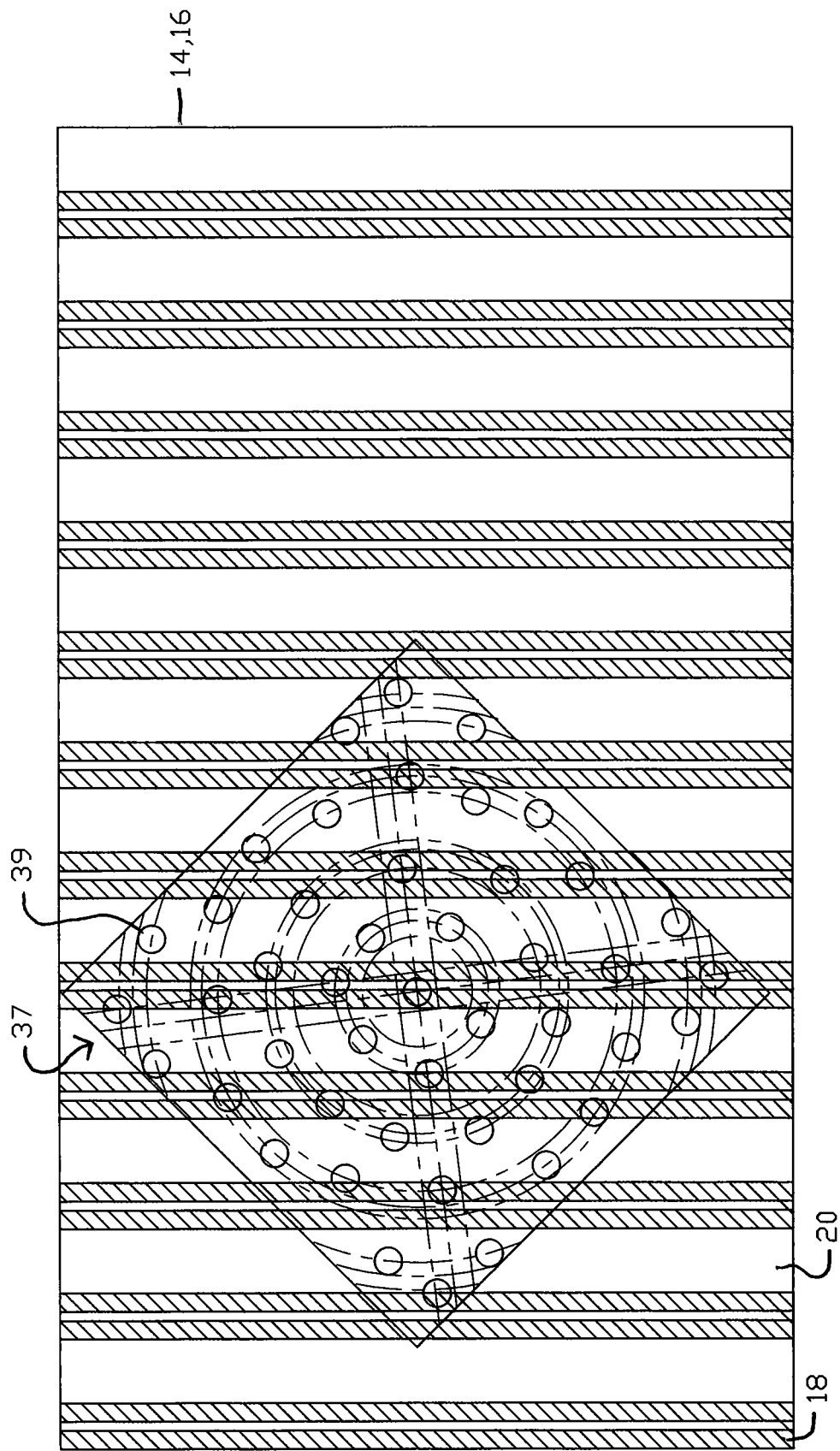

Turning to FIG. 10h, another wheel assembly generally shown as 37 comprises a base connected to a bottom of cart 10 (FIG. 7). The wheel assembly 37 has an array of wheels 39 that a predetermined pattern. As shown, in an embodiment, the predetermined pattern comprises a circular pattern of wheels 39. The predetermined pattern may also comprise other patterns such as but not limited to a spiral pattern, an oval pattern and an elliptical pattern. As shown, wheels 39 are positioned offset within the predetermined pattern. At any instant of time for the wheel assembly 37, however, a number of the wheels 39 of the predetermined pattern contact a plurality of the peaks 18 while other wheels extend over a plurality of valleys 20 of at least floor decking 12, 14, and 16. The spatial relationship of the array of wheels 39 positions non-contacting wheels 39 over the valleys 20 such that the cart 10 uniformly traverses at least floor decking 12, 14, and 16. In other words, wheels 39 contacting peaks 18 prevent non-contacting wheels 35 from entering any valley 20. FIGS. 10i-10m illustrates wheel assembly 37 incrementally and uniformly traversing floor deckings 14, 16. As shown, a number of wheels 39 extend and suspend over the valleys 20.

Based on the configuration and dimensioning within each wheel assembly 22, 28, 34, 28', 33 and 37 a number of the wheels 26, 32, 38, 32', 35 and 39 are in contact with the peaks 18 positioned under base 24, 30, 36 at any instant of time. At least one wheel 28, 34, 38, 32', 35 and 39 per quarter of base 24, 30, 36, 30' contacts a peak 18. As known, however, an increased number of contacting wheels 26, 32, 38, 32', 35 and 39 assists in distributing the cart's weight with respect to the floor decking 12, 14, 16. Although straight rows and columns of the wheels 28, 32, 38, 32', 35 and 39 provides uniform travel of the cart 10 across the floor deckings, the offset configuration of the rows and columns of the wheels 28, 32, 38, 32', 35 and 39 assist in overcoming any interface area at the peak and valley and/or at the peak and dimple. Regardless of the configuration, some wheels are positioned over the valleys 20, while the other wheels 26, 32, 38, 32', 35 and 39 uniformly contact the peaks 18 to allow the worker to move the respective cart 10 over the floor decking 12, 14, 16 in a uniform and convenient fashion.

The wheel assemblies 22, 28, 34, 28', 33 and 37 eliminate any jarring or uneven motion applied to the worker as the worker moves the respective cart. The layouts and spacing of the wheel assemblies 22, 28, 34, 28' also provide zero radius turning across at least floor decking 12, 14, 16. In other words, the wheel assemblies 22, 28, 34, 28', 33 and 37 provides a three hundred sixty degree "spin in place" capability that will roll and spin freely on the floor deckings 12, 14, 16 (see FIGS. 9e, 10g and 10m). The wheels 26, 32, 36, 32', 35 and 39 of wheel assemblies 22, 28, 34, 28', 33 and 37 may comprise rotatable casters, rollers and ball bearing members. The predetermined pattern of wheels for wheel assemblies, 22, 28, 34, 28', 33 and 37 are sized, shaped and positioned such that the swivel radius of each wheel 26, 32, 36, 32', 35 and 39 are spaced far enough apart so that adjacent swivel radii of adjacent wheels do not contact or interfere with each other when the cart 10 travels in path such as but not limited to a straight, diagonal, circular, spiral, curved and oval path along at least floor deckings 12, 14 and 16.

In current construction applications, in order for a worker to obtain power for equipment such as electric drills or grinders, the worker may have to connect several extension cords and electric cables to a power source at a distance away from the current work area, wherein many times the power source is located on a lower floor. As such, the worker may need to connect and scatter many sets of power cables hundreds of feet across the floor decking for the various tools leading to further difficulties of traversing a cart across the floor decking. The worker's cables eventually become tangled and/or frayed leading to unsafe working conditions. Additionally, the length of the cables from the power source to the equipment results in lost amperage over these distances resulting in reduced capacity for the equipment and possibly damage to the tool motor and structure. Constantly reconnecting cables, untangling cables and moving cables results in downtime for the worker to process the current work area. Furthermore, the long distances for the cables, untangling typically results in frayed or cut cables. Accordingly, OSHA personnel may fine the workers due to the frayed and scattered cables.

The wheel assemblies 22, 28, 34, 28', 33 and 37 of the present disclosure eliminate these problems and hazardous conditions. The wheel assemblies 22, 28, 34, 28', 33 and 37 allow the cart 10 to uniformly traverse at least floor deckings 12, 14, 16 and over the cables. Furthermore, since the wheel assemblies 22, 28, 34, 28', 33 and 37 allows the cart 10 to easily traverse at least the floor decking 12, 14, 16; the wheel assemblies 22, 28, 34, 28', 33 and 37 easily position the cart 10 and the needed tools, components and materials at the current work area. As such, the cart 10 may incorporate retractable hose or wire reels that run a short distance to the work area. The wheel assemblies 22, 28, 34, 28', 33 and 37 eliminate the labor cost of lying out, organizing and collecting the necessary hoses and cables.

Figure 11A:
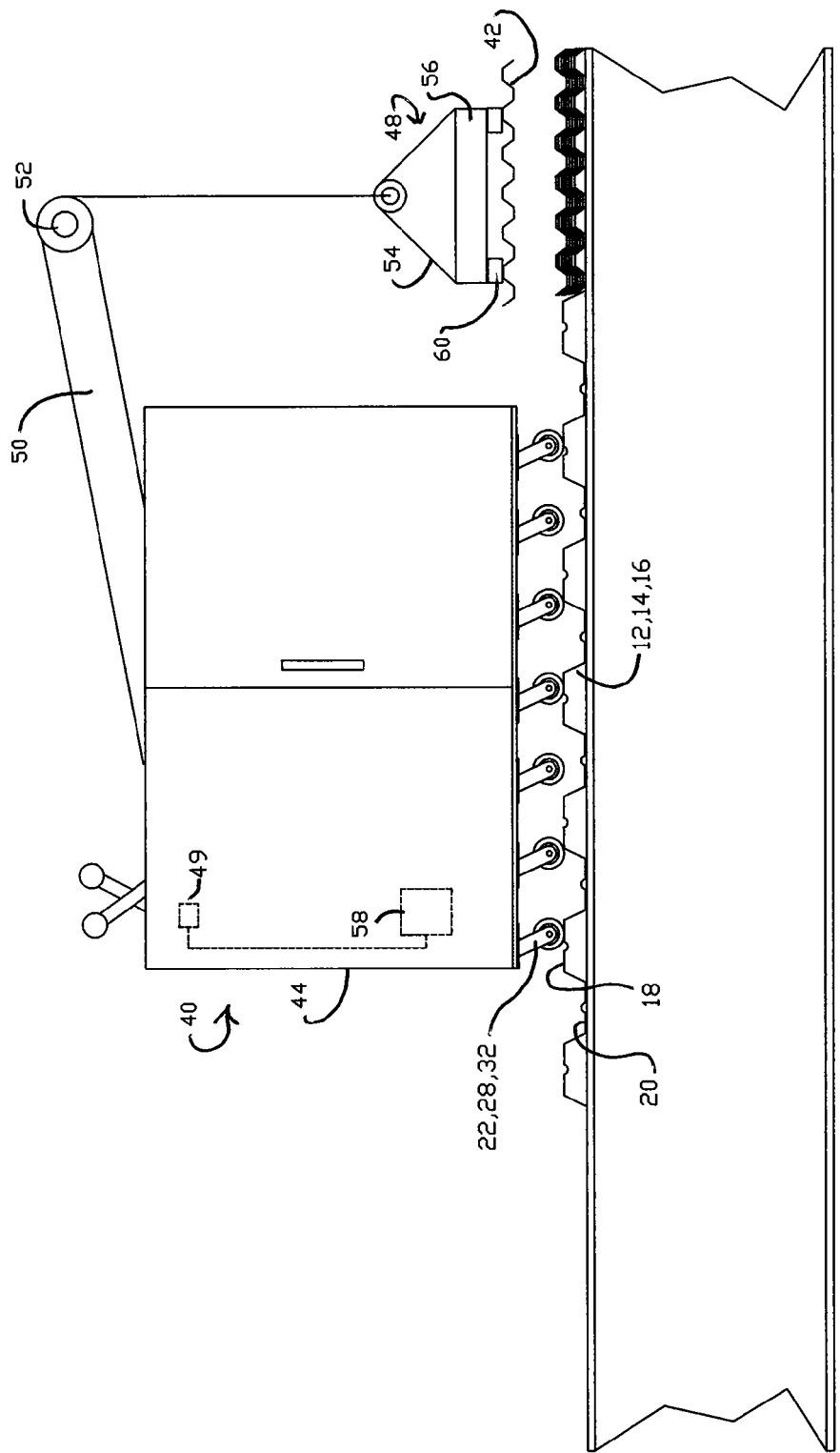
FIG. 11a is an end view of the decking and a side elevational view of a beam or girder and a deck cart constructed in accordance with and embodying the present disclosure and further illustrating a hoist assembly and a picking assembly.
Figure 11B:
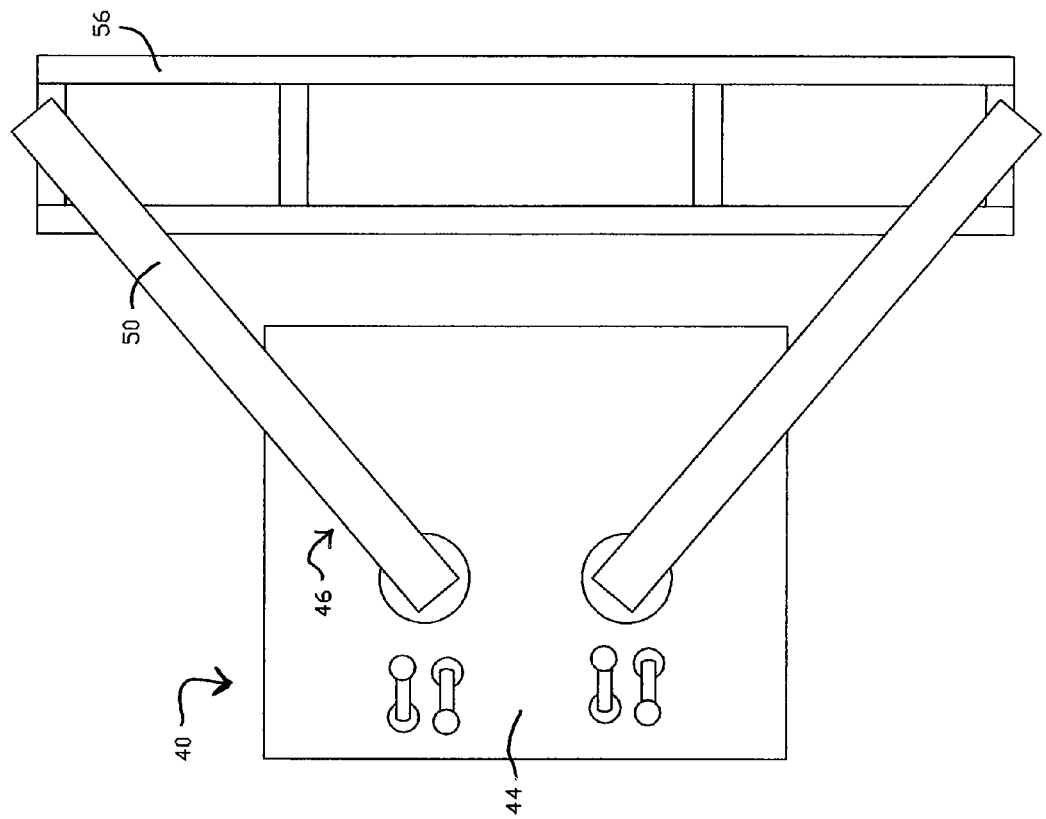
Figure 11C:
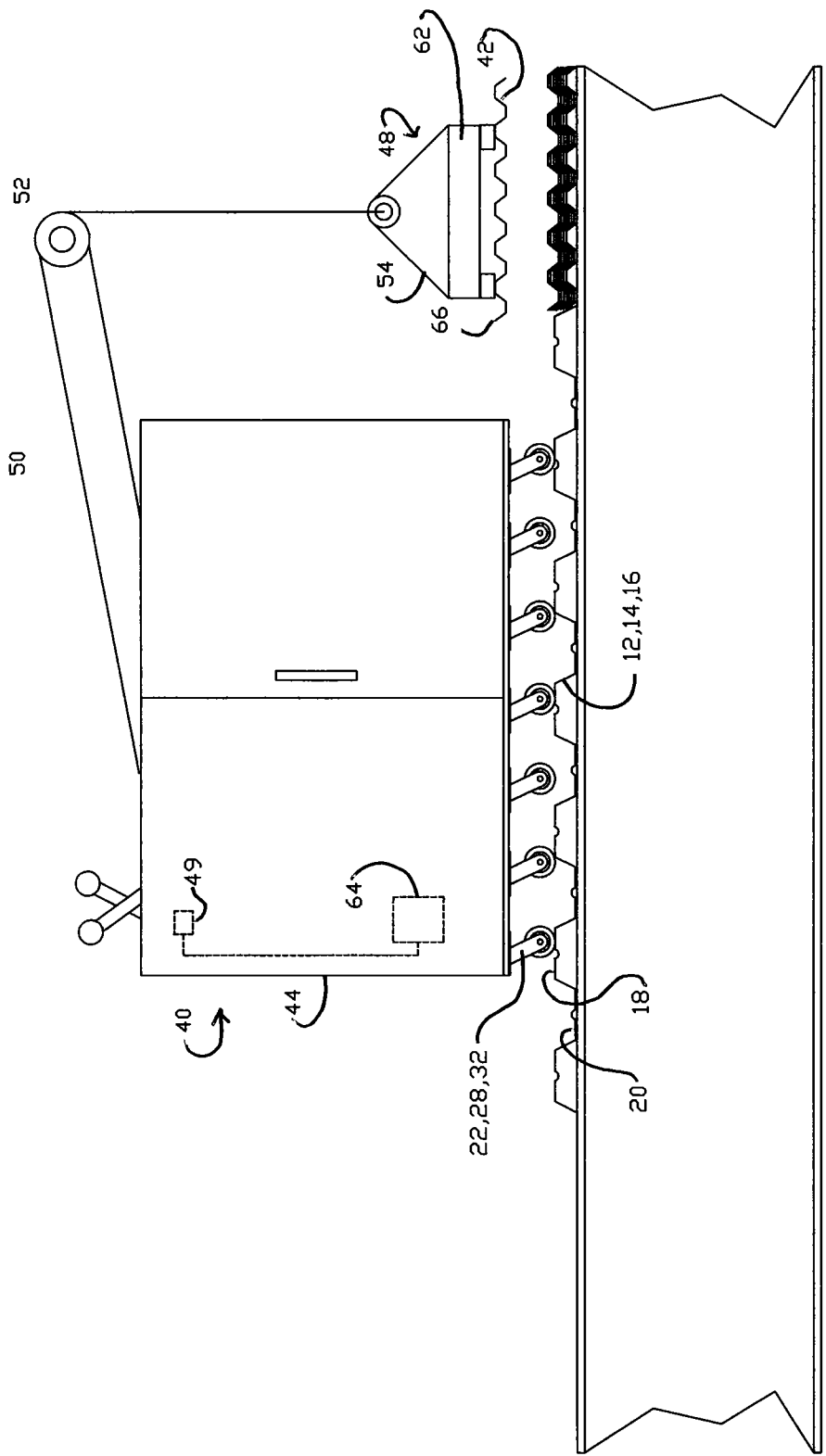
FIG. 11c is a side elevational view of another deck cart constructed in accordance with and embodying the present disclosure.

Referring to FIGS. 11a, 11b and 11c in an embodiment, wheel assemblies 22, 28, 34, 28', 33 and 37 connect with a deck cart generally shown as 40. The deck cart 40 allows the workers to safely pick and deposit a sheet of deck material 42. The deck cart 40 comprises a housing 44, a hoist control assembly generally shown as 46, a picking assembly generally shown as 48 and a controller 49. The housing 44 may include a plurality of storage compartments, a non-planar top, an electrical and battery charging assembly, outrigger protection and a sheet separator. The non-planer top such as a pyramid eliminates stacking of unauthorized materials and/or tools.

The hoist control assembly 46 comprises at least one hoist arm 50 that extends beyond the housing 44 and includes a pulley system 52, which suspends the picking assembly 48. The hoist arm 50 may position pulleys at opposite ends of the picking assembly 48 in order to control uniform lifting of the picking assembly 48. Furthermore, the controller may independently operate the respective pulley system 52 of each hoist arm 50 in order to lift one portion of the picking assembly 48 higher or lower with respect to the other portion of the picking assembly 48.

The picking assembly 48 operatively connects with the hoist arm 50. The picking assembly 48 includes a picking means 54 configured to removably pick the sheet of the deck material 42. In an embodiment, the picking means 54 comprises an electromagnet assembly 56. The electro-magnet assembly 56 has an electrical control means 58 operatively connected to the controller 49. The electromagnet assembly 56 also includes magnets 60 operatively connected to the electrical control means 58.

The magnets 60 are configured to magnetically connect to the sheet of deck material 42 for moving the deck material 42 to its appropriate place along the exposed beams. The magnets 60 are configured to deposit the sheet of deck material 42 into its appropriate place on the exposed beam. The battery assembly may provide power to the hoist control assembly 46, the magnets 60 and controller. Additionally, the battery assembly provides a counter balance to the suspended picking assembly 48 and any attached sheet of deck material 42. Furthermore, the battery charging assembly may provide power to other tools (not shown).

In another embodiment shown in FIG. 11c, the picking assembly 48 comprises a vacuum assembly 62 in order to lift the metal deck. The vacuum assembly 62 has a vacuum motor 64 operatively connected to the controller 49. The vacuum assembly 62 also includes suction cups 66 operatively connected to the vacuum motor 64. Still further, in another embodiment (not shown), the picking assembly 48 may include, but is not limited to, hooks, fasteners, brackets and barbs, such as those barbs known as "Cleeco" fasteners in order to lift the metal deck.

In an embodiment (not shown), the wheel assemblies 22, 28, 34, 28', 33 and 37 connect to a cart in the form of a utility cart. The utility cart allows the worker to safely package a workstation such as cylinder tanks, i.e., oxygen and acetylene tanks. The utility cart comprises a housing having a non-planar top and a cylinder access area. The cylinder access area is positioned between storage compartments to minimize exposure of the cylinders. The access area contains cylinder restraints to safely contain the cylinders within the access area. The utility cart may include other workstation components such as a hose reel assembly.

Figure 14A:
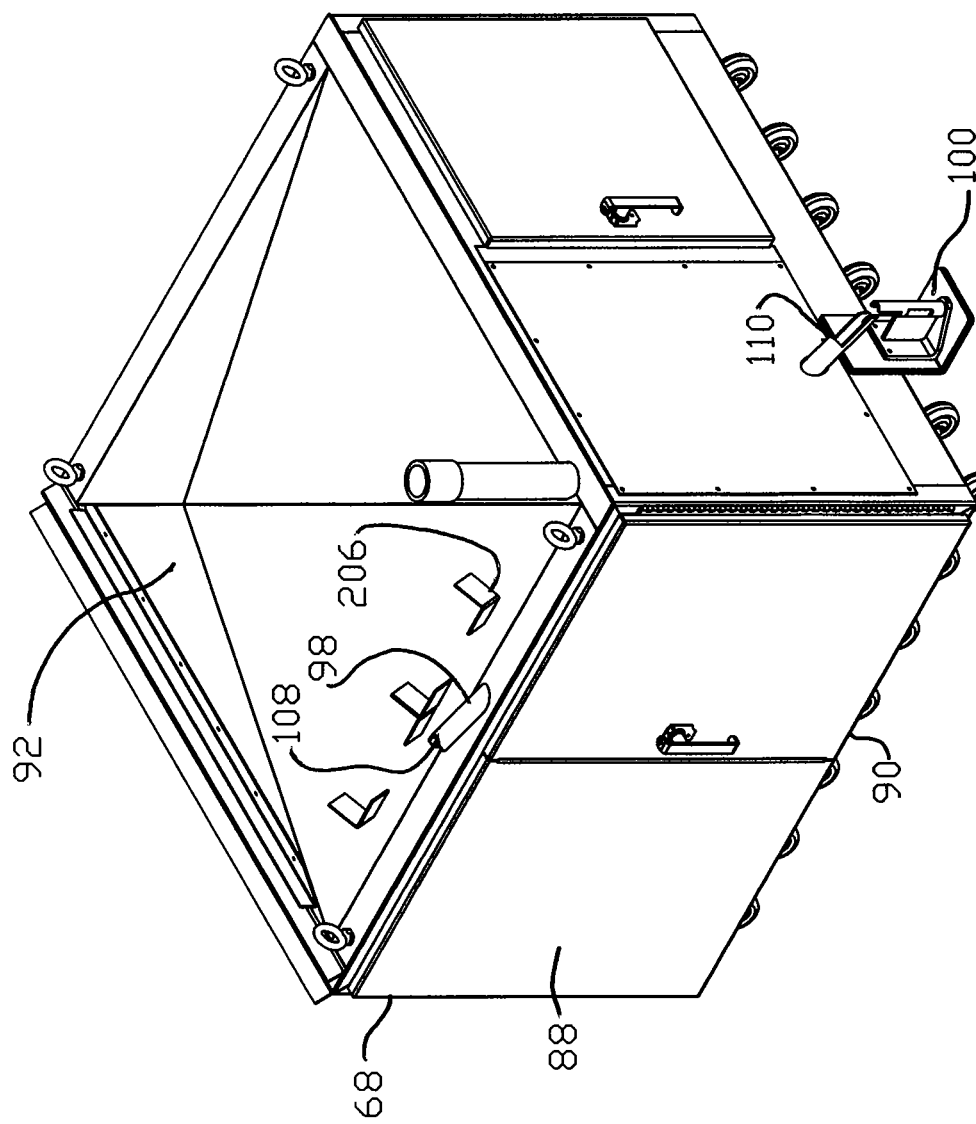
Figure 14B:
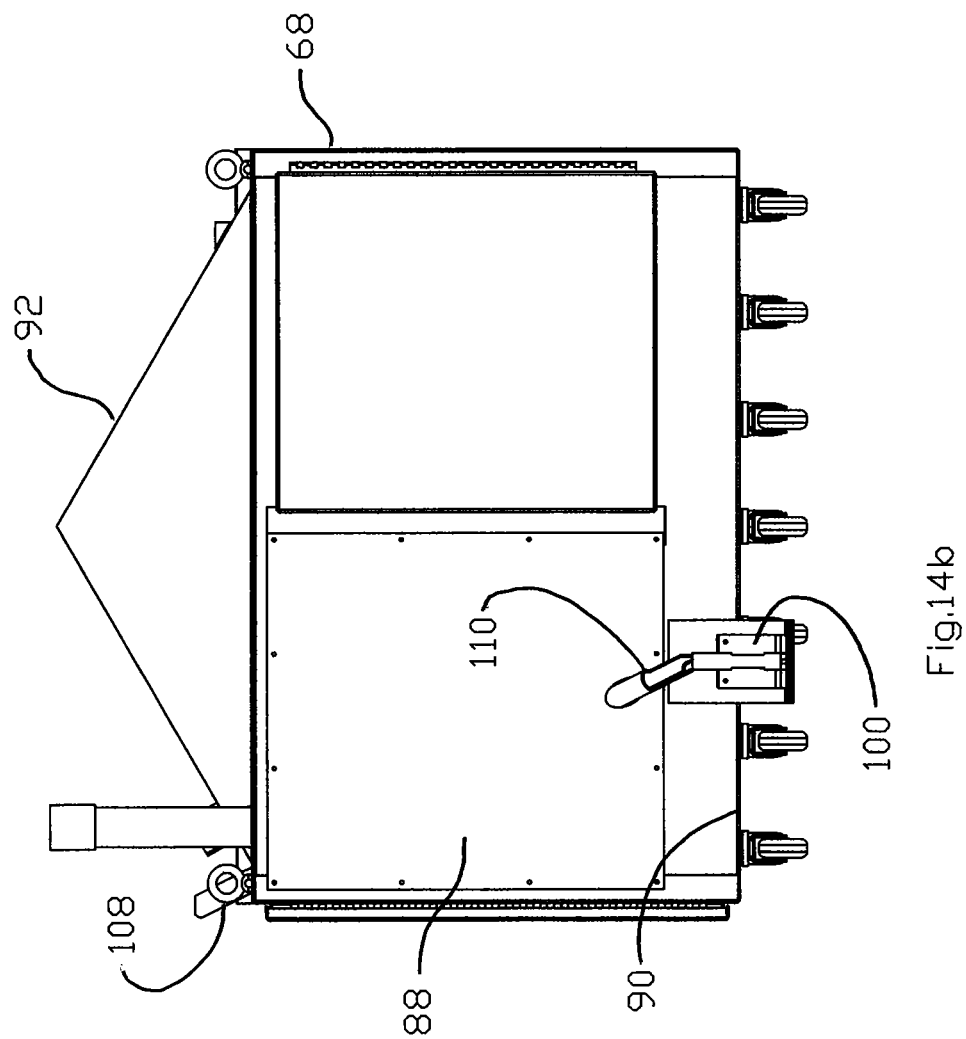
Figure 14E:
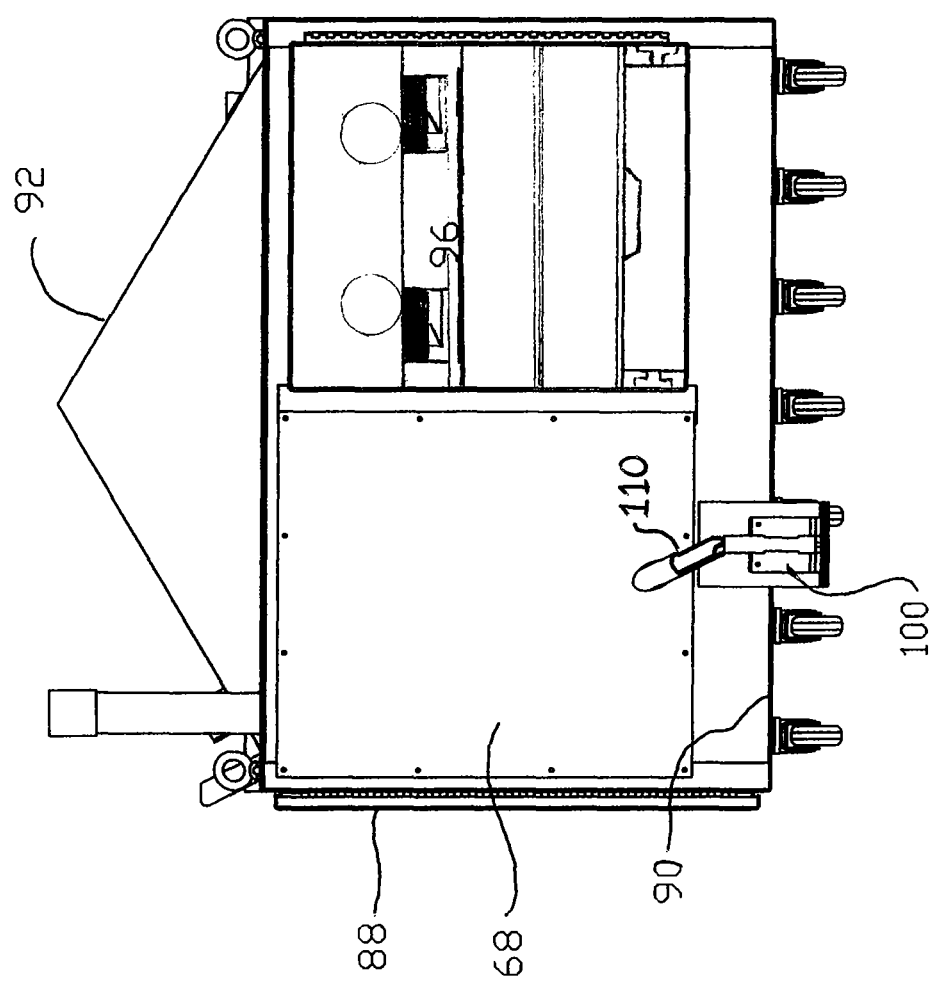

Turning to FIGS. 7, 12, 13 and referring to FIGS. 14a-14b, in an embodiment, the wheel assemblies 22, 28, 34, 28', 33 and 37 connect with the weld cart 10. The wheel assemblies 22, 28, 34, 28', 33 and 37 allow the weld cart 10 to uniformly traverse at least the floor deckings 12, 14, 16. As will be discussed, the weld cart 10 allows a worker to load a stud in its respective ferrule and to weld the stud while the worker remains in a standing and unbent position. Additionally, the weld cart 10 allows another worker, while moving the cart from weld location to weld location, to also layout ferrules and studs and to analyze for quality control, in real time, the welded stud while the analyzing worker remains in a standing and unbent position.

The weld cart 10 comprises: a housing 68, a stud feed assembly generally shown as 70; a stud gun tower 72, a moveable arm assembly generally shown as 74; a stud gun stabilizer generally shown as 76; a stud gun extension generally shown as 78; a stud gun 80; an adjustable handle assembly 82; a component holding assembly generally shown as 84 and a control assembly generally shown as 86.

In an embodiment (not shown), the housing 68 may comprise sides, a top and a bottom in the form of a substantially flat member such as a hand cart. In this embodiment, the sides, top and bottom do not form an interior surface. In other words, the cart may comprise the housing.

As shown in FIGS. 7, 12, 13 and 14, in another embodiment, the housing 68 has sides 88, a bottom 90, a top 92 and power source 94. The sides 88, bottom 90 and a top 92 define an interior space 96 for positioning the power source 94. The housing 68 further includes the non-planar top such as the pyramid, to eliminate stacking of unauthorized material or tools. The housing 68 also includes access doors and storage compartments that include moveable shelves. The housing 68 may comprise aluminum specifically designed to be lightweight and rust free with a provision for security on the doors. The housing 68 may be painted using a powder coat for reduced glare finish. The housing 68 may also include picking eyes and a picking harness in order to conveniently lift the weld cart 10 onto the appropriate floor decking. The housing 68 may also include a power cable reel assembly, an inverter or battery assembly, and a volt charger for tools.

In this embodiment, 12 volt, DC, Gel Cell batteries power components such as but not limited to portable chargers for hand tools, the control assembly 86, which includes an event logger, by associated electrical cables. The 12 volt, DC System, also powers a displacement transducer 190 of the stud gun 80 (FIG. 21a). The weld cart 10 may also house a trickle charger that would connect to an external 110 volt power source in order to charge the 12-volt DC batteries during nonuse, such as nighttime.

In an embodiment, a power source includes a 480 volt, 3 phase disconnect box which provides power to the cart 10 to run the inverter style stud welder and the control assembly 86 and the tool battery chargers. This electrical source would be stationed on the ground floor. Wire such as a 6 gauge, 4 conductor, primary wire runs up to 500" to the welder for various weld sites at any given distance from the electrical power source. If needed, the worker simply steps the size of the wire up to go further distances, say 800', from the primary disconnect. At the end of this primary wire, an installed plug socket mates with the power plug 95. The power plug 95 serves as a connect/disconnect plug to the primary wires power socket and the power plug 95 is also connected to an electrical box 94 positioned within the weld cart 10. In this embodiment, the weld cart 10 houses a stud welder assembly (not shown). The electrical box 94 operatively connects with the stud welder assembly by associated electrical cables. The stud welder assembly, in turn, powers the stud gun 80 and its gun coil, which helps to control the time of the weld. There is a shunt in the middle of the weld cable from the welder to the stud gun 80 that reads the weld current. The electrical box 94 has a transformer inside in order to step the 480 volt, 3 phase power down to a separate 110 volt, single phase leg in order to run the 110 volt tool chargers and the 110 volt control assembly 86 which includes a data logger to log and translate to the computer four weld parameters of time, current, lift and plunge as will be discussed.

The stud feed assembly 70 comprises a stud loader 98 and a stud catcher 100. The stud loader 98 has a chute 102 positioned within the interior of the housing 68 to feed a plurality of studs 104 to the stud catcher 100. In an embodiment, the chute 102 angularly positions within the housing 68. As shown, the stud catcher 100 externally connects to one of the sides 88 of the housing 68. The stud catcher 100 has a receptacle 106 in communication with the chute 102, wherein the receptacle 106 is shaped to receive a stud from the plurality of studs 104 such that the receptacle 106 vertically aligns the received stud 104 with respect to the housing 68.

The chute 102 comprises an entry end 108 and an exit end 110. The entry end 108 extends beyond the top of the housing 68 and the exit end 110 extends beyond the side 88 near the stud catcher 100. The entry end 108 includes a trough 112 to accept and guide the plurality of studs 104 into the chute 102. The exit end 110 includes an angled surface 114 to guide the stud 104 into the receptacle 106 of the stud catcher 100.

The top 92 of the weld cart 10 may include alignment marks near the entry end 108, wherein the alignment marks align with the walls of the trough 112 of an appropriately sized chute 102 of the stud loader 98. The different sizing of the chute 102 accommodates small, medium and large sized studs 104. These marks assist the worker in identifying and loading the proper sized studs 104 into the entry end 108 of the respective properly sized stud loader 98. The stud loader 98 and the chute 102 may be color-coded to indicate the proper sizing of the studs 104. During use, the worker handles studs 104 from package 210 positioned on the top 92 of the cart 10 and loads the plurality of the studs 104 into the stud loader 98 via the entry end 108. The entry end 108 accepts the respective studs 104 and gravity feeds the stud 104 to the exit end 110 and discharges an individual stud 104 into the stud catcher 100.

Referring to FIGS. 15a and 15b, the chute 102 has a length denoted "X". In an embodiment, the distance "X" of the chute 102 comprises a measurement range from about fifty inches to about sixty inches. For shorter length studs 104, the exit end 110 has a length denoted "Y". The shorter length studs 104 have a height measurement range from about three inches to about four inches. In an embodiment, the shorter length stud has height measurements of: 3³⁄₁₆ inches, 3⅜ inches and 3⅞ inches. In an embodiment, the length "Y" has a measurement range from about two inches to about three inches. The angled surface 114 assists discharging the stud 104 into the stud catcher 100 in the vertical position. In other words, the discharging stud 104 slides along the angled surface 114 wherein the angled surface 114 creates the proper arc for the stud 104 to leave a diagonal plane from the chute 102 and end up in a vertical position in the stud catcher 100) prior to discharging into the stud catcher 100. The angled surface 114 has an angle range from about thirty degrees to about forty-five degrees.

For medium length studs 104 and long length studs 104, the exit end 110 has a length denoted as "Z" (FIGS. 16a and 16b). The medium and longer length studs 104 have height measurement ranges from about four inches to about seven inches. In an embodiment, the medium length stud has height measurements: of 4 3/16 inches, 4 3/8 inches and 4 and 7/8 inches. In an embodiment, the long length stud has height measurements of: 5 3/16 inch and 6 3/16 inch. In an embodiment, the length "Z" has a measurement range from about three inches to about four inches.

The larger exit end 110 of FIGS. 16a and 16b assists in guiding the medium length studs 104 and the long length studs 104 into the stud catcher 100. The angled surface 114 has a measurement range from about thirty degrees to about forty-five degrees. Further, as shown in FIGS. 16a and 16b, the exit end 110 includes a generally U-shaped cut-out 116. The U-shaped cut-out 116 further assists discharging the studs 104 into the stud catcher 100 in the vertical position as the U-shaped cut-out 116 allows the stud 104 to drop and vertically align quicker as the stud 104 discharges from the exit end 110. In other words, the discharged stud 104 may not slide along the entire length of the angled surface 114 as the U-shaped cut-out 116 allows the stud 104 to drop into the stud catcher 100. The exit end 110, angled surface 114 and cut-out 116 may have a variety of sizes and shapes to allow stud 104 to drop and vertically align in the stud catcher 100.

Turning to FIGS. 17a, 17b and 17c, the receptacle 106 of the stud catcher 100 includes a receptacle base 118 and a tube 120. The tube 120 extends upward from the receptacle base 118 wherein a portion of the tube 120 positions below and beyond the angled surface 114 of the exit end 110 of the chute 102 (FIG. 17c). As shown in FIG. 17a, the height of the tube 120 is denoted "AA". To accommodate the short, medium and long studs 104, the height "AA" has a measurement range from about six inches to about eight inches. The tube 120 is positioned on the receptacle base 118 at a distance denoted "BB", as measured from the side of the housing 68. To vertically align the discharged stud 104, distance "BB" has a measurement range from about three inches to about four inches. In an embodiment, the tube 120 comprises a circular shape having an inner diameter ID and an outer diameter OD. The inner diameter ID is larger than the stud 104 in order to receive the stud 104. As shown, the outer diameter OD has a groove 122 that contacts with the stud gun 80 as will be discussed.

Additionally, as shown in FIGS. 7, 13, and 17b and 17c, the top of the tube 120 has a tube cut-out 121. The tube cut-out 121 is diagonally positioned across the top of the tube 120 by an angle denoted "CC" (FIG. 17b). In an embodiment, angle "CC" has a measurement range from about twenty degrees to about thirty-five degrees. The tube cut-out 121 opposes the angled surface 114 so as to efficiently catch the discharged stud 104 as the discharged stud 104 leaves the exit end 110 of the chute 102. The tube cut-out 121 may include a beveled portion at a lower end. The angle of the tube cut-out 121 is determined by the alternating angle in which the exit end 110 of the chute 102 leaves the housing 68. Further, as shown in FIGS. 7 and 13, when the tube 120 vertically aligns the stud 104 in the stud catcher 100, the following stud 104, via the gravity feed of the chute 102, exits the exit end 110 and contacts the vertically aligned stud 104 and rests against the vertically aligned stud 104. When the stud gun 80 removes the vertically aligned stud 104, the following stud 104 slides off the angled surface 114 and into the tube cut-out 121. The spacing and configurations of the angled surface 114 and the tube cut-out 121 assist in vertically aligning the now discharged stud 104. This replacement process repeats as long as the chute 102 has enough studs 104 remaining to force the stud 104 in the tube 120 to be upright and against the inner wall of the tube 120.

The stud catcher 100 may include a variety of sizes and configurations such as a small configuration and a combined medium/large configuration to accept studs 104 of various sizes. As such, the stud catcher 100 may be color coded to indicate the proper sizing along with the color-coded stud loader 98.

Returning to FIGS. 7, 12 and 13, the stud gun tower 72 comprises a tower base 124, a column 126 and a tower top 130. A portion of the column 126 is positioned within the housing 68 of the weld cart 10 and a portion of the column 126 extends out of the top of the weld cart 10. In an embodiment (FIG. 18), the tower top 130 includes a shoulder post 132 that rotatably attaches to an inner arm 134 of the movable arm assembly 74 via a bearing arrangement generally shown as 136. The shoulder post 132 connects to the column 126 and connects to the inner arm 134. The bearing arrangement 136 provides rotational movement of the inner arm 134 with respect to the shoulder post 132 while also providing load support. As shown in FIG. 18, the bearing arrangement 136 comprises a thrust bearing cover 138, a thrust washer 140, a thrust bearing 142, a needle bearing 144, an inner race 146, a bearing collar 148, a bearing protector 150 and a shoulder cap 152.

Referring to FIG. 19, the movable arm assembly 74 connects to the housing 68 via connection of the inner arm 134 to the shoulder post 132 of the stud gun tower 72. The movable arm assembly 74 has a linkage member 154 in the form of an outer arm. The linkage member 154 connects to the inner arm 134 by support blocks 155 and a connector 157, a bearing block 156, a bearing 158 and a pivot pin 160. The linkage member 154 connects to the stud gun stabilizer 76 (FIG. 20) by another bearing block 156, bearing 158, pivot pin 160 and stabilizer receiver 164. The movable arm assembly 74 moves the stud gun stabilizer 76 (FIG. 20) that connects with the 164 which connects to 154, wherein the member 164 and the entire moveable arm assembly 74 is configured to rotate the stud gun stabilizer 76 and the stud gun extension 78 around the housing 68.

As shown in FIG. 20, the stud gun stabilizer 76 comprises bushing 166, a support 168, a tool balancer 170, stabilizer rods 172 and a connecting lug 123. The male projection of the connecting lugs 123 mates with the female portion of the stabilizer receiver 164 (FIG. 19) to rotatably connect together the stud gun stabilizer 76 and movable arm assembly 74. As shown in FIG. 20, the stud gun extension 78 connects with the stud gun stabilizer 76 via bushing 166. The stud gun extension 78 comprises a switch block 174, a trigger 176, the handle assembly 82, a back gun clamp 178 and a front gun clamp 180, these components attaching to a tube member 193 of the stud gun extension 78. The tube member 193 includes a lower end 195 that has an outside diameter similar to the outside diameter of the stud gun 80.

The extension 78 also provides a mounting surface for the adjustable handle assembly 82 on the switch block 174. The adjustable handle assembly 82 is configured to allow the worker to manipulate the movable arm assembly 74, the tool balancer 170, the stud gun stabilizer 76 and the stud gun extension 78 while standing in an upright position. As such, the adjustable handle assembly 82 allows the worker to move the extension 78 and moveable arm assembly 74 and associated stud gun 80 to a plurality of positions as the stud gun 80 suspends from the tool balancer 170. The stabilizer rods 172 keep the stud gun 80 straight during movement of the moveable arm assembly 74 through bushings 166.

The stud gun stabilizer 76 positions retaining members of the balancer 170 to connect to the gun extension tube 193. The stud gun 80 is positioned at the bottom of the extension 78 via suspension by the tool balancer 170. The stud gun 80 connects to the extension 78 via the back gun clamp 178 and the front gun clamp 180 and operatively connects to a power source. The power source may include a remote transformer, rectifier or motor generator that connects with electrical box 94. The length of the extension 78 is configured to position the stud gun 80 at or about the middle of the stud catcher 100 to properly engage the upright stud 104 within the stud catcher 100. Accordingly, the worker can easily manipulate the stud gun 80 over the stud catcher 100 via the adjustable handle assembly 82. There is enough travel in the extension 78 to remove the stud 104 up and out of the catcher 100 and down and into the ferrule located in the deck valley 20.

Since the stud gun 80 is connected to the stud gun extension 78, a handle or handles are not needed at the lower stud gun level positioned near the metal deck. As such, the operating trigger 176 for the stud gun 80 may be positioned near the handle assembly 82 to provide a level access for the worker to operate the trigger 176 for the stud gun 80. The worker, while in a standing position, moves the stud gun extension 78 to position the stud gun 80 to capture the stud 104 that is vertically aligned within the receptacle 106 of the stud catcher 100 and the worker then moves the captured stud 104 and stud gun 80 to a welding location. The worker then activates the stud gun 80, via the trigger 176, to stud weld the stud 104 while the worker remains in the standing position.

Turning to FIGS. 21a and 21b, the stud gun 80 includes a displacement transducer 190. The stud gun 80 also includes an adjustable rear core connector generally shown as 192 having male threads at one end and female threads at another end. The adjustable rear core connector 192 couples the transducer 190 with the stud gun 80. The lower end 195 of the tube member 193 removeably attaches to a top 194 of the stud gun 80. The connector top 194 joins the front of the gun extension tube 195 and is clamped together by the back gun clamp 178 and the front clamp 180 which has a slightly smaller inside diameter than the outside diameter of stud gun 80 and gun extension tube member 193. The adjustable rear core connector 192 of the stud gun 80 is drilled out in the center top to approximately 0.25" to allow the shaft of the displacement transducer 190 to penetrate through the sleeve connector 192 of the stud gun 80. The shaft of the displacement transducer 190 fastens with the female threads of the sleeve connector 192 and rests on top of the lifting rod assembly shaft of the stud gun 80. The wires of the displacement transducer 190 continue up the interior of the stud gun extension 78, into the weld cart 10 and eventually into connection with the meter of the control assembly 86. The displacement transducer 190 measures the lift and plunge of the stud gun 80 or the stud 104 once it is inserted into the chuck and the stud gun 80 is activated by the worker (i.e., the trigger 176 is activated).

During operation, the displacement transducer 190 measures the lift and plunge of the stud gun 80 as the studs 104 are welded to the beam. In an example, the displacement transducer 190 measures the lift of the stud gun 80 (preferably a lift of 3/32 of an inch) and measures the plunge of the stud gun 80 (preferable a plunge of 3/16 of an inch) while welding to the bare beam. For welding through the deck, the preferred plunge is 3/8 of an inch (i.e., a different amount of the stud extends past the end of the ferrule since for a 3/4" diameter stud to weld properly, the stud welding needs to burn off approximately 3/16" of stud for welding to a bare beam and another 3/16" to weld through 16 gauge deck and then onto/into the covered beam, equaling 3/8" of burn off which will then require 3/8" of what is commonly known as a plunge displacement). The displacement transducer 190 measures the lift and plunge of the stud gun 80 and sends the signal to the control assembly 86. As will be discussed, the control assembly 86 measures current through the aid of a shunt and time through the aid of a coil current from the back of the gun 80 during the welding process.

Returning to FIGS. 7, 12 and 13, the top 92 of the weld cart 10 includes the component holding assembly 84. As illustrated, the component holder assembly 84 comprises a variety of brackets 206 welded to the top of the weld cart 10, wherein the brackets 206 are configured to hold items such as packages 208 of ferrules 212, packages 210 of studs 104 and a ferrule dispenser 211. The brackets 206 comprise a variety of shapes and sizes. In one embodiment, L-shaped brackets 206 are configured to hold packages 210 of studs 104 such that the worker can conveniently retrieve a stud 104 and deposit the stud 104 into the entry end 108 of the stud loader 98. As such, the L-shaped brackets 206 are positioned near the entry end 108 of the stud loader 98.

The brackets 206 also comprise an elongated bracket, which is configured to hold the package 208 of ferrules 212. The brackets 206 further include a stop bracket, which is configured to contain an orientation of ferrules 212 that have been taken out of the package 208 and placed into a groove formed by a bracket 206 and top 92 of the weld cart 10. The groove is configured to hold a ferrule dispenser 211 and to hold a plurality of ferrules 212, which are orientated on a wire.

Returning to FIGS. 12, 13 and referring to FIGS. 22-24, the control assembly 86 further comprises a control panel 214 positioned on top of the weld cart 10. The control panel 214 may incorporate displays, meters and controls associated with components of the weld cart 10. The control assembly 86 further comprises analyzer 216 (FIGS. 22-24), wherein the analyzer 216 operatively connects to the stud gun 80. The analyzer 216 comprises a time circuit 218 which measures, in real time, time of the activated stud gun 216. The analyzer 216 also comprises a current circuit 220 that measures, in real time, current applied to the stud gun 80 as the stud gun stud 80 welds the stud 104. The analyzer 216 further comprises a lift circuit 222 which measures, in real time, the lift displacement experienced by the activated stud gun 80. The analyzer 216 also comprises a plunge circuit 224 which measures, in real time, the plunge displacement experienced by the stud gun 80. The real time measurements of the time, current, lift and plunge parameters of the time circuit 218, the current circuit 220, the lift circuit 222 and plunge circuit 224 are measured at the location of the welded stud 104. A logger 226 compiles the measurements of the time circuit 218, the current circuit 220, the lift circuit 222 and plunge circuit 224. The control assembly 86 then communicates the measured parameters of time, current, lift and plunge to the worker via the control panel 214. Accordingly, the control assembly 86 provides real time and area relative quality control of recently welded studs 104.

FIGS. 22 and 23 illustrate the wiring diagram and circuit board of the electrical components of the analyzer 216 and associated time circuit 218, current circuit 220, lift circuit 222 and plunge circuit 224 of the weld cart of FIG. 7. FIG. 24 illustrates an electrical schematic of the analyzer 216 and associated time circuit 218, current circuit 220, lift circuit 222 and plunge circuit 224. The analyzer 216 and associated time circuit 218, current circuit 220, lift circuit 222 and plunge circuit 224 are not limited to an analog configuration but may also include a digital configuration.

In particular, the time circuit 218 receives time data relating to the timing of the activated stud gun 80 as measured by the gun coil 197 of the stud gun 80. The current circuit 220 also receives current data relating to the current activated stud gun 80 as measured by the shunt 191 which is part of the control assembly 86. The lift circuit 222 receives lift data relating to the activated stud gun 80 as measured by the transducer 190 of the stud gun 80. The plunge circuit 224 receives plunge data relating to the activated stud gun 80 as measured by the transducer 190 of the stud gun 80.

Accordingly, the stud gun 80 via at least the transducer 190, shunt 191 and current coil 197 operatively communicates with the control assembly 86. The lift circuit 222 checks the critical measurement of "lift" that is the amount the stud 104 lifts off the deck and is critical for the arc. The plunge circuit 224 checks and analyzes the critical measurement of "plunge" that is the amount the stud 104 burns off and plunges the stud 104 all the way into the molten weld zone. The current circuit 220 checks and analyzes the amount of current used by the stud gun 80 while the worker activates the stud gun 80. The time circuit 218 checks and measures the amount of time elapsed during each stud gun activation.

Inadequate lift and/or plunge will result in a poor quality and/or failed weld. The analyzer 216 however, provides real time weld data at the weld location. Accordingly, the workers instantly know the quality of the welded stud 104 in real time.

The control panel 214 may include ports for a laptop computer to allow access to enable the worker or inspector to set the initial parameters of each event for the control assembly 86 and then later for the analyzed data of the analyzer 216 to be downloaded into the laptops for varied reporting and storage. The control panel 214 may also include display readouts of the analysis of the data of the analyzer 216. Accordingly, an accurate data collection for the welds may be compiled in a time efficient manner. Since the control panel 214 is positioned next to the recently welded stud 104, there is no time delay in analyzing the quality of the welded stud 104. Furthermore, since the studs 104 replace 20%-35% of the normally required steel it is imperative that these studs 104 be welded correctly and be tested individually through a scientific, non-destructive testing procedure in real time with real time reporting at the weld site as provided by the analyzer 216 of the weld cart 10.

Under current methods, studs may be welded as much as 300' from the power source and have many connections (i.e. resistance) in the weld cable, a real drop in desired current at the machine is lost at the actual weld zone. It is possible for 10% or more reduction in desired weld current to be received at the weld zone due to normal conditions. With present stud welders, the worker does not know the actual current or time being applied at the weld. Additionally, under present stud welders, the worker does not know any actual lift/plunge data of the stud welding cycle. Accordingly, during a shift, the worker stud welds hundreds, if not thousands of studs. Without analyzer 216 and associated circuits 218, 220, 22, 224, the worker does not know which of the welded studs comprises a poor quality stud weld. Additionally, any existing time/current analyzer, typically positioned hundreds of feet away from the stud weld site (i.e., ground floor) may collect data but the worker has no idea of each welded studs results and does not know which specific welded stud has the poor weld. Further, the distance existing between the stud welding power source and the stud gun results in loss amperage over the exposed and possibly frayed and corroded combo cables leading to poor current and time measurements.

With the present disclosure, while one worker stud welds the studs 104 to the beam or through the deck metal using the weld cart 10 and stud gun 80 in a standing and unbent position, another worker dispenses ferrules at the desired weld location; feeds additional studs 104 into the stud loader 98; moves and positions the weld cart 10 and uses the analyzer 216 to check the quality of a recent welded stud 104 in real time and at the weld location.

Referring to the drawings, during operation, a worker unloads a bundle of deck material 42 on the beam platform. Workers unbind the deck material 42 and move the deck cart 40 toward the deck material 42. It is understood that enough existing deck material 42 has been placed by hand and puddle welded to the underlying beam to support the deck cart 40 and the workers. The workers control the deck cart 40 to suspend the picking frame over the deck material 42. The picking means 54 lowers the magnets 60 to contact a sheet, typically the uppermost sheet, of the deck material 42. The magnets 60 adhere to the sheet 42 and the picking means 54 picks up the adhered sheet 42.

The workers then move the deck cart 40 to position the sheet 42 to an exposed portion of the beam. The wheel assemblies 22, 28, 34 of the deck cart 40 allows the deck cart 40 to traverse the existing deck material 42 in a smooth, efficient and convenient manner. Furthermore, the battery assembly of the deck cart 40 provides a counterbalance to the suspended sheet of deck material 42. Once the sheet of deck material 42 is positioned over the exposed beam, the picking means 54 lowers the deck material in contact with the exposed beam. Once properly aligned and contacted, the magnets 60 release the sheet of deck material 42. The sheet is positioned adjacent to a previously deposited sheet of deck material. The workers then move the deck cart 40 back across the expanding deck surface to the bundle of sheets to pick another sheet.

While these workers are depositing the sheets of deck material 42 in the adjacent fashion, other workers process the sheets of deck material 42 with the utility cart. The wheel assemblies 22, 28, 34 of the utility cart allow the utility cart to traverse the existing deck material in a smooth, efficient and convenient manner. The utility cart safely transports the oxygen and acetylene tanks across the deposited sheets so that the workers can weld the sheets to the underlying beam. With the utility cart, the workers process the deposited sheet by cutting the sheet as needed. For example, the workers may cut the sheet to fit around a column. Under current procedures, the workers make a ⅝" puddle weld at predetermined locations according to American Welding Society codes. However, as previously noted, there is no good way to inspect or assure these welds as being effective as a worker could mistakenly make a ⅝" puddle weld on the top of the deck that does not completely penetrate the beam below. The method of the present disclosure stud welds a ¾" shear connector in it's place and receive scientific testing and a greater than ⅝" weld thus eliminating the puddle welds that are equal to in number of the specified shear studs to be welded.

While the workers process the recently deposited sheets, other workers begin depositing the ferrules 212 along the deposited sheets of deck material. As noted, the component holding assembly 84 of the weld cart 10 efficiently holds packages 208 of ferrules 212, packages 210 of studs 104 and a ferrule dispenser 211 on the top 92 of the weld cart 10.

The workers move the weld cart 10 toward the deposited ferrules 212. One of the workers deposits studs 104 into the entry end 108 of the stud loader 98 while positioning the stud catcher 100 next to the deposited ferrule 212. The chute 102 of the stud feed assembly 70 gravity feeds one of the plurality of studs 104 to the stud catcher 100. The discharged stud 104 vertically aligns in the stud catcher 100 via the angled surface 114 of the exit end 110 and tube cut-out 121 of the tube 120.

The worker then moves the weld cart 10 and grasps the handle assembly 82 of the stud gun extension 78 and moves the movable arm assembly 74 to position the suspended stud gun 80 over the vertically aligned stud 104. The worker, while remaining standing, manipulates the handle assembly 82 to load the stud 104 from the stud catcher 100 and into the stud gun 80 by positioning the stud gun 80 around the groove 122 of the stud catcher tube 120. Once the stud 104 is loaded into the stud gun 80, the worker moves the stud gun 80 and the captured stud 104 via the handle assembly 82 and movable arm assembly 74 toward the ferrules 212 and positions the stud 104 into the ferrule 212.

Again, while remaining standing in an unbent position, the worker then activates the control trigger 176 (positioned near the handle assembly 82) to stud weld the stud 104 through the metal deck or onto a bare beam. FIG. 7 illustrates welded studs 104 to the left of stud cart 10 while FIGS. 12 and 13 illustrate welded studs 104 to the right of stud cart 10. Another worker or the worker welding the stud 104 may view the digital display/displays of the control panel 214 of the control assembly 86 of the weld cart 10 to read and evaluate the acquired and analyzed data of the analyzer 216 in order to review a scientific quality control test on the recently welded stud 104. As illustrated in FIGS. 12 and 13, the weld cart 10 of the present disclosure allows the worker to perform stud-welding processes in a standing and unbent position.

The weld cart 10 allows studs 104 to be delivered from the worker in a standing position to the work surface and available at any time for loading into the stud gun 80. Additionally, the moveable arm assembly 74 keeps any combo cable and stud gun 80 from ever touching at least floor decking 12, 14, 16. Additionally, the movable arm assembly 74 perpendicularly maintains the stud gun 80 with the floor decking for better welding.

The tool balancer 170 allows the stud gun 80 to float requiring only a few pounds of pressure to move the stud gun 80 to the weld zone. The moveable dual handles 82 are located waist high on the extension 78 for the worker to conveniently manipulate the stud gun 80 and to control the stud gun 80. The location of the trigger 176 on the stud gun extension 78 reduces double triggering on the welded stud 104 and accidental arcing of the chucks of the stud gun 80. The stud gun 80 further comprises a protective blanket to protect the ironworker's legs, feet and clothes from weld splatter.

The weld cart 10 allows the worker to work safely upright with a straight back. Since the worker is working erect, the worker's face is now out of the weld zone and away from the weld gases and splatter created by the stud welding process. Accordingly, the weld cart 10 allows a worker from the standing position to safely and easily regardless of age or gender or physical capabilities to efficiently stud weld studs 104. Additionally, since the carts 10, 40 efficiently and uniformly traverse at least floor deckings 12, 14 and 16, the worker can more efficiently deposit the deck material 42 and stud weld through the deck material 42. The wheel assemblies and carts of the present disclosure limit or eliminate the temporary puddle welds leading to increased safety and production.

The analyzer 216 via the circuits, 218, 220, 222 and 224 acquire, analyze and communicate the time, current, lift and plunge parameters to the control panel 214 wherein a computer or readout provides a downloadable real time report listing each weld's time, current, lift and plunge data. During use, a worker uploads the desired point for each setting of time/current/lift/plunge with high and low parameters wherein the control panel 214 will alert the worker if any weld event is outside the desired parameter. Since the stud 104 is immediately analyzed at the weld site, the workers experience increased quality control causing less knockoffs due to immediate inspection of scientifically failed welds and eliminates the need to bring the equipment back after a poor quality weld is measured. Existing analyzers on high end welders only analyze time and current weld data at the welder but not where the weld is taking place, which may be hundreds of feet away leading to inaccurate data when considering the length of cable runs, number of cable connections and length of the cable. It is common practice that most existing welders do not have any sort of time, current analyzer and the newer, high-end welders that do have the time, current analyzer do not use them because of their ineffectiveness due to the remote location as previously noted.

In these processes, the carts 10, 40 of the present disclosure may act as self-contained units by receiving and storing power over night from a local extension cord (such as one positioned on a nearby column). As such, the carts 10, 40 then store the daily requirement of electricity in their onboard 12-volt DC battery bank; thus, allowing the cart 10, 40 to provide portable power to recharge portable hand tool charging units, which eliminates unnecessary long runs of power cables, across the deck material. Additionally, in an embodiment, the weld cart 10, deck cart 40 and utility cart may combine into one cart having all the components and features of the individual carts. The combined cart includes the wheel assemblies 22, 28, 36, 28', 33 and 37 as needed.

The wheel assemblies 22, 28, 36, 28', 33 and 37, the carts 10, 40 and the methods of the present disclosure increase the safety and lower the cost of steel erection while increasing quality control through scientific testing. The present disclosure provides a new syntax in the order of which work may be preformed in a cost efficient and safe manner. The new disclosure provides: a deck cart system to pick transport and deposit metal deck; a cart system to secure and transport oxygen and acetylene tanks and a cart system to stud weld. The present disclosure further provides a method to reduce the number of deck welds, which connect the metal deck to the underlying beam wherein the deck welds may be finally scientifically tested for strength by welding stud shear connectors in their place and eliminating the deck weld. The present disclosure further reduces deforming the metal deck to locate the underlying beams and to find and mark the center of the underlying beams. The present disclosure drastically reduces the possibility of weld contamination by the syntax in which work may be completed such as using, individually or in combination, the deck cart, the weld cart 10 and utility cart 40. The present disclosure also provides the weld cart to weld studs 104 from a standing and unbent position wherein the onsite analyzer qualifies the studs 104 in real time as they are welded through the floor decking.

The present disclosure of the wheel assemblies 22, 28, 34, 28', 33 and 37 and carts 10, 40 results in a safer job environment while also reducing the cost of insurance and worker compensation claims. The workers do not have to bend over and weld studs but instead use the weld cart 10 to stud weld in a standing position. With the mobility of the cart 10, the worker has an immediate access to weld controls and eliminates the need to make changes on equipment that may be hundreds of feet away. Additionally, the mobility of the carts

10, 40 and wheel assemblies 22, 28, 34, 28, 33 and 37' eliminate cables being pulled across the floor decking.

In view of the above, it will be seen that the several objects of the disclosure are achieved and other advantageous results are obtained. As various changes could be made in the above constructions without departing from the scope of the disclosure, it is intended that all matter contained in the above description or shown in the accompanying drawings shall be interpreted as illustrative and not in a limiting sense.

The invention claimed is:

1. A cart for uniformly traversing a construction floor decking that has sequential peaks and valleys prior to cement being poured on the construction floor decking, the cart comprising:
   a housing having:
   a rigid bottom;
   a top; and
   a side connecting the rigid bottom and the top; and
   a wheel assembly connected to the rigid bottom of the cart, the wheel assembly having an array of multidirectional wheels having the same size and forming a predetermined pattern of wheels positioned under the cart, the array of multidirectional wheels forming rows and columns of multidirectional wheels in a configuration such that adjacent rows of wheels are laterally offset from each other from one to three inches and adjacent columns of wheels are longitudinally offset from each other from one to three inches and centerlines of the rows are positioned seven to eight inches from each other and wherein centerlines of the columns are positioned seven to eight inches from each other, wherein at any instant of time a number of the multidirectional wheels are configured to contact a plurality of peaks of the construction floor decking while other multidirectional wheels extend over and remain free from entering into the valleys, the peaks having widths from three inches to six inches while the corresponding valleys having widths from two inches to eight inches such that the cart evenly traverses the construction floor decking.

2. The cart of claim 1 wherein each multidirectional wheel of the array of multidirectional wheels include a 360 degree roll and spin configuration.

3. The cart of claim 1 wherein wheels of the adjacent rows are laterally offset from each other one to two inches and wherein wheels of adjacent columns are longitudinally offset from each other one to two inches.

4. The cart of claim 1 wherein at least 18% of the wheels are configured to contact a plurality of peaks of the construction floor decking while other wheels extend over and are free from contacting the valleys, the peaks having widths from three inches to six inches while the corresponding valleys having widths from two inches to about eight inches such that the cart uniformly traverses the construction floor decking.

5. The cart of claim 1 wherein a centerline of an outer row and another centerline of an outer column are positioned from an edge of the rigid bottom from three inches to five inches.

6. A cart for welding studs while traversing a construction floor decking that has sequential peaks and valleys, the cart comprising:
   a housing having a base, a top and a side connecting the base and the top;
   a stud feed assembly connected to the housing, the stud feed assembly having a stud loader and a stud catcher, the stud loader having a chute connected to the housing to feed a plurality of studs to the stud catcher, the chute includes an entry end and an exit end, the entry end being positioned near the top of the housing and the exit end being positioned near the base of the housing and extending outward from the side of the housing, the entry end having an opening configured to accept and align the plurality of studs in an end-to-end relationship, the exit end having an angled surface configured to guide at least one stud of the plurality of studs out of the chute and toward the catcher, the stud catcher being suspendably connected to near the base of the housing, the stud catcher having a receptacle positioned below the exit end, the receptacle being shaped to receive the stud from the plurality of studs such that the receptacle vertically aligns the received stud with respect to the housing;
   an arm assembly movably connected to the housing, the arm assembly having a linkage member extending beyond the side of the housing and an extension member vertically connected to the linkage member, the linkage member being configured to rotate the extension member about the housing; and
   a stud gun axially connected to the extension member wherein a worker, while in a standing position, moves the extension member to position the stud gun to capture the stud that is vertically aligned within the receptacle of the stud catcher and the worker then moves the captured stud and stud gun to a welding location where the worker activates the stud gun to stud weld the stud while the worker remains in the standing position.

7. The cart of claim 6 wherein the entry end extends beyond the top of the housing and the exit end extends beyond the side of the housing opposite the stud catcher, the entry end having a trough to accept and to guide the plurality of studs into the chute, the exit end having an angled surface to guide the stud into the receptacle of the stud catcher.

8. The cart of claim 7 wherein the angled surface has a range from about thirty degrees to about forty-five degrees.

9. The cart of claim 8 wherein the angled surface has a generally U-shaped cutout.

10. The cart of claim 6 wherein the receptacle of the stud catcher includes a receptacle base and a tube extending upward from the receptacle base and positioned beyond the angled surface of the exit end of the chute.

11. The cart of claim 10 wherein the tube comprises a circular shaped tube having an inner diameter and an outer diameter, the inner diameter being larger than the received stud.

12. The cart of claim 6 wherein the stud gun includes a displacement transducer configured to measure, in real time, a lift displacement and a plunge displacement experienced by the stud gun as the stud gun stud welds the stud.

13. The cart of claim 12 further comprising an analyzer operatively connected to the stud gun wherein the analyzer comprises a time circuit which measures, in real time, time of the activated stud gun; a current circuit that measures, in real time, current applied to the stud gun as the stud gun stud welds the stud; a lift circuit which measures, in real time, the lift displacement and a plunge circuit which measures, in real time, the plunge displacement such that the real time measurements of the time circuit, the current circuit, the lift circuit and plunge circuit are measured at the location of the welded stud.

14. The cart of claim 6 further comprising a wheel assembly connected to the cart, the wheel assembly having an array of wheels forming rows and columns of wheels positioned under the cart wherein at any given instant of time a number of the wheels of the rows and columns contact a plurality of peaks of the construction floor decking and while other wheels extend over and free from contacting the valleys such that the cart uniformly traverses the construction floor decking.

15. The cart of claim 14 wherein adjacent rows of wheels are laterally offset from each other and wherein adjacent columns of wheels are longitudinally offset from each other.

16. A cart for welding studs while traversing a construction floor decking that has sequential peaks and valleys, the cart comprising:
   a housing having a base, a top and a side connecting the base and the top;
   a stud feed assembly connected to the housing, the stud feed assembly having a stud loader and a stud catcher, the stud loader having a chute connected to the housing to feed a plurality of studs to the stud catcher, the chute includes an entry end and an exit end, the entry end being positioned near the top of the housing and the exit end being positioned near the base of the housing and extending outward from the side of the housing, the entry end having an opening configured to accept and align the plurality of studs in an end-to-end relationship, the exit end having an angled surface configured to guide at least one stud of the plurality of studs out of the chute and toward the catcher, the stud catcher being suspendably connected near the base of the housing, the stud catcher having a receptacle positioned below the exit end, the receptacle being shaped to receive the stud from the plurality of studs such that the receptacle vertically aligns the received stud with respect to the housing;
   an arm assembly movably connected to the housing, the arm assembly having a linkage member extending beyond the side of the housing and an extension member vertically connected to the linkage member, the linkage member being configured to rotate the extension member about the housing;
   a stud gun axially connected to the extension member wherein a worker, while in a standing position, moves the extension member to position the stud gun to capture the stud that is vertically aligned within the receptacle of the stud catcher and the worker then moves the captured stud and stud gun to a welding location where the worker activates the stud gun to stud weld the stud while the worker remains in the standing position, the stud gun including a displacement transducer configured to measure, in real time, a lift displacement and a plunge displacement experienced by the stud gun as the stud gun stud welds the stud; and
   an analyzer operatively connected to the stud gun wherein the analyzer comprises a time circuit which measures, in real time, time of the activated stud gun; a current circuit that measures, in real time, current applied to the stud gun as the stud gun stud welds the stud; a lift circuit which measures, in real time, the lift displacement and a plunge circuit which measures, in real time, the plunge displacement such that the real time measurements of the time circuit, the current circuit, the lift circuit and plunge circuit are measured at the location of the welded stud.

17. A cart for uniformly traversing a construction floor decking that has sequential peaks and valleys prior to cement being poured on the construction floor decking, the cart comprising:
   a housing having:
      a rigid bottom;
      a top; and
      a side connecting the rigid bottom and the top; and
   a wheel assembly connected to the rigid bottom of the cart, the wheel assembly having an array of multidirectional wheels having the same size and forming a predetermined pattern of wheels positioned under the cart, the array of multidirectional wheels forming rows and columns of multidirectional wheels in a configuration such that adjacent rows of wheels are laterally offset from each other from about one to three inches and adjacent columns of wheels are longitudinally offset from each other from one to three inches and centerlines of the rows are positioned seven and a half inches to seven and three quarters inches from each other and wherein centerlines of the columns are positioned seven and a half inches to seven and three quarters inches from each other, wherein at any instant of time a number of the multidirectional wheels are configured to contact a plurality of peaks of the construction floor decking while other multidirectional wheels extend over and remain free from entering into the valleys, the peaks having widths from three inches to six inches while the corresponding valleys having widths from two inches to eight inches such that the cart evenly traverses the construction floor decking.

18. A cart for uniformly traversing a construction floor decking that has sequential peaks and valleys prior to cement being poured on the construction floor decking, the cart comprising:
   a housing having:
      a rigid bottom;
      a top; and
      a side connecting the rigid bottom and the top; and
   a wheel assembly connected to the rigid bottom of the cart, the wheel assembly having an array of multidirectional wheels having the same size and forming a predetermined pattern of wheels positioned under the cart, the array of multidirectional wheels forming rows and columns of multidirectional wheels in a configuration such that centerlines of the rows are positioned fourteen inches from each other and wherein centerlines of the columns are positioned fourteen inches from each other, wherein at any instant of time a number of the multidirectional wheels are configured to contact a plurality of peaks of the construction floor decking while other multidirectional wheels extend over and remain free from entering into the valleys, the peaks having widths from three inches to six inches while the corresponding valleys having widths from two inches to eight inches such that the cart evenly traverses the construction floor decking.

19. The cart of claim 18 wherein a centerline of an outer row and another centerline of an outer column are positioned from an edge of the rigid bottom at six inches.

* * * * *